United States Patent

Miyamoto et al.

[11] Patent Number: 5,835,471
[45] Date of Patent: Nov. 10, 1998

[54] OPTICAL INFORMATION RECORDING AND/OR REPRODUCING APPARATUS

[75] Inventors: Moritoshi Miyamoto; Kengo Emoto, both of Kawasaki, Japan

[73] Assignee: Canon Kabushiki Kaisha, Tokyo, Japan

[21] Appl. No.: 662,442

[22] Filed: Jun. 10, 1996

[30] Foreign Application Priority Data

| Jun. 12, 1995 | [JP] | Japan | 7-144310 |
| Jun. 12, 1995 | [JP] | Japan | 7-144311 |
| Jun. 12, 1995 | [JP] | Japan | 7-144312 |
| Jun. 12, 1995 | [JP] | Japan | 7-144318 |
| Jun. 20, 1995 | [JP] | Japan | 7-153297 |
| Oct. 12, 1995 | [JP] | Japan | 7-263906 |

[51] Int. Cl.$^6$ .................................................. G11B 7/00
[52] U.S. Cl. .................. 369/109; 369/44.37; 369/44.23; 369/103; 369/112
[58] Field of Search .................. 369/44.37, 109, 369/112, 110, 44.23, 103

[56] References Cited

U.S. PATENT DOCUMENTS

| 5,231,620 | 7/1993  | Ohuchida        | 369/112   |
| 5,373,492 | 12/1994 | Miyamoto et al. | 369/112   |
| 5,391,865 | 2/1995  | Kurata et al.   | 369/44.12 |
| 5,444,224 | 8/1995  | Miyamoto        | 235/454   |
| 5,475,670 | 12/1995 | Hamada et al.   | 369/112   |
| 5,511,059 | 4/1996  | Brazas, Jr.     | 369/109   |
| 5,579,298 | 11/1996 | Opheij et al.   | 369/112   |
| 5,594,712 | 1/1997  | Yang            | 369/112   |

FOREIGN PATENT DOCUMENTS 1-237940  9/1989  Japan .

Primary Examiner—Tod R. Swann
Assistant Examiner—Kim-Kwok Chu
Attorney, Agent, or Firm—Fitzpatrick, Cella, Harper & Scinto

[57] ABSTRACT

An optical information recording and/or reproducing apparatus for radiating a plurality of beams to an optical information recording medium to record information in the optical information recording and/or reproduce information recorded therein. The apparatus includes (i) an irradiation optical system, (ii) a diffraction grating for splitting a beam from the irradiation optical system into a plurality of beams, the diffraction grating having a plurality of different diffraction regions formed without overlapping with each other, the plurality of beams split by the plurality of diffraction regions being guided onto the optical information recording medium, and (iii) a detection optical system for detecting a beam from the optical information recording medium. The detection optical system includes a photodetector which includes a plurality of light receiving elements in which at least three light receiving elements are provided on a predetermined arrangement line and at least two light receiving elements are arranged so as to sandwich the arrangement line therebetween.

41 Claims, 39 Drawing Sheets

RF

DV

AT

0-ORDER···AF

AT

DV

RF

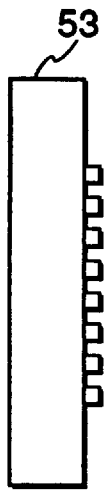 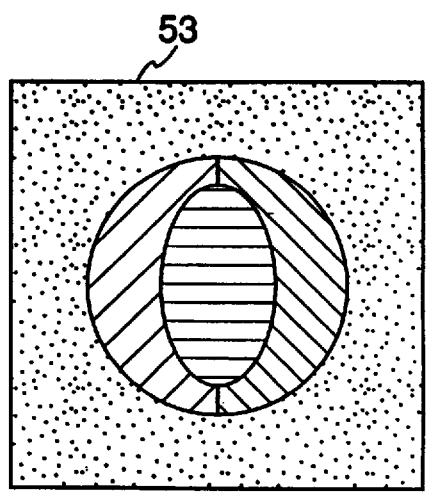
FIG.42A        FIG.42B
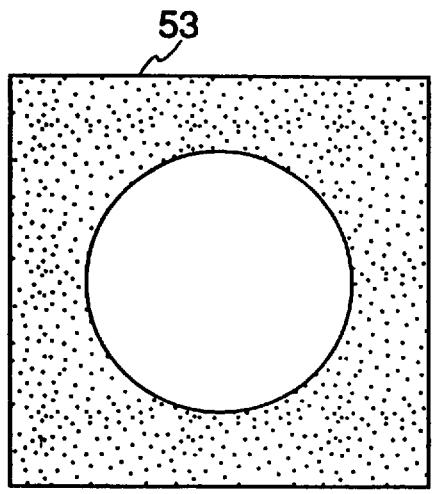 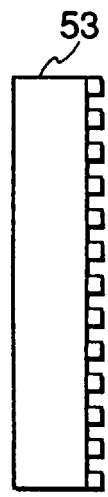
FIG.43A        FIG.43B

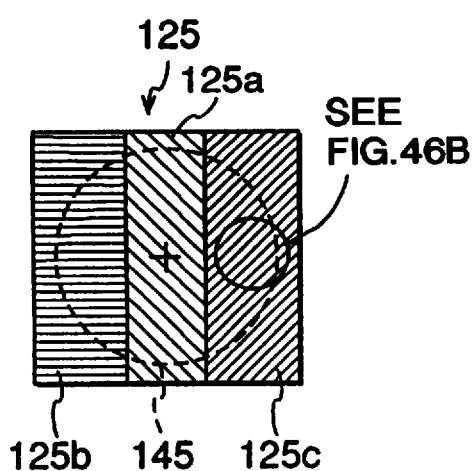
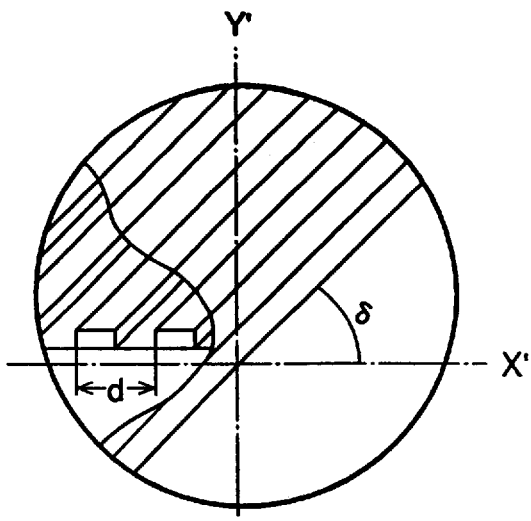
FIG.46A  FIG.46B
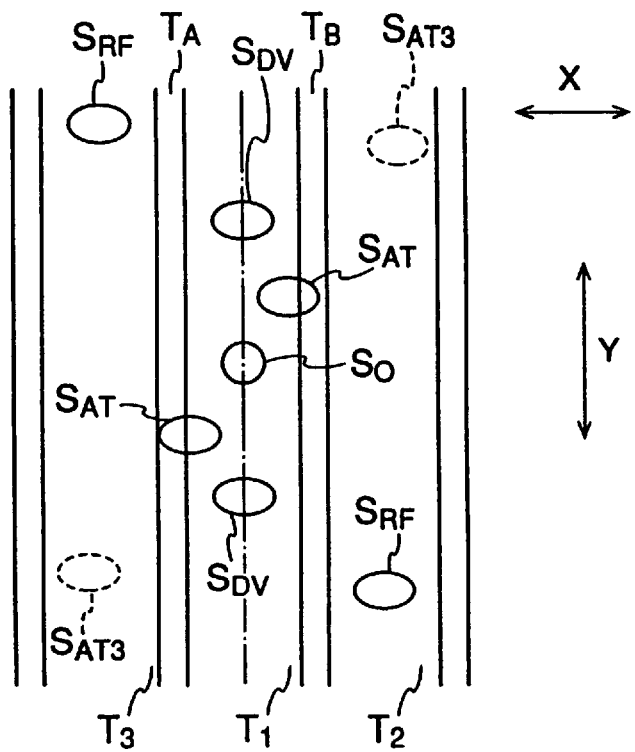
FIG.47

RECTANGULAR   ELLIPSE   ELLIPSE   SEMICIRCLE   CIRCLE

PORTION FORMING DIFFRACTION GRATING

PORTION NOT FORMING DIFFRACTION GRATING

PORTION FORMING DIFFRACTION GRATING

PORTION NOT FORMING DIFFRACTION GRATING

OBJECTIVE LENS EFFECTIVE DIAMETER

+FIRST-ORDER BEAM

0-ORDER BEAM

−FIRST-ORDER BEAM

ELLIPSE   ELLIPSE   SEMICIRCLE   CIRCLE

OPTICAL INFORMATION RECORDING AND/OR REPRODUCING APPARATUS

BACKGROUND OF THE INVENTION

1. Field of the Invention

The present invention relates to an optical information recording and/or reproducing apparatus for recording information in an optical information recording medium and/or for reproducing the information recorded in the recording medium.

2. Related Background Art

The conventionally known information recording media for recording and/or reproduction of information with light are available in various forms such as a disk, a card, or a tape. These optical information recording media include those capable of recording and reproducing information, those capable of only reproducing information, and so on.

Information is recorded in a recordable medium by scanning an information track with a light beam modulated according to recording information and focused in a fine spot, so that the information is recorded in the form of information bit strings optically detectable.

The information is reproduced from the recording medium by scanning the information bit strings in the information track with a light beam spot of such a constant power as not to effect recording in the medium and detecting reflected light or transmitted light from the medium.

An optical head used for recording of information into the aforementioned recording media or for reproduction thereof is arranged to be movable in directions along the information track and in directions traversing the foregoing directions, relative to the recording medium, and this movement effects scanning of an information track with the light beam spot. A specific example of a focusing lens of the light beam spot in the optical head is an objective lens. This objective lens is held on the main body of an optical head so that it can move independently in a direction along the optical axis thereof (in the focusing direction) and in a direction perpendicular to both directions along the optical axis and along the information track of a recording medium (or in the tracking direction). Such holding of the objective lens is realized normally through an elastic member, and the movement in the above two ways of the objective lens is usually actuated by actuators utilizing magnetic interaction.

Incidentally, a great demand is expected in the future for the optical information recording media in the card form (which will be referred to as optical cards), among the optical information recording media described above, as relatively large capacity information recording media being compact and light and thus being convenient to carry.

FIG. 1 is a schematic plan view of a write-once optical card and FIG. 2 is a partially enlarged view thereof.

In FIG. 1, many information tracks 2 are arranged in parallel along the L-F direction on an information recording surface of an optical card 1. In addition, the information recording surface of optical card 1 is provided with a home position 3, which is a reference position of access to the above information tracks 2. The information tracks 2 are arranged in the order of 2-1, 2-2, 2-3, . . . from the side of the home position 3, and tracking tracks 4 are arranged in the order of 4-1, 4-2, 4-3, . . . next to each of these information tracks, as shown in FIG. 2. These tracking tracks 4 are used as a guide for autotracking (hereinafter represented by AT) to control the beam spot so as not to depart from a predetermined information track during scanning with the light beam spot upon recording or reproduction of information.

This AT servo is carried out as follows: in the optical head, deviation (AT error) of the light beam spot from the information track is detected; the detection signal is negatively fed back to the tracking actuator; and the objective lens 27 is moved relative to the optical head body in the tracking direction (or in the direction D) so as to let the light beam spot follow up the desired information track.

Further, autofocusing (hereinafter represented by AF) servo is carried out in order to shape the light beam in a spot of an appropriate size on the optical card surface (or in order to focus the light beam) during scanning of an information track with the light beam spot upon recording or reproduction of information. This AF servo is carried out as follows: in the optical head, deviation (AF error) of the light beam spot from an in-focus state is detected; the detection signal is negatively fed back to the focusing actuator; and the objective lens is moved relative to the optical head body in the focusing direction so as to focus the light beam spot on the optical card surface.

In FIG. 2, $S_1$, $S_2$, $S_3$ represent light beam spots, in which the light spots $S_1$, and $S_3$ are used for AT and the light spot $S_2$ for AF and for formation of information bits upon recording or for reading-out of information bits upon reproduction. In each information track, portions 6-1, 6-2 and 7-1, 7-2 denote preformatted left and right address portions, respectively, and each information track can be identified by reading this address portion out. Further, numeral 5 (specifically, 5-1, 5-2 in the drawing) denotes data portions, in which predetermined information is recorded.

Here is now explained an optical information recording method with reference to the schematic drawing of a head optical system shown in FIG. 3.

In FIG. 3, numeral 21 designates a semiconductor laser as a light source, which emits light having a wavelength of 830 nm polarized in the direction perpendicular to the tracks (or having the plane of oscillation of an electric field in that direction) in this example. Numeral 22 denotes a collimator lens, 23 a beam shaping prism, 24 a diffraction grating for splitting a beam, and 25 a polarizing beam splitter. Further, numeral 26 represents a quarter wave plate, 20 a total reflection mirror (total reflection prism), 27 an objective lens, 28 a spherical lens, 29 a cylindrical lens, and 30 a photodetector. The photodetector 30 is composed of light receiving elements 30a, 30c and a quartered light receiving element 30b.

The light beam emitted from the semiconductor laser 21 is incident as a diverging beam into the collimator lens 22. Then, the collimator lens 22 collimates the light beam into a collimated beam, and the beam shaping prism 23 further shapes the beam into one having a predetermined light intensity distribution, that is, one having a circular intensity distribution. After that, the beam is incident to the diffraction grating 24, and the diffraction grating 24 splits the beam into three effective beams (zeroth-order diffracted light and ± first-order diffracted light). These three beams are incident as p-polarized light beams into the polarizing beam splitter 25. The polarizing beam splitter 25 has the spectral characteristics as shown in FIG. 4, whereby the beam splitter transmits almost 100% of p-polarized light incident thereto.

Then, the three beams are converted into circularly polarized light as passing through the quarter wave plate 26, and the circularly polarized light is focused on the optical card 1 by the objective lens 27. The thus focused light is in the form of the three fine beam spots $S_1$, (the + first-order diffracted light), $S_2$ (the zeroth-order diffracted light), and $S_3$ (the-first-order diffracted light), as shown in FIG. 2. The spot $S_2$ is used for recording, reproduction, and AF control while the spots $S_1$, and $S_3$ are used for AT control. The spots are positioned on the optical card 1 so that the light beam spots $S_1$, $S_3$ are located on adjacent tracking tracks 4 and the light beam spot $S_2$ on an information track 2 between the foregoing tracking tracks, as shown in FIG. 2. Then, reflected light from the light beam spots formed on the optical card 1 travels again through the objective lens 27 to be converted into a parallel beam, and the parallel beam passes through the quarter wave plate 26 to be converted into a light beam with a direction of polarization rotated 90° from that upon incidence. Thus, the light beam is incident as s-polarized light into the polarizing beam splitter 25, and almost 100% of the beam is reflected because of the spectral characteristics shown in FIG. 4 to be guided to a detection optical system.

The detection optical system is a combination of the spherical lens 28 with the cylindrical lens 29, and this combination performs the AF control by the astigmatic method. The three beams reflected from the optical card 1 are condensed by the detection optical system to enter the photodetector 30, and then form three light spots thereon. The light receiving elements 30a, 30c receive the reflected light of the aforementioned light spots $S_1$, $S_3$, and the AT control is carried out using a difference between outputs from these two light receiving elements. The quartered light receiving element $30_b$ receives the reflected light of the light spot $S_2$; and the AF control is carried out using an output therefrom and recorded information is reproduced using the output. As shown in FIG. 5, each light spot $S_a$, $S_b$, $S_c$ in the light receiving element 30a, 30b, 30c is completely included within the light receiving element 30a, 30b, 30c.

The optical system of the optical head as described above is separated into a stationary portion and a movable portion, as shown in FIG. 3, and only the movable portion is moved as shown by arrows, whereby an information track can be scanned with the light beam spot $S_2$. In the case of such a separate type optical head, a necessary moving amount of the movable portion is approximately equal to the longitudinal length of the optical card 1, which is normally about 100 nm.

The bulletin of Japanese Laid-open Patent Application No. 1-237940 describes the idea that a beam from the light source is split into a plurality of beams by a diffraction grating having a diffraction region, thereby forming a plurality of light spots on an optical memory medium.

FIG. 6 is a schematic drawing for explaining an example of the invention described in the above bulletin. In the drawing, reference numeral 5 designates a diffraction grating, in which parallel grating grooves are cut in two directions as being superimposed, thus forming one diffraction region. This one diffraction region enables five light spots a, b, c, d, e to be projected from one light source (not shown) onto the optical card. As described, the diffraction grating 5 has one diffraction region throughout on which the same grating pattern is formed.

FIG. 7 and FIG. 8 are drawings for explaining another example of the invention described in this bulletin, in which the diffraction grating 5 of FIG. 7 includes four grating groups 5d of the same grating patterns of concentric circular grating grooves, whereby four light spots a, b, c, d are projected onto a plurality of tracks on the recording medium, as shown in FIG. 8, which enables access to multiple tracks with a single light source.

The above conventional example shown in FIG. 1 to FIG. 5 is arranged to effect verification of information upon recording only in one direction. Therefore, the optical head must be moved forward and backward relative to the optical card for recording of each track. Further, a lot of time was required upon reproduction because the tracks needed to be read one by one.

The above-stated invention described in the bulletin of Japanese Laid-open Patent Application No. 1-237940, as shown in FIG. 6 to FIG. 8, had the problem that it was difficult to freely set the shape, light quantity, or the like of each light spot individually by controlling the shape of the diffraction grating region or level differences of the diffraction grating.

SUMMARY OF THE INVENTION

An object of the present invention is to provide an optical information recording and/or reproducing apparatus which is arranged to split light from a single light source into plural beams and to permit both-way recording (forward and backward recording) and simultaneous reproduction of plural tracks.

A further object of the present invention is to provide an optical information recording and/or reproducing apparatus in which the shape, light quantity, or the like of each optical spot can be freely set individually by controlling the shape of a diffraction grating region or the level differences of a diffraction grating.

The present invention provides, as means for solving the above problems, an optical information recording and/or reproducing apparatus arranged to have a diffraction grating in which a plurality of diffraction regions of different grating directions are formed without overlapping with each other, wherein a light beam incident to the diffraction grating from a light source is split into a plurality of beams with different emerging directions and different beam diameters by the plurality of diffraction regions and wherein the plurality of beams are projected onto the optical information recording medium.

The optical information recording and/or reproducing apparatus is characterized in that among the plurality of beams the light not subjected to the action of the diffraction phenomenon (i.e., the zeroth-order light) is used as a recording beam and the other light subjected to the action of diffraction phenomenon (i.e., the diffracted light) is used as direct verifying light (DV light), autotracking light (AT light), and reproducing light (RF light).

According to the present invention, in order to achieve the above objects, the diffraction grating with the plurality of diffraction regions not overlapping with each other is disposed in an incident light path so as to split the incident light into beams of recording light (of the zeroth order), DV light (of the first order), AT light (of the first order), and RF light (of the first order) and the shape and intensity of each light spot can be readily controlled individually so as to be most suitable for an individual purpose by adjusting the associated diffraction region.

Namely, since the shape, light quantity, or the like of each light spot can be freely set individually by controlling the shape of the diffraction grating region or the level differences of the diffraction grating, it is easy to perform stable control resistant to deviation in the track traversing direction (AT offset), for example, by shaping only the spots of AT, RF, and DV in a spot form elongated in the track traversing direction.

If the optical information recording and/or reproducing apparatus is arranged so that the diffraction grating is a hologram, it is similarly easy to split the beam into plural beams and to control the shape and intensity of each spot so as to be most suitable for an individual purpose individually and separately, by adjusting the respective diffraction regions.

The present invention further provides, as means for solving the above problems, an optical information recording and/or reproducing apparatus in which parting lines for parting the plurality of diffraction regions from each other in the diffraction grating are parallel to the track running direction.

The optical information recording and/or reproducing apparatus is characterized in that the diffraction grating has three diffraction regions and in that, among a plurality of light spots projected onto the optical information recording medium from a plurality of beams split by the diffraction regions, a direct verifying (DV) light spot, an autotracking (AT) light spot, and a reproducing (RF) light spot from the light subjected to the action of the diffraction phenomenon are elliptical, being elongated in the track traversing direction of the optical information recording medium, and a recording light spot from the light not subjected to the action of the diffraction phenomenon is circular, being smaller than the other light spots.

According to the present invention, the light subjected to the action of the diffraction phenomenon forms a spot elongated in the track traversing direction on the recording medium such as an optical card.

Further, the spot can be focused at this time in the diameter smaller in the track running direction, and thus, reproduction signals without occurrence of jitter or the like can be obtained using such DV light and RF light spots.

The present invention provides, as means for solving the above problems, an optical information recording and/or reproducing apparatus arranged to split a light beam from a light source into a plurality of beams by a diffraction grating having two diffraction regions formed without overlapping with each other, wherein the light not subjected to diffraction (the zeroth-order light) out of the plurality of beams is used as a recording beam, the ± first-order light diffracted by one diffraction region out of the two diffraction regions is used as direct verifying light (DV light), the ± first-order light diffracted by the other diffraction region out of the two diffraction regions is used as autotracking light (AT light), and the ± third-order light is used as reproducing light (RF light).

According to the present invention, in order to achieve the above objects, the diffraction grating having the two diffraction regions formed without overlapping with each other is disposed in the incident light path, whereby the beam can be split into the beams of recording light (of the zeroth order), DV light (of the first order), AT light (of the first order), and RF light (of the third order) and the light spot shapes and intensities thereof can be readily set independently so as to be most suitable for their respective purposes.

The present invention provides, as means for solving the above problems, an optical information recording and/or reproducing apparatus arranged to split a beam from a light source into a plurality of beams by a diffraction grating having three diffraction regions formed without overlapping with each other, wherein the light not subjected to the action of the diffraction grating (the zeroth order light) out of the plurality of beams is used as a recording beam and the other light subjected to the action of the diffraction phenomenon (the diffracted light) is used as direct verifying light (DV light), autotracking light (AT light), and reproducing light (RF light).

The optical information recording and/or reproducing apparatus is characterized in that the three diffraction regions formed without overlapping with each other in the diffraction grating are of fan-shaped segments obtained by dividing a region around the optical axis every 120°.

According to the present invention, in order to achieve the above objects, the diffraction grating having the three diffraction regions formed without overlapping with each other is disposed in the incident light path, whereby the beam from the light source is split into the beams of recording light (of the zeroth order), DV light (of the first order, AT light (of the first order), and RF light (of the first order) and they can be used in the light spot shapes and intensities most suitable for their respective purposes.

The present invention provides, as means for solving the above problems, an optical information recording and/or reproducing apparatus arranged to split a beam from a light source into a plurality of beams by a diffraction grating having three diffraction regions formed without overlapping with each other, wherein the light not subjected to the action of the diffraction grating (the zeroth-order light) out of the plurality of beams is used as a recording beam and the other light subjected to the action of the diffraction phenomenon (the diffracted light) is used as direct verifying light (DV light), autotracking light (AT light), and reproducing light (RF light), and wherein the three diffraction regions of the diffraction grating are formed concentrically with the optical axis at the center.

The optical information recording and/or reproducing apparatus is also characterized in that the diffraction grating, separated in the three concentric diffraction regions, is divided so that light quantities impinging on the respective diffraction regions may be equal to each other if an intensity distribution of the incident beam is a Gaussian distribution.

The optical information recording and/or reproducing apparatus is also characterized in that the light source of the incident beam is a semiconductor laser.

The optical information recording and/or reproducing apparatus is also characterized in that diffraction efficiencies of the diffraction grating are constant throughout all the regions (the plurality of diffraction regions).

According to the present invention, it becomes easy to split the beam from the light source into the beams of recording light (of the zeroth order), DV light (of the first order), AT light (of the first order), and RF light (of the first order) and to independently adjust the light spot shapes and intensities thereof so as to be most suitable for the respective purposes.

According to the present invention, the diffraction grating has the constant diffraction efficiencies throughout all the regions and the diffraction grating is divided so that the light quantities impinging on the three diffraction regions may be equal to each other if the intensity distribution of the incident beam is a Gaussian distribution, which makes the light quantities of the light spots impinging on the recording medium equal to each other and which makes construction of a detection circuit easy.

The present invention provides, as means for solving the above problems, an optical information recording and/or reproducing apparatus arranged to split a beam from a light source into a plurality of beams by a diffraction grating having three diffraction regions formed without overlapping with each other, wherein the light not subjected to the action of the diffraction grating (the zeroth-order light) out of the plurality of beams is used as a recording beam and the other light subjected to the action of the diffraction phenomenon (the diffracted light) is used as direct verifying light (DV light), autotracking light (AT light), and reproducing light (RF light), and wherein diameters of the respective beams in the track traversing direction on the optical card are arranged to satisfy the following relations:

(AT light spot)≧(DV light spot); and (RF light spot)≧(DV light spot).

The optical information recording and/or reproducing apparatus may also be characterized in that the diameters of the respective beams in the track traversing direction on the optical information recording medium are arranged to satisfy the following relation:

(AT light spot)≧(RF light spot)≧(DV light spot).

The optical information recording and/or reproducing apparatus may also be characterized in that the three diffraction regions formed without overlapping with each other in the diffraction grating are concentric with the optical axis at the center and are arranged in the order of (the region for AT light), (the region for RF light), and (the region for DV light) from the inside.

According to the present invention, in order to achieve the above objects, the diffraction grating having the three diffraction regions is disposed in the incident light path, which makes it easy to split the beam from the light source into the light beams of recording light (of the zeroth order), DV light (of the first order), AT light (of the first order), and RF light (of the first order) and to independently control the light spot shapes and intensities thereof so as to be most suitable for the respective purposes.

Further, since the diffraction grating used in the present invention has the three regions concentrically arranged about the optical axis at the center and they are arranged in the order of (the region for AT light), (the region for RF light), and (the region for DV light) from the inside, the spot diameters on the optical card can be set to satisfy the following relation:

(AT light spot)≧(RF light spot)≧(DV light spot), which enables stable control and reproduction.

The present invention provides, as means for solving the above problems, an optical information recording and/or reproducing apparatus arranged to split a beam from a light source into a plurality of beams by a diffraction grating having three diffraction regions formed without overlapping with each other, wherein the light not subjected to the action of the diffraction grating (the zeroth-order light) out of the plurality of beams is used as a recording beam and the other light subjected to the action of the diffraction phenomenon (the diffracted light) is used as direct verifying light (DV light), autotracking light (AT light), and reproducing light (RF light), and wherein diameters of the respective beams in the track traversing direction on the optical card are arranged to satisfy the following relation:

(AT light spot)=(RF light spot)≧(DV light spot).

The optical information recording and/or reproducing apparatus may also be characterized in that the three diffraction regions formed without overlapping with each other in the diffraction grating are regions obtained by forming two concentric circles with the optical axis at the center and dividing the inside circle into two at the center in the track running direction and in that the (region for AT light) and (region for RF light) are disposed in the two inside regions and the (region for DV light) is in the remaining outside ring region.

According to the present invention, in order to achieve the above objects, the diffraction grating having the three diffraction regions formed without overlapping with each other is disposed in the incident light path, which enables splitting the beam from the light source into the beams of recording light (of the zeroth order), DV light (of the first order), AT light (of the first order), and RF light (of the first order) and using the light spot shapes and intensities thereof most suitable for the respective purposes.

Further, the diffraction grating used in the present invention is the one formed by defining the two concentric regions with the optical axis at the center and splitting the inside circle into the two regions at the center in the track running direction, thereby obtaining the three regions in total.

The spot diameters in the track traversing direction on the optical card are arranged to satisfy the following relation:

(AT light spot)=(RF light spot)≧(DV light spot), which enables stable control and reproduction.

The present invention provides, as means for solving the above problems, an optical information recording and/or reproducing apparatus arranged to split a beam from a light source into a plurality of beams by a diffraction grating having three diffraction regions formed without overlapping with each other, wherein the light not subjected to the action of the diffraction grating (the zeroth-order light) out of the plurality of beams is used as a recording beam and the other light subjected to the action of the diffraction phenomenon (the diffracted light) is used as direct verifying light (DV light), autotracking light (AT light), and reproducing light (RF light), and wherein diameters of the respective beams in the track running direction on the optical card are arranged to satisfy the following relation:

(AT light spot)≧(RF light spot)=(DV light spot).

The optical information recoding and/or reproducing apparatus may also be characterized in that the three diffraction regions formed without overlapping with each other in the diffraction grating are those obtained by forming two concentric circles with the optical axis at the center and splitting the outside circle into two regions at the center in the track running direction and in that the (region for DV light) and (region for RF light) are disposed in the two outside regions and the (region for AT light) is disposed in the remaining circular inside region.

According to the present invention, in order to achieve the above objects, the diffraction grating having the three diffraction regions formed without overlapping with each other is disposed in the incident light path, which makes it easy to split the beam from the light source into the beams of recording light (of the zeroth order), DV light (of the first order), AT light (of the first order), and RF light (of the first order) and to independently control the light spot shapes and intensities thereof so as to be most suitable for the respective purposes.

Further, the diffraction grating used in the present invention is the one obtained by defining the two concentric diffraction regions with the optical axis at the center and further splitting the outside circle into the two regions at the center in the track running direction, thereby forming the three diffraction regions in total.

When the spot diameters in the track running direction on the optical card are arranged to satisfy the following relation:

(AT light spot)≧(RF light spot)=(DV light spot), the DV light spot and RF light spot can be formed in the small spot diameter in the tracking running direction, thereby obtaining stable reproduction signals.

The present invention provides, as means for solving the above problems, an optical information recording and/or reproducing apparatus having a diffraction grating in which three diffraction regions are formed without overlapping with each other, for splitting a beam incident thereto from a light source into a plurality of beams, wherein the light not subjected to the action of the diffraction grating (the zeroth-order light) out of the plurality of beams is used as a recording beam and the other light subjected to the action of the diffraction phenomenon (the diffracted light) is used as direct verifying light (DV light), autotracking light (AT light), and reproducing light (RF light), and wherein the diffraction regions of the diffraction grating are those obtained by defining an outside circle with the optical axis at the center and an ellipse elongated in the track direction and inside the outside circle and splitting a ring-shaped region between the circle and the ellipse into two at the center in the track running direction, thus constituting the three diffraction regions in total.

According to the present invention, in order to achieve the above objects, the diffraction grating having the three diffraction regions formed without overlapping with each other is disposed in the incident light path, which makes it easy to split the beam from the light source into the beams of recording light (of the zeroth order), DV light (of the first order), AT light (of the first order), and RF light (of the first order) and to independently control the light spot shapes and intensities thereof so as to be most suitable for the respective purposes.

Further, the diffraction grating used in the present invention is composed of the three diffraction regions in total obtained by defining the outside circle with the optical axis at the center and the ellipse elongated in the track direction and inside the outside circle and splitting the ring region between the circle and the ellipse at the center in the track running direction, and the beams diffracted by this diffraction grating can form elliptical spots elongated in the track traversing direction on the optical card.

Since this arrangement permits less light near the center to be diffracted in the track direction, when compared with the case where the inside diffraction region is circular, a smaller spot can be formed in the track direction.

The present invention provides, as means for solving the above problems, an optical information recording and/or reproducing apparatus having a diffraction grating in which three diffraction regions are formed without overlapping with each other, for splitting a beam incident thereto from a light source into a plurality of beams, wherein the light not subjected to the action of the diffraction grating (the zeroth-order light) out of the plurality of beams is used as a recording beam and the other light subjected to the action of the diffraction phenomenon (the diffracted light) is used as direct verifying light (DV light), autotracking light (AT light), and reproducing light (RF light), and wherein quantities of light diffracted from the respective diffraction regions are arranged to be equal to each other.

The optical information recording and/or reproducing apparatus may also be characterized in that the intensity distribution of the beam incident to the diffraction grating is a Gaussian distribution.

The optical information recording and/or reproducing apparatus may also be characterized in that the light source of the incident beam is a semiconductor laser.

The optical information recording and/or reproducing apparatus may also be characterized in that diffraction efficiencies of the diffraction grating are determined according to quantities of the light incident to the respective diffraction regions.

The optical information recording and/or reproducing apparatus may also be characterized in that the diffraction grating is arranged to satisfy the following relation:

$$\alpha A = \beta B = \gamma C$$

where the diffraction efficiencies are $\alpha$ for the AT light region, $\beta$ for the RF light region, and $\gamma$ for the DV light region and the quantities of the light incident to the respective diffraction regions are A for the AT light region, B for the RF light region, and C for the DV light region.

According to the present invention, in order to achieve the above objects, the diffraction grating having the three diffraction regions formed without overlapping with each other is disposed in the incident light path, which makes it easy to split the beam from the light source into the beams of recording light (of the zeroth order), DV light (of the first order), AT light (of the first order), and RF light (of the first order) and to independently control the light spot shapes and intensities thereof so as to be most suitable for the respective purposes.

Further, since the diffraction grating used in the present invention is arranged to satisfy the relation of $\alpha A = \beta B = \gamma C$ where $\alpha$ is the diffraction efficiency of the AT light region, $\beta$ is the diffraction efficiency of the RF light region, $\gamma$ is the diffraction efficiency of the DV light region, A the light quantity incident to the AT light region, B is the light quantity incident to the RF light region, and C is the light quantity incident to the DV light region, the light quantities in the respective light spots can be set to be equal to each other, which makes the detection circuit easy.

The present invention provides, as means for solving the above problems, an optical information recording and/or reproducing apparatus arranged to split a beam from a light source into a plurality of beams by a diffraction grating having three diffraction regions formed without overlapping with each other, wherein the light not subjected to the action of the diffraction grating (the zeroth-order light) out of the plurality of beams is used as a recording beam and the other light subjected to the action of the diffraction phenomenon (the diffracted light) is used as direct verifying light (DV light), autotracking light (AT light), and reproducing light (RF light), and wherein the adjacent diffraction regions are separately formed on a bottom surface and on a top surface of a substrate.

The optical information recording and/or reproducing apparatus may also be characterized in that the diffraction grating is a phase type diffraction grating.

The optical information recording and/or reproducing apparatus may also be characterized in that level differences of the diffraction grating are formed by corrosion with a chemical agent.

Further, the optical information recording and/or reproducing apparatus may also be characterized in that the diffraction efficiencies of the respective diffraction regions are arranged to be different from each other.

According to the present invention, in order to achieve the above objects, the diffraction grating having the three diffraction regions formed without overlapping with each other is disposed in the incident light path, which makes it easy to split the beam from the light source into the beams of recording light (of the zeroth order), DV light (of the first order), AT light (of the first order), and RF light (of the first order) and to independently control the light spot shapes and intensities thereof so as to be most suitable for the respective purposes.

The diffraction grating of the present invention is formed in such a manner that the adjacent regions of the diffraction grating are formed on the top and bottom surfaces of a substrate so as not to contact with each other. Thanks to this arrangement, when the diffraction grating is formed by corrosion with a chemical agent, the chemical agent can be prevented from intruding into the other region and control of corrosion can be easy, which presents the effect that it becomes easy to control the level differences of the diffraction grating to determine the light quantities of the respective spots.

Further, since the diffraction efficiencies of the respective diffraction regions are arranged to be different from each other, the apparatus may have the effect that the light quantities of the respective spots can be freely set spot by spot.

The present invention provides, as means for solving the above problems, an optical information recording and/or reproducing apparatus arranged to split a beam from a light source into a plurality of beams by a diffraction grating having three diffraction regions formed without overlapping with each other, wherein the light not subjected to the action of the diffraction grating (the zeroth-order light) out of the plurality of beams is used as a recording beam and the other light subjected to the action of the diffraction phenomenon (the diffracted light) is used as direct verifying light (DV light), autotracking light (AT light), and reproducing light (RF light), and wherein a plurality of diffraction gratings arranged to have different diffraction efficiencies for the respective diffraction regions are bonded to each other to form an integral unit.

The optical information recording and/or reproducing apparatus may also be characterized in that the diffraction grating is a phase type diffraction grating.

The optical information recording and/or reproducing apparatus may also be characterized in that the level differences of the diffraction grating are formed by corrosion with a chemical agent.

The optical information recording and/or reproducing apparatus may also be characterized in that the diffraction grating is formed by bonding two diffraction gratings to each other to form an integral unit.

According to the present invention, in order to achieve the above objects, the diffraction grating having the three diffraction regions formed without overlapping with each other is disposed in the incident light path, which makes it easy to split the beam from the light source into the beams of recording light (of the zeroth order), DV light (of the first order), AT light (of the first order), and RF light (of the first order) and to independently control the light spot shapes and intensities thereof so as to be most suitable for the respective purposes.

Since the diffraction grating of the present invention is formed by bonding the gratings separately formed to each other, the diffraction gratings in the adjacent regions can be formed without contact.

It is thus easy to control the corrosion with a chemical agent necessary for controlling the level differences of the diffraction grating to determine the light quantities of the respective spots independently and the apparatus has the effect that the light quantities of the respective spots can be freely set spot by spot.

Further, the present invention provides, as means for solving the above problems, a diffraction grating arranged to split a light beam from a light source into a plurality of beams, utilizing the diffraction phenomenon, wherein a diffraction region for causing the diffraction phenomenon is split into a plurality of diffraction regions, emerging directions of diffracted light from the respective diffraction regions thus split are different from each other, and the diffraction region for causing the diffraction phenomenon is a region greater than a region irradiated with the light beam from the light source on the diffraction grating.

An optical information recording and/or reproducing apparatus of the present invention is characterized in that a light beam from an irradiation optical system is radiated to the above diffraction grating and the beams emerging from the respective diffraction regions split are guided to irradiate an optical information recording medium, thereby performing recording of information into the optical information recording medium and/or reproduction of recorded information by detecting a beam from the optical information recording medium.

The present invention employs the arrangement in which the diffraction region for causing the diffraction phenomenon of the diffraction grating is split into the plurality of diffraction regions, so as to permit forward and backward recording and/or simultaneous reproduction of plural tracks and employs the arrangement in which the diffraction region for causing the diffraction phenomenon is greater than the diameter of the incident beam, so as to keep quantities of the light emerging from the respective regions split constant even with some deviation of the incident beam relative to the optical axis.

The present invention also provides, as means for solving the above problems, an optical information recording and/or reproducing apparatus, which comprises a stationary portion having an irradiation optical system, and a movable portion having an objective lens and being movable relative to the stationary portion and which records information in the optical information recording medium by irradiation with a light beam from the irradiation optical system and/or which detects a beam from the optical information recording medium upon irradiation with the beam from the irradiation optical system to reproduce recorded information, wherein an aperture for restricting the beam from the irradiation optical system and a diffraction grating, in which a plurality of different diffraction regions are formed without overlapping with each other, for splitting the beam from the irradiation optical system into a plurality of beams are disposed in the movable portion.

The present invention also provides, as means for solving the above problems, an optical information recording and/or reproducing apparatus, which has an optical head for focusing a light beam from an irradiation optical system to irradiate an optical information recording medium with a light spot thereof and projecting a beam from the light spot on the optical information recording medium to a detection optical system, and which records information in the optical information recording medium and/or reproduces recorded information therefrom by irradiation with the beam from the irradiation optical system, the apparatus comprising a diffraction grating having a plurality of diffraction regions with different grating patterns from each other, for splitting the beam from the irradiation optical system into a plurality of beams, an optical system for condensing the plurality of beams in the form of separate spots on the optical information recording medium, and a photodetector for individually detecting a plurality of beams from the optical information recording medium, wherein a beam approximately symmetric with respect to the optical axis of an objective lens out of the plurality of beams is used for AF control. In the present invention, the beam being "approximately symmetric with respect to the optical axis" means that the beam is substantially parallel with the optical axis and the center of the beam is substantially coincident with the optical axis.

The present invention employs the arrangement in which the diffraction region for causing the diffraction phenomenon of the diffraction grating is split into a plurality of diffraction regions, so as to perform the forward and backward recording and/or simultaneous reproduction of plural tracks and further employs the arrangement in which the AF control is effected using a spot of a beam passing near the optical axis of the objective lens, so as to suppress occurrence of positional deviation of the spot upon defocus.

The present invention also provides, as means for solving the above problems, an optical information recording and/or reproducing apparatus arranged to use a diffraction grating having a plurality of diffraction regions with different diffraction angles of first-order diffracted light to split a light beam emitted from a light source into beams of zeroth-order diffracted light, and first-order and higher-order diffracted light of the second or higher order by the diffraction regions, to radiate at least the zeroth-order and first-order diffracted light beams in the form of respective light spots onto an optical information recording medium, to detect beams from the respective light spots on the recording medium by respective photodetector elements, and to record information into the recording medium and/or reproduce recorded information therefrom by irradiation with the light spots, wherein the diffraction grating and the photodetector elements are arranged so that a beam from the recording medium, based on the higher-order diffracted light beam, irradiates a region other than the photodetector elements for detecting the beams from the recording medium, based on the zeroth-order and first-order diffracted light beams.

In one aspect of the present invention, two diffraction regions out of the plurality of diffraction regions in the diffraction grating have respective grating directions inclined at respective acute angles in mutually different directions relative to a direction optically corresponding to a direction perpendicular to a track in the recording medium.

In one aspect of the present invention, the two diffraction regions having the respective grating directions inclined at their acute angles in mutually different directions with respect to the direction optically corresponding to the direction perpendicular to the track of the recording medium are a region for generating a beam to form an autotracking light spot on the recording medium and a region for generating a beam to form an information reproducing light spot on the recording medium.

In one aspect of the present invention, a region for generating a beam to form a direct verifying light spot on the recording medium has a grating direction optically corresponding to the direction perpendicular to the track of the recording medium.

In an aspect of the present invention, the following relation holds:

$$\tan\theta_{max}\cdot\sin\beta<\tan3\theta_{min}\cdot\sin\alpha$$

where $\theta_{min}$ is the diffraction angle of a first diffraction region with the smallest diffraction angle of the first-order diffracted light out of the plurality of diffraction regions in the diffraction grating, $\theta_{max}$ is the diffraction angle of a second diffraction region with the largest diffraction angle of the first-order diffracted light, and $\alpha$ and $\beta$ angles made by the grating directions of the first diffraction region and the second diffraction region with respect to the direction optically corresponding to the direction perpendicular to the track of the recording medium.

In an aspect of the present invention, the following relation holds:

$$\tan\theta_{max}\cdot\cos\beta<\tan3\theta_{min}\cdot\cos\alpha$$

where $\theta_{min}$ is the diffraction angle of a first diffraction region with the smallest diffraction angle of the first-order diffracted light out of the plurality of diffraction regions in the diffraction grating, $\theta_{max}$ is the diffraction angle of a second diffraction region with the largest diffraction angle of the first-order diffracted light, and $\alpha$ and $\beta$ angles made by the grating directions of the first diffraction region and the second diffraction region with respect to the direction optically corresponding to the direction perpendicular to the track of the recording medium.

In an aspect of the present invention, the first diffraction region is a region for generating a beam to form an autotracking light spot on the recording medium, and the second diffraction region is a region for generating a beam to form an information reproducing light spot on the recording medium.

In an aspect of the present invention, a distance between a light spot on the recording medium, based on a third-order diffracted light beam diffracted by the first diffraction region, and a light spot on the recording medium, based on the zeroth-order diffracted light beam, is greater than a distance between a light spot on the recording medium, based on the first-order diffracted beam diffracted by the second diffraction region and a light spot on the recording medium, based on the zeroth-order diffracted beam.

The present invention also provides, as means for solving the above problems, an optical information recording and/or reproducing apparatus arranged to use a diffraction grating having a plurality of diffraction regions with different diffraction angles of first-order diffracted light to split a light beam emitted from a light source into beams of zeroth-order diffracted light, and first-order diffracted light and higher-order diffracted light of the second or higher order by the respective diffraction regions, to radiate at least the zeroth-order diffracted light and first-order diffracted light beams in the form of respective light spots onto an optical information recording medium, to detect beams from the respective light spots on the recording medium by respective photodetector elements, and thereby to record information in the recording medium and/or reproduce the recorded information therefrom by irradiation with the light spots, wherein the diffraction grating and the photodetector elements are arranged so that a position of at least one of the light spots on the recording medium, based on the higher-order diffracted beam, is substantially coincident with a position of either one of the light spots on the recording medium, based on the zeroth-order and first-order diffracted beams.

In one aspect of the present invention, a position of a light spot formed on the recording medium, based on the third-order diffracted beam from a region for generating a beam to form an autotracking light spot on the recording medium is substantially coincident with a position of an information reproducing light spot on the recording medium.

In an aspect of the present invention, the plurality of diffraction regions in the diffraction grating are a region for generating a beam to form an autotracking light spot on the recording medium, a region for generating a beam to form an information reproducing light spot on the recording medium, and a region for generating a beam to form a direct verifying light spot on the recording medium.

The present invention also provides, as means for solving the above problems, an optical information recording and/or reproducing apparatus arranged to dispose a diffraction grating comprised of two portions, a diffraction-grating-formed portion (diffraction region) and a diffraction-grating-unformed portion (non-diffraction region), so that the two portions are positioned in a beam from a light source, to split the beam into a plurality of beams and to irradiate an information track and a tracking track on a surface of an optical information recording medium, thereby recording and/or reproducing information, wherein the diffraction grating has a plurality of diffraction-grating-formed portions with different diffraction angles, among which one diffraction-grating-formed portion is arranged to be surrounded by the other diffraction-grating-formed portions and the diffraction-grating-unformed portion.

In an embodiment of the present invention, the diffraction grating has a plurality of diffraction-grating-formed portions with different diffraction angles, among which one diffraction-grating-formed portion is arranged to be surrounded by two other diffraction-grating-formed portions and two diffraction-grating-unformed portions. In this case, a beam of diffracted light by the diffraction-grating-formed portion arranged to be surrounded by the other diffraction-grating-formed portions and diffraction-grating-unformed portions is an autotracking beam.

The present invention also provides, as means for solving the above problems, an optical information recording and/or reproducing apparatus arranged to position a diffraction grating divided into a plurality of diffraction-grating-formed portions in a beam from a light source, to split the beam into a plurality of beams, and to radiate the beams onto an information track and a tracking track on a surface of an optical information recording medium, thereby recording and/or reproducing information, wherein the diffraction grating is formed so that grating lines of at least one diffraction-grating-formed portion are substantially parallel to a parting line for parting the diffraction-grating-formed portions from each other.

In an embodiment of the present invention, the shape of the plurality of diffraction-grating-formed portions is rectangular, and the diffraction-grating-formed portion having the grating lines substantially parallel to the parting line is arranged so as to be sandwiched between other diffraction-grating-formed portions. In this case, the grating lines approximately parallel to the parting line are substantially parallel to the tracking track. A beam of diffracted light by the grating lines substantially parallel to the parting line is an autotracking beam.

BRIEF DESCRIPTION OF THE DRAWINGS

FIG. 42A and 42B are schematic structural drawings where the diffraction grating and the aperture are integrally formed;

FIG. 43A and 43B are schematic structural drawings where the diffraction grating and the aperture are integrally formed;

FIG. 46A and 46B are schematic drawings to show the diffraction grating in the seventeenth embodiment of the optical information recording/reproducing apparatus according to the present invention;

FIG. 47 is a schematic drawing to show states of light spots formed on the optical card in the seventeenth embodiment of the optical information recording/reproducing apparatus according to the present invention;

FIG. 56 is a drawing to show various shapes of the diffraction-grating-formed portion for AT;

FIG. 61 is a drawing to show shapes of the diffraction-grating-formed portion for AT.

DETAILED DESCRIPTION OF THE PREFERRED EMBODIMENTS

The first embodiment of the present invention will be described in detail with reference to the drawings.

The first embodiment of the present invention is an optical information recording and/or reproducing apparatus for recording and/or reproducing information by radiating light spots onto an optical information recording medium, which has a diffraction grating 24' for splitting a light beam emitted from a light source into a plurality of beams, wherein the diffraction grating 24' is a diffraction grating in which a plurality of different diffraction regions are formed without overlapping with each other and which is arranged to split a beam incident thereto into a plurality of different beams by the plurality of diffraction regions to radiate the beams to the optical information recording medium.

Figure 9:
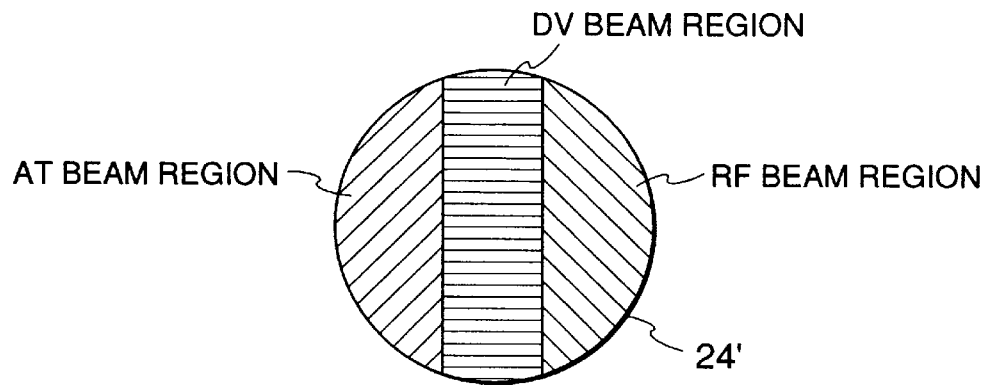
FIG. 9 is a schematic drawing of a diffraction grating of a first embodiment of the present invention.

FIG. 9 is a schematic drawing to show an example of the diffraction grating 24' used in the optical head of the optical information recording and/or reproducing apparatus according to the present invention. The present embodiment is different from the above apparatus in the conventional example of FIG. 3 only in that the diffraction grating shown in FIG. 9 is used instead of the diffraction grating 24 in the apparatus of the conventional example shown in FIG. 3 and in the shape of the light receiving elements for receiving the beams split by the diffraction grating. Therefore, the description of the entire apparatus is omitted herein.

FIG. 9 is a plan view of the diffraction grating 24', which is one of the characteristic components of the present invention. As shown in the drawing, there are three grating regions formed without overlapping with each other, which are an AT light region for forming an autotracking spot, a DV light region for forming a direct verifying spot, and an RF light region for forming a reproducing spot. The grating directions and grating pitches of the three regions are arbitrarily set. Here, grating patterns formed in the respective diffraction regions are different from each other.

Figure 10:
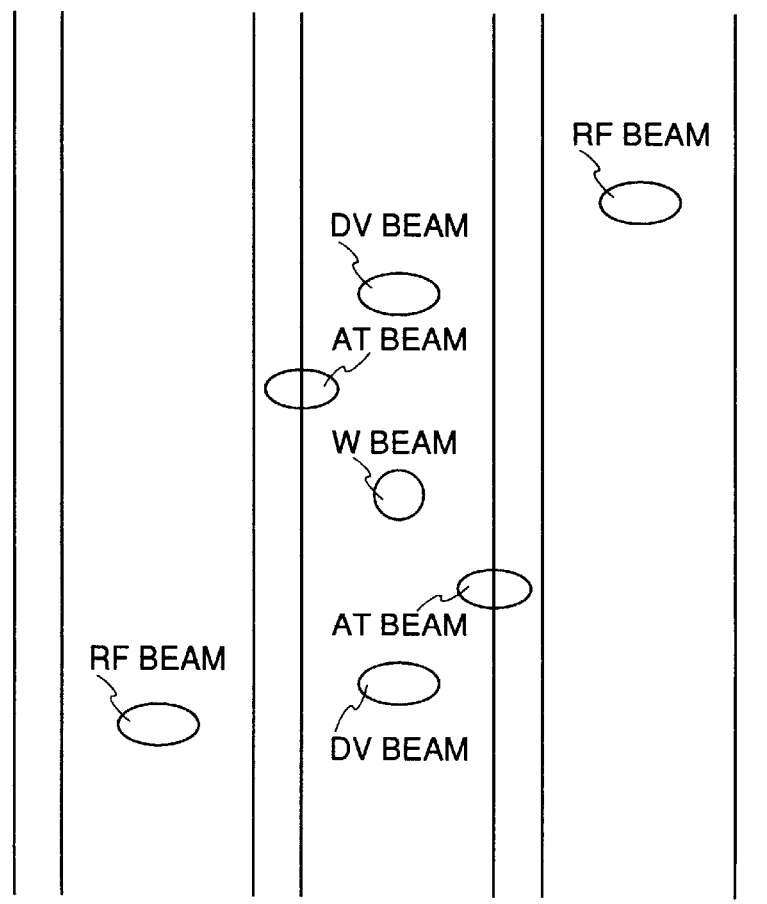
FIG. 10 is a drawing to show locations of respective spots on an optical card, formed by the diffraction grating of the first embodiment of the present invention.

When the diffraction grating 24' with the three diffraction regions is placed in the irradiation optical system, the diffracted light from each of the diffraction regions is split into a plurality of beams with different emerging directions, thus forming seven spots on the optical card, as shown in FIG. 10. They include six spots resulting from the ± first-order light from the diffraction grating of each region shown in FIG. 9, and a spot resulting from the zeroth-order beam passing through the diffraction grating 24' without being subjected to diffraction. The beam from the light source irradiates the three diffraction regions (AT light region, DV light region, and RF light region).

Figure 11:
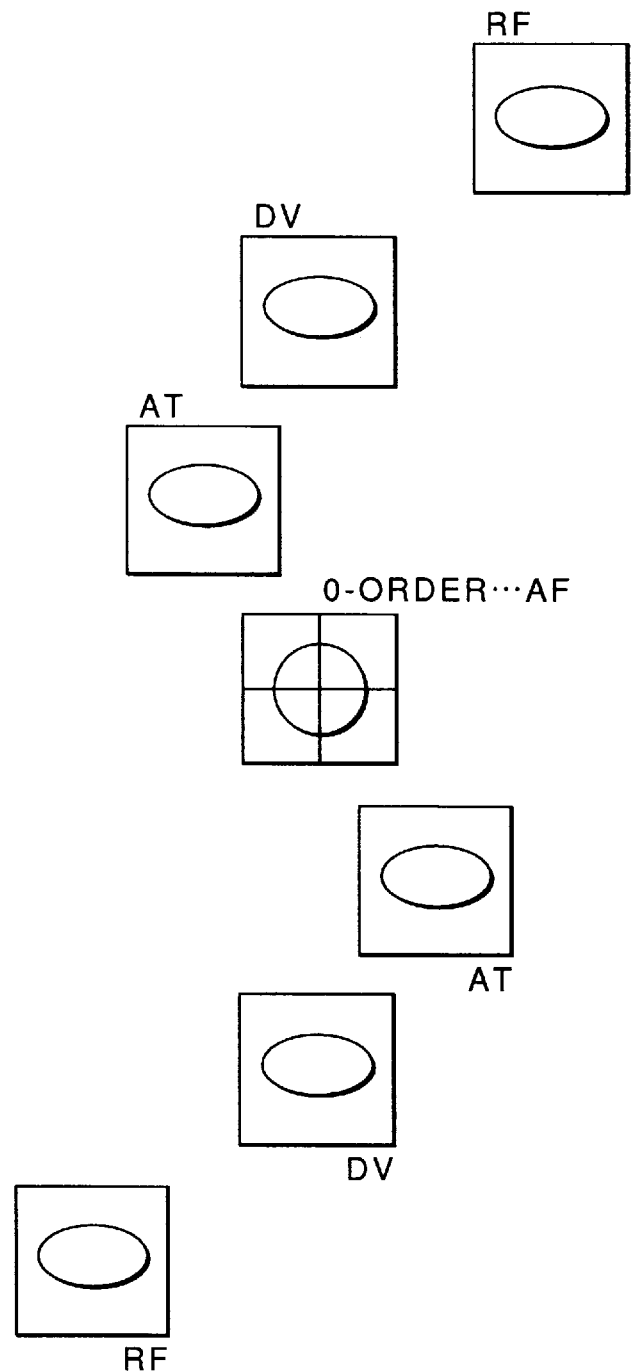
FIG. 11 is a drawing to show a relation between the shape and arrangement of a photodetector and light spots in the first embodiment of the present invention.

It is needless to mention that the spots on the optical card shown in FIG. 10 each correspond to the spots on the light receiving elements shown in FIG. 11 and are detected thereby. The light receiving elements in the photodetector 30 are arranged as shown in FIG. 11.

Next explained is how to perform the forward and backward recording and simultaneous reproduction of plural tracks, using the spots arranged in this manner.

First, upon recording, the zeroth-order light spot is used as a recording beam and the DV light spots positioned before and after the zeroth-order light spot in the track running direction are used to verify recorded information, regardless of the running direction of track. This enables the forward and backward recording.

Next, upon reproduction, three tracks can be simultaneously reproduced using the two RF light spots and the zeroth-order light spot (or a DV light spot), as shown in FIG. 10.

The AF control and AT control at this time are carried out as follows. The AF control is carried out by the astigmatic method, which is the same as in the conventional apparatus, as detecting reflected light from the zeroth-order light spot by the quartered element. The AT control is carried out by detecting reflected light from the two AT light spots shown in FIG. 10 by the respective elements and taking a difference between them.

The present embodiment is arranged to perform the AF control using the quartered light receiving element for receiving the reflected light of the zeroth-order light spot, but the AF control may be performed using either one or all of the elements for receiving the reflected light of the other light spots, i.e., the RF light spots and DV light spots in the quartered structure.

An example of a process for preparing such a diffraction grating having the plurality of diffraction regions is a method in which the regions other than a region to be subjected to formation of grating grooves are masked with a mask material such as chromium, the diffraction grating of the first region is then formed using a chemical agent for dissolving a substrate for diffraction grating, the regions other than a region next to be subjected to formation of grating grooves are next again masked, and thereafter, the second region is formed. Another example is a method for integrally forming it by a mold.

This diffraction grating may be a hologram. An example of a process for preparing such a hologram is a method for scribing interference patterns of the hologram using exposure to an electron beam so as to complete the hologram.

The above embodiment is an example having the separate type optical head, but the present invention can also be applied similarly to the apparatus having ordinary optical heads other than the separate optical head, without having to be limited to the separate type.

When compared with the invention as disclosed in the bulletin of Japanese Laid-open Patent Application No. 1-237940, which was described above as a conventional example, wherein the diffraction grating having a single diffraction region splits the beam from the light source into a plurality of beams to form a plurality of light spots on the optical memory medium, the embodiment of the present invention as described above permits the shapes, light quantities, or the like of the optical spots to be freely set spot by spot by controlling the shape of the diffraction grating region or the level differences of the diffraction grating, which confirms that the present invention is better in the idea and more effective in practical use.

In the first embodiment of the present invention, the seven spots can be focused on the optical card, as shown in FIG. 10, by the arrangement in which the diffraction grating 24' having the three diffraction regions as shown in FIG. 9 is disposed in the irradiation optical system. The diffraction regions are separated from each other by parting lines parallel to the track running direction.

This can form the six elliptical spots elongated in the track traversing direction from the ± first-order light spots diffracted by the respective diffraction regions and a nearly circular spot of the zeroth-order beam passing through the diffraction grating 24' without being affected by the diffraction action, as shown in FIG. 10. It is also needless to mention that the spots on the optical card shown in FIG. 10 each correspond to the spots on the light receiving elements shown in FIG. 11 and are detected thereby.

Next explained is how to perform the forward and backward recording and simultaneous reproduction of plural tracks, using the spots arranged in this manner.

First, upon recording, the zeroth-order light spot is used as a recording beam and the DV light spots positioned before and after the zeroth-order light spot in the track running direction are used to verify recorded information, regardless of the running direction of track. This enables the forward and backward recording.

Next, upon reproduction, three tracks can be simultaneously reproduced using the two RF light spots and the zeroth-order light spot (or, a DV light spot), as shown in FIG. 10.

The AF control and AT control at this time are carried out as follows. The AF control is carried out by the astigmatic method, which is the same as in the conventional apparatus, as detecting the reflected light from the zeroth-order light spot by the quartered element. The AT control is carried out by detecting the reflected light from the two AT light spots shown in FIG. 10 and taking a difference between them.

The present embodiment is arranged to perform the AF control using the quartered light receiving element for. receiving the reflected light of the zeroth-order light spot, but the AF control may be performed using either one or all of the elements for receiving the reflected light of the other light spots, i.e., the RF light spots and DV light spots in the quartered structure.

Since the diffraction regions of the diffraction grating in the present embodiment are separated by the parting lines parallel to the track running direction, each spot obtained by diffraction (each spot of AT, RF, DV) can be formed in a spot shape elongated in the track traversing direction, as shown in FIG. 10, by which the control can be carried out stably as being resistant to the deviation in the track traversing direction (AT offset).

Figure 12:
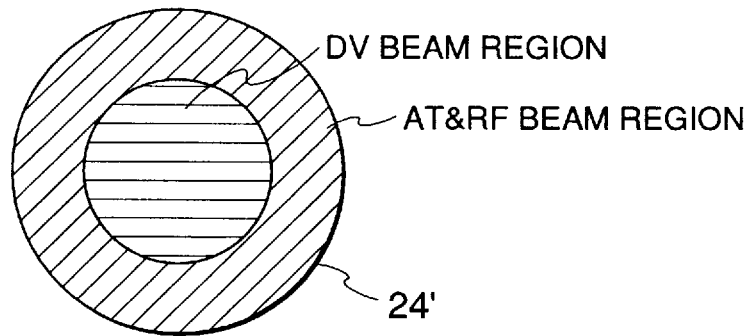
FIG. 12 is a schematic drawing to show a diffraction grating of the second embodiment of the present invention.

The second embodiment of the present invention will be explained in detail with reference to the drawings. FIG. 12 is a schematic drawing to show an example of the diffraction grating 24' used in the optical head of the optical information recording and/or reproducing apparatus according to the present invention. The present embodiment is different from the above apparatus in the conventional example of FIG. 3 only in that the diffraction grating shown in FIG. 12 is used instead of the diffraction grating 24 in the apparatus of the conventional example shown in FIG. 3 and in the shape of the light receiving elements for receiving the beams split by the diffraction grating. Therefore, the description of the entire apparatus is omitted herein.

The diffraction grating of the present embodiment has two diffraction regions formed without overlapping with each other, which are a diffraction region for DV light formed in a circular region on the center side of concentric circles and a diffraction region for AT light and RF light formed in a circumferential region surrounding the periphery of the circular region, as shown in FIG. 12. Here, grating patterns formed in the respective diffraction regions are different from each other.

Figure 13:
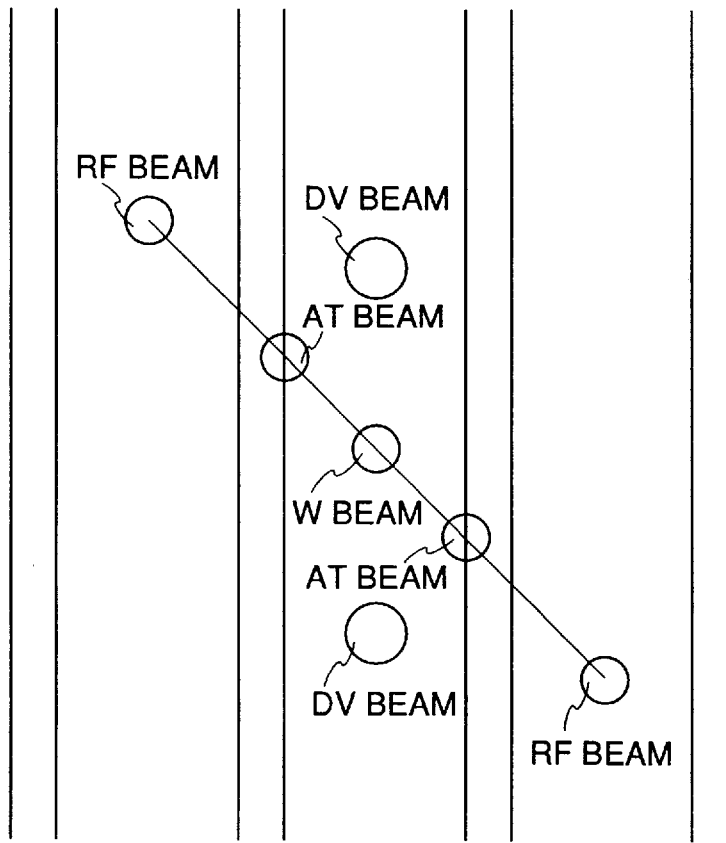
FIG. 13 is a drawing to show locations of respective spots on the optical card, formed by the diffraction grating of the second embodiment of the present invention.

When this diffraction grating 24' is disposed in the irradiation optical system, seven spots are formed on the optical card, as shown in FIG. 13. They include, as shown in FIG. 12, six spots from the ± first-order diffracted light of the DV region and the ± first-order (AT) and ± third-order (RF) diffracted light of the AT and RF region and a spot of the zeroth-order beam passing through the diffraction grating 24' without being subjected to the diffraction action.

Since the diffraction grating of the present embodiment forms the AT light spots and RF light spots by diffraction from the same diffraction region as described above, it can lower the probability that positional deviation occurs of the AT light spots and the RF light spots because of manufacturing errors (errors in the pitch, inclination of grating, etc.) of the diffraction grating and, if it should occur, the AT offset or RF offset could be prevented from occurring by rotating the diffraction grating to effect fine adjustment.

Figure 14:
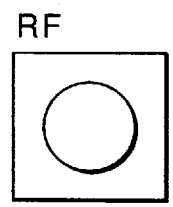
FIG. 14 is a drawing to show a relation between the shape and arrangement of a photodetector and light spots in the second embodiment of the present invention.
Figure 14:
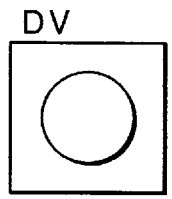
Figure 14:
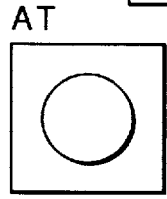
Figure 14:
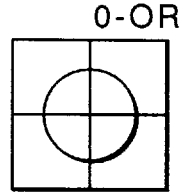
Figure 14:
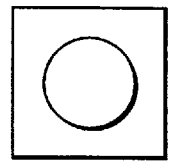
Figure 14:
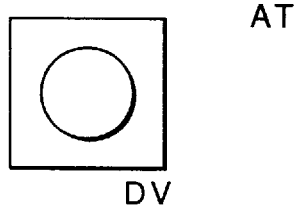
Figure 14:
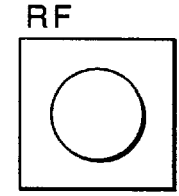

It is also needless to mention that the spots on the optical card shown in FIG. 13 each correspond to the spots on the light receiving elements shown in FIG. 14 and are detected thereby. The light receiving elements of the photodetector 30 are arranged as shown in FIG. 14.

Next explained is how to perform the forward and backward recording and simultaneous reproduction of plural tracks, using the spots arranged in this manner.

First, upon recording, the zeroth-order light spot is used as a recording beam and the DV light spots positioned before and after the zeroth-order light spot in the track running direction are used to verify recorded information, regardless of the running direction of the track. This enables the forward and backward recording.

Next, upon reproduction, three tracks can be simultaneously reproduced using the two RF light spots and the zeroth-order light spot (or, a DV light spot), as shown in FIG. 13.

The AF control and AT control at this time are carried out as follows. The AF control is carried out by the astigmatic method, which is the same as in the conventional apparatus, as detecting the reflected light from the zeroth-order light spot by the quartered element. The AT control is carried out by detecting the reflected light from the two AT light spots shown in FIG. 13 and taking a difference between them.

The present embodiment is arranged to perform the AF control using the quartered light receiving element for receiving the reflected light of the zeroth-order light spot, but the AF control may be performed using either one or all of the elements for receiving the reflected light of the other light spots, i.e., the RF light spots and DV light spots in the quartered structure.

The above embodiment showed an example having the separate type optical head, but the present invention can also be applied similarly to the apparatus having ordinary optical heads other than the separate type, without having to be limited to the separate type.

Figure 15:
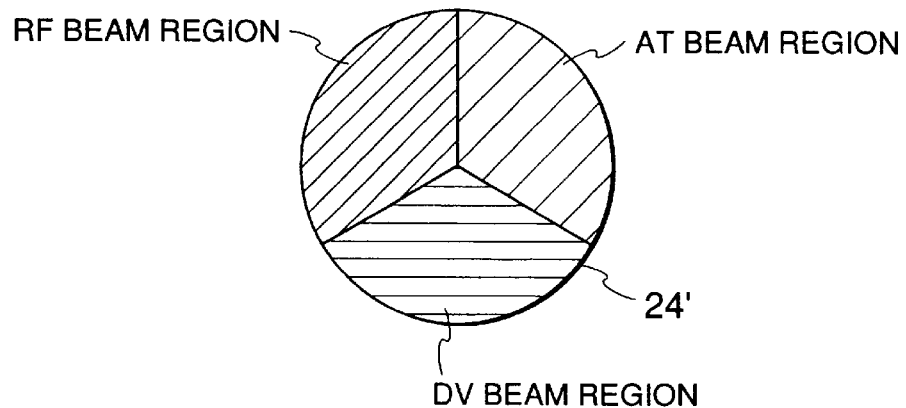
FIG. 15 is a schematic drawing to show a diffraction grating of the third embodiment of the present invention.

The third embodiment of the present invention will be explained in detail with reference to the drawings. FIG. 15 is a schematic drawing to show an example of the diffraction grating 24' used in the optical head of the optical information recording and/or reproducing apparatus according to the present invention. The present embodiment is different from the above apparatus in the conventional example of FIG. 3 only in that the diffraction grating shown in FIG. 15 is used instead of the diffraction grating 24 in the apparatus of the conventional example shown in FIG. 3 and in the shape of the light receiving elements for receiving the beams split by the diffraction grating. Therefore, the description of the entire apparatus is omitted herein.

The diffraction grating of the present embodiment has three diffraction regions shown in FIG. 15, which are three diffraction regions of a fan shape obtained by trisecting the diffraction grating at intervals of 120° about the optical axis at the center. They are used as the diffraction regions for AT light, for RF light, and for DV light, and then six light spots of DV light, AT light, and RF light diffracted from the respective diffraction regions can be obtained in a same light quantity without changing the level differences of diffraction gratings of the respective regions (so that the diffraction efficiencies are constant throughout all regions). In this example, grating patterns formed in the respective diffraction regions are different from each other.

Figure 16:
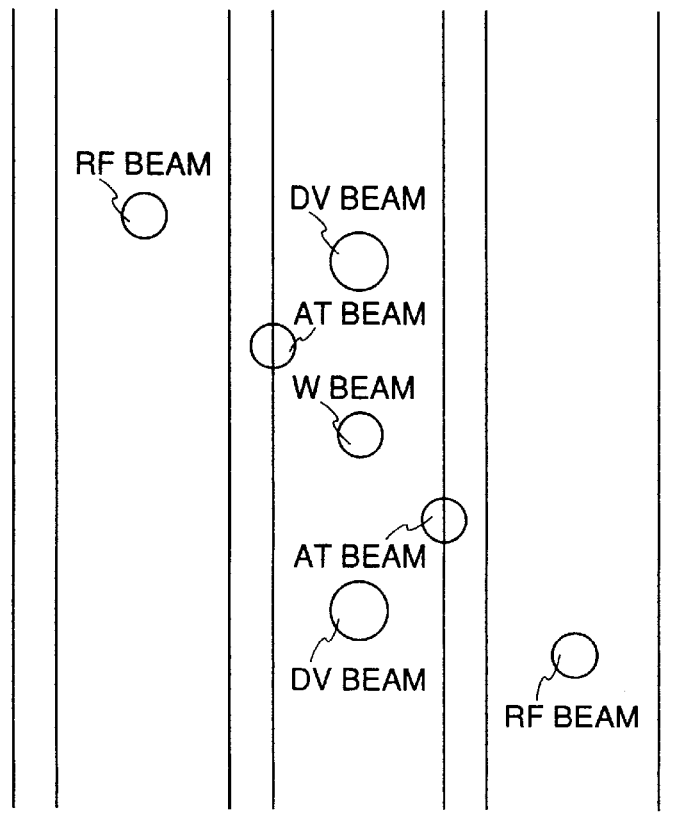
FIG. 16 is a drawing to show locations of respective spots on the optical card, formed by the diffraction grating of the third embodiment of the present invention.

When this diffraction grating 24' is disposed in the irradiation optical system, seven spots are formed on the optical card, as shown in FIG. 16. They include six spots from the ± first-order light beams by the respective diffraction gratings in the regions shown in FIG. 15 and a spot of the zeroth-order beam passing through the diffraction grating 24' without being affected by the diffraction effect. It is also needless to mention that the spots on the optical card shown in FIG. 16 each correspond to the spots on the light receiving elements shown in FIG. 14 and are detected thereby. The light receiving elements of the photodetector 30 are arranged as shown in FIG. 14.

Next explained is how to perform the forward and backward recording and simultaneous reproduction of plural tracks, using the spots arranged in this manner.

First, upon recording, the zeroth-order light spot is used as a recording beam and the DV light spots positioned before and after the zeroth-order light spot in the track running direction are used to verify recorded information, regardless of the running direction of the track. This enables the forward and backward recording.

Next, upon reproduction, three tracks can be simultaneously reproduced using the two RF light spots and the zeroth-order light spot (or, a DV light spot), as shown in FIG. 16.

The AF control and AT control at this time are carried out as follows. The AF control is carried out by the astigmatic method, which is the same as in the conventional apparatus, as detecting the reflected light from the zeroth-order light spot by the quartered element. The AT control is carried out by detecting the reflected light from the two AT light spots shown in FIG. 16 and taking a difference between them.

The present embodiment is arranged to perform the AF control using the quartered light receiving element for receiving the reflected light of the zeroth-order light spot, but the AF control may be performed using either one or all of the elements for receiving the reflected light of the other light spots, i.e., the RF light spots and DV light spots in the quartered structure.

The above embodiment showed an example having the separate type optical head, but the present invention can also be applied similarly to the apparatus having ordinary optical heads other than the separate type, without having to be limited to the separate type.

By the arrangement of the third embodiment of the present invention wherein the diffraction regions are formed in the fan-shaped diffraction gratings sectored at intervals of 120° about the optical axis at the center, the same light quantity can be achieved for the six light spots of DV light, AT light, and RF light diffracted by the respective diffraction regions without changing the level differences of diffraction gratings of the respective regions (so that the diffraction efficiencies are constant throughout all regions).

This arrangement of the same light quantity for the six beams makes control of the light quantity easy during each of recording and reproduction and permits the range of control of LD light quantity to be set smaller. Namely, the LD needs to emit a beam with high power upon recording, but there are such conditions that the upper limit thereof should be determined to satisfy the power necessary for recording with recording light and prevent a light spot other than the recording light (the zeroth-order light) from recording information and that the lower limit should be determined on balance to set the light quantity in the permissible range of crosstalk effected by the recording light (the zeroth-order light) on the other light (RF, DV, AT) and not to cause degradation of reproducing light by the recording light.

It is further explained in detail with an example.

Let us suppose here that a distribution ratio of light quantities of the diffraction grating is determined as recording light:DV light:AT light:RF light=20:3:2:1, the light quantity necessary for recording is 20 or more mW, the unrecordable condition is 3 or less mW, the condition not to cause the degradation of reproducing light is 1 or less mW, and the light quantity for permissible crosstalk is 0.05 or more mW. Further assuming that 90% of the emission light quantity of LD is incident as effective spots onto the optical card, when the emission light quantity of LD is approximately 36 mW, the ratio of light quantities upon recording is given as recording light:DV light:AT light:RF light=20 mW:3 mW:2 mW:1 mW.

In contrast with it, upon reproduction, when the light emission quantity of the LD is approximately 1.8 mW, the ratio of light quantities is given as recording light (the zeroth-order light):DV light:AT light:RF light=1 mW:0.15 mW:0.1 mW:0.05 mW.

Next, calculation is for the case of DV light=AT light=RF light as in the present invention. The conditions for calculation are the same as the above calculation except that the ratio is recording light:DV light:AT light:RF light=20:1:1:1.

Upon recording, when the light emission quantity of the LD is approximately 29 mW, the ratio of light quantities is given as recording light:DV light:AT light:RF light=20 mW:1 mW:1mW:1 mW, which assures that recording can be made with lower power than in the above calculation.

Upon reproduction, when the light emission quantity of the LD is approximately 1.3 mW, the light quantities are given as recording light (the zeroth-order light):DV light:AT light:RF light=1 mW:0.05 mW:0.05 mW:0.05 mW.

As explained above, in the present invention, the light is distributed so as to be DV light=AT light=RF light, which can decrease the range (difference) between the light emission quantities of the LD upon recording and upon reproduction and which can decrease the light emission quantity of the LD upon recording and can also decrease the power of the LD used.

Therefore, the present invention can provide an optical head which is easy in control of light quantity and which can use a low-power LD.

Figure 17:
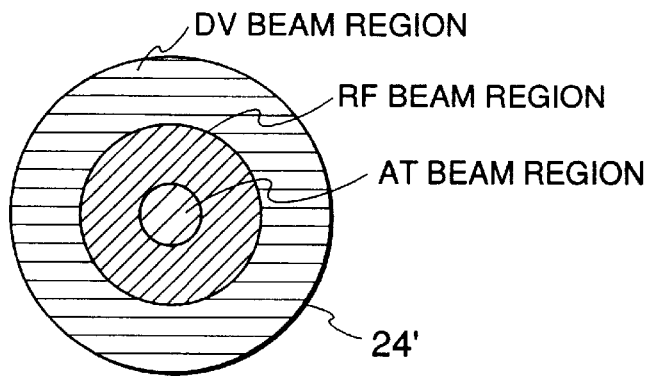
FIG. 17 is a schematic drawing to show a diffraction grating of the fourth embodiment of the present invention.

The fourth embodiment of the present invention will be explained in detail with reference to the drawings. FIG. 17 is a schematic drawing to show an example of the diffraction grating 24' used in the optical head of the optical information recording and/or reproducing apparatus according to the present invention. The present embodiment is different from the above apparatus in the conventional example of FIG. 3 only in that the diffraction grating shown in FIG. 17 is used instead of the diffraction grating 24 in the apparatus of the conventional example shown in FIG. 3 and in the shape of the light receiving elements for receiving the beams split by the diffraction grating. Therefore, the description of the entire apparatus is omitted herein.

The diffraction grating used in the present embodiment has three diffraction regions concentrically separated about the optical axis at the center, as shown in FIG. 17. The central circular region is used for AT light, the circumferential region outside the central region is for RF light, and the circumferential region further outside the RF circumferential region is for DV light. In this example, grating patterns formed in the respective grating regions are different from each other.

By the arrangement wherein the diffraction grating is divided into the three diffraction regions so that quantities of light impinging on the respective diffraction regions may be equal to each other, the same light quantity can be attained for six light spots of DV light, AT light, and RF light diffracted by the respective diffraction regions without changing the level differences of diffraction gratings of the respective regions (so that the diffraction efficiencies are constant throughout all regions).

Figure 18:
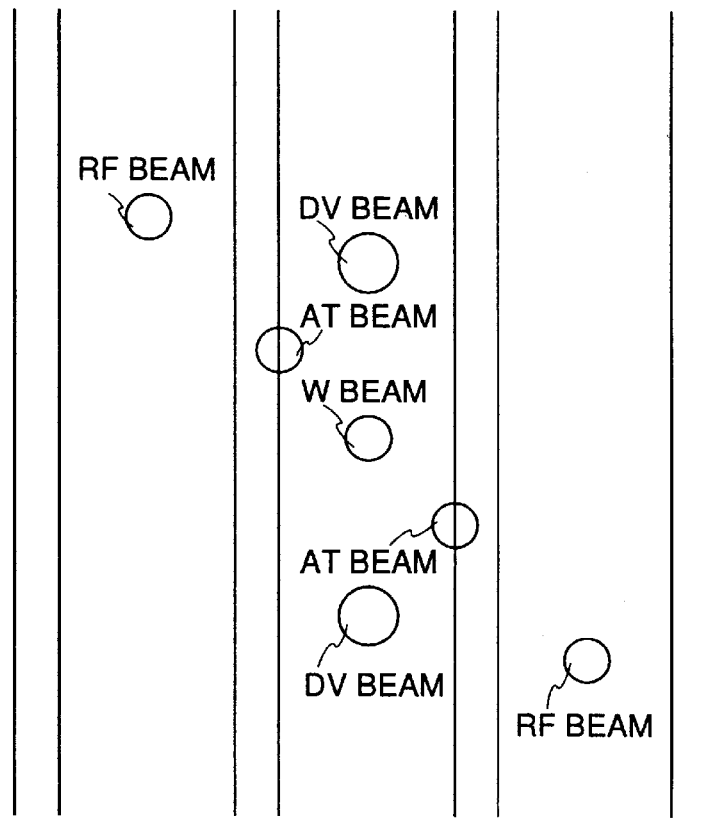
FIG. 18 is a drawing to show locations of respective spots on the optical card, formed by the diffraction grating of the fourth embodiment of the present invention.

When the diffraction grating 24' having the three diffraction regions is positioned in the irradiation optical system, as shown in FIG. 17, in the present embodiment, seven spots are formed on the optical card, as shown in FIG. 18. They include six spots from the ± first-order diffracted light beams by the diffraction gratings of the respective regions shown in FIG. 17 and a spot of the zeroth-order beam passing through the diffraction grating 24' without being affected by the diffraction effect. It is also needless to mention that the spots on the optical card shown in FIG. 18 each correspond to the spots on the light receiving elements shown in FIG. 14 and are detected thereby. The light receiving elements of the photodetector 30 are arranged as shown in FIG. 14.

Next explained is how to perform the forward and backward recording and simultaneous reproduction of plural tracks, using the spots arranged in this manner.

First, upon recording, the zeroth-order light spot is used as a recording beam and the DV light spots positioned before and after the zeroth-order light spot in the track running direction are used to verify recorded information, regardless of the running direction of the track. This enables the forward and backward recording.

Next, upon reproduction, three tracks can be simultaneously reproduced using the two RF light spots and the zeroth-order light spot (or, a DV light spot), as shown in FIG. 18.

The AF control and AT control at this time are carried out as follows. The AF control is carried out by the astigmatic method, which is the same as in the conventional apparatus, as detecting the reflected light from the zeroth-order light spot by the quartered element. The AT control is carried out by detecting the reflected light from the two AT light spots shown in FIG. 18 and taking a difference between them.

The present embodiment is arranged to perform the AF control using the quartered light receiving element for receiving the reflected light of the zeroth-order light spot, but the AF control may be performed using either one or all of the elements for receiving the reflected light of the other light spots, i.e., the RF light spots and DV light spots in the quartered structure.

The above embodiment showed an example having the separate type optical head, but the present invention can also be applied similarly to the apparatus having ordinary optical heads other than the separate type, without having to be limited to the separate type.

By the arrangement of the embodiment of the present invention in which the diffraction grating is split into the regions concentric about the optical axis at the center and equal in light quantity on the respective diffraction regions, the same quantity can be attained for the six light spots of DV light, AT light, and RF light diffracted by the respective diffraction regions without changing the level differences of diffraction gratings of the respective regions (so that the diffraction efficiencies are constant throughout all regions).

Figure 19:
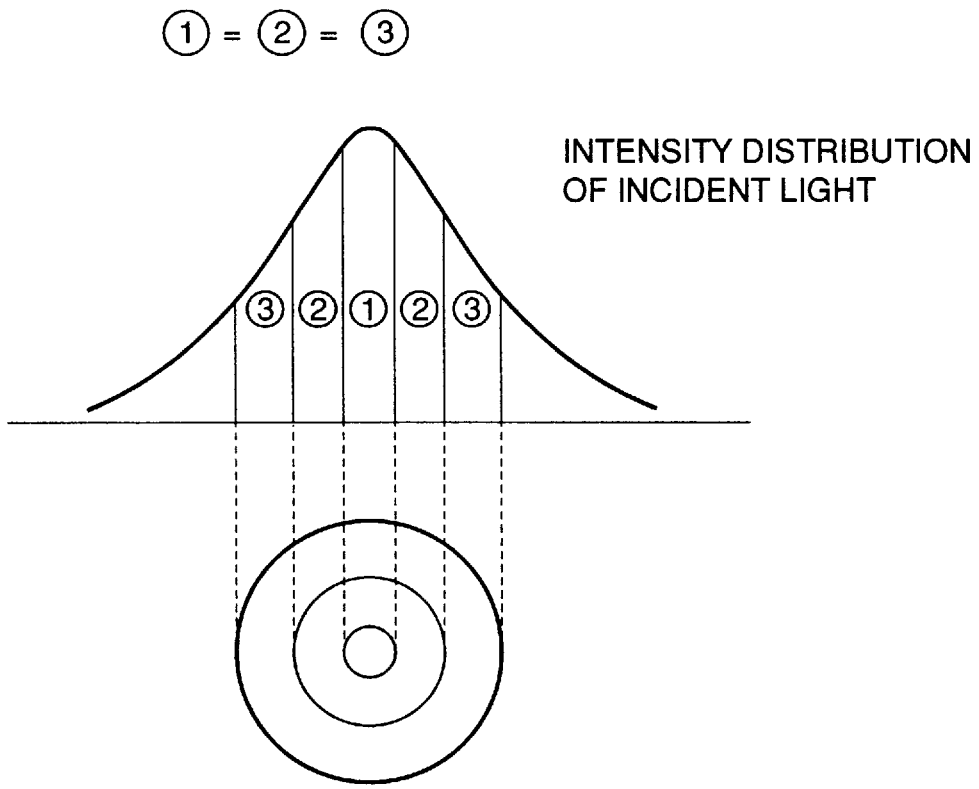
FIG. 19 is a drawing to show an intensity distribution of incident light and efficiencies of respective diffraction regions in the fourth embodiment of the present invention.

FIG. 19 is a drawing to show an intensity distribution of the light incident to the diffraction grating of the fourth embodiment of the present invention.

The present embodiment employed a semiconductor laser as a light source.

Figure 20:
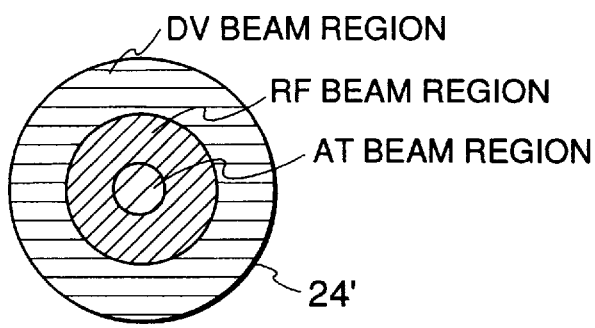
FIG. 20 is a schematic drawing to show a diffraction grating of the fifth embodiment of the present invention.

The fifth embodiment of the present invention will be explained in detail with reference to the drawings. FIG. 20 is a schematic drawing to show an example of the diffraction grating 24' used in the optical head of the optical information recording and/or reproducing apparatus according to the present invention. The present embodiment is different from the above apparatus in the conventional example of FIG. 3 only in that the diffraction grating shown in FIG. 20 is used instead of diffraction grating 24 in the apparatus of the conventional example shown in FIG. 3 and in the shape of the light receiving elements for receiving the beams split by the diffraction grating. Therefore, the description of the entire apparatus is omitted herein.

Figure 21:
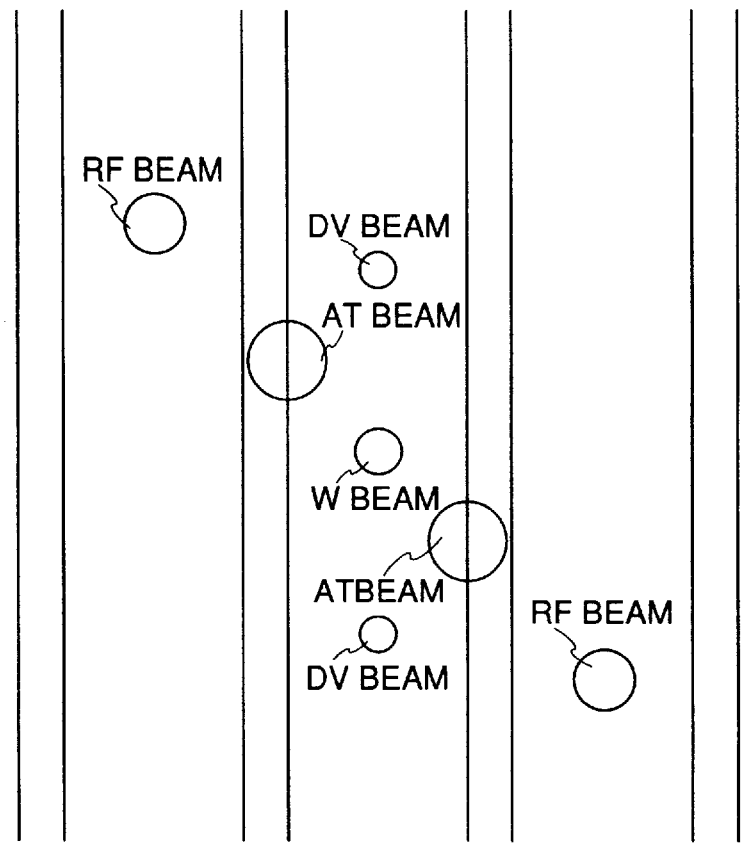
FIG. 21 is a drawing to show locations of respective spots on the optical card, formed by the diffraction grating of the fifth embodiment of the present invention.

In the present embodiment, when the diffraction grating 24' having the three diffraction regions as shown in FIG. 20 is disposed in the irradiation optical system, seven spots are formed on the optical card, as shown in FIG. 21. They include six spots from the ± first-order diffracted light beams by the diffraction gratings in the respective regions shown in FIG. 20 and a spot of the zeroth-order beam passing through the diffraction grating 24' without being affected by the diffraction effect. It is also needless to mention that the spots on the optical card shown in FIG. 21 each correspond to the spots on the light receiving elements shown in FIG. 14 and are detected thereby.

Next explained is how to perform the forward and backward recording and simultaneous reproduction of plural tracks, using the spots arranged in this manner.

First, upon recording, the zeroth-order light spot is used as a recording beam and the DV light spots positioned before and after the zeroth-order light spot in the track running direction are used to verify recorded information, regardless of the running direction of the track. This enables the forward and backward recording.

Next, upon reproduction, three tracks can be simultaneously reproduced using the two RF light spots and the zeroth-order light spot (or, a DV light spot), as shown in FIG. 21.

The AF control and AT control at this time are carried out as follows. The AF control is carried out by the astigmatic method, which is the same as in the conventional apparatus, as detecting the reflected light from the zeroth-order light spot by the quartered element. The AT control is carried out by detecting the reflected light from the two AT light spots shown in FIG. 21 and taking a difference between them.

The present embodiment is arranged to perform the AF control using the quartered light receiving element for receiving the reflected light of the zeroth-order light spot, but the AF control may be performed using either one or all of the elements for receiving the reflected light of the other light spots, i.e., the RF light spots and DV light spots in the quartered structure.

The above embodiment showed an example having the separate type optical head, but the present invention can also be applied similarly to the apparatus having ordinary optical heads other than the separate type, without having to be limited to the separate type.

Employing the diffraction grating in which the three concentric regions are formed about the optical axis at the center as in the fifth embodiment of the present invention and are arranged in the order of (region for AT light), (region for RF light), and (region for DV light) from inside, the diameters of the spots on the optical card can be determined as follows:

(AT light spot)$\geq$(DV light spot)

(RF light spot)$\geq$(DV light spot);

or (AT light spot)$\geq$(RF light spot)$\geq$(DV light spot).

The reasons why the diameters of the respective spots were determined in this manner result from the roles of the respective spots and easiness of occurrence of AT offset. Namely, since the AT light spots are important light governing the AT control, they are formed in the large diameter, expecting stable control resistant to AT offset or the like. Further, the RF light spots are also formed in the large diameter, whereby the control can be stable against AT offset so as to obtain stable signals.

Here, a first conceivable cause of the AT offset is an error in positions of the light spots due to a pitch error of the diffraction grating. Therefore, the AT light and RF light spots formed by oblique diffraction are likely to cause the AT offset with respect to the arrangement, and the influence thereof can be greatly decreased by increasing the spot diameter as described above.

As for the DV light spots, even if the diffraction grating has the pitch error, the light spots move in the track running direction on the center of the track so as to cause no AT offset, and therefore, the small spots suffice.

The above setting of the spot configurations is determined based on the following ideas.

(1) The diameters of the DV and RF light must be small in the track running direction in order to decrease the influence of jitter contained in reproduction signals.

(2) The diameters of the DV, RF, and AT light are preferably as large as possible in the track traversing direction (within the range not to touch an adjacent pit or guide track), because it broadens the AT pulling range as to the AT light and because a larger spot diameter causes a smaller change of reflected light from a pit due to positional deviation in the track traversing direction as to the DV and RF light. However, since the DV light traces the same locus as the recording light does, the positional deviation is presumably little in the track traversing direction. Thus, the spot diameter of the DV light may be set small.

The shape of the diffraction grating of the present invention was determined based on the above ideas.

Figure 22:
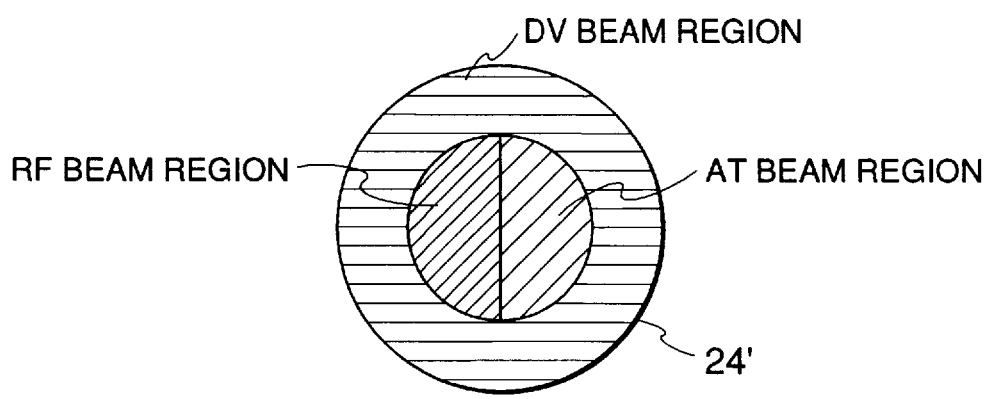
FIG. 22 is a schematic drawing to show a diffraction grating of the sixth embodiment of the present invention.

The sixth embodiment of the present invention will be explained in detail with reference to the drawings. FIG. 22 is a schematic drawing to show an example of the diffraction grating 24' used in the optical head of the optical information recording and/or reproducing apparatus according to the present invention. The present embodiment is different from the above apparatus in the conventional example of FIG. 3 only in that the diffraction grating shown in FIG. 22 is used instead of the diffraction grating 24 in the apparatus of the conventional example shown in FIG. 3 and in the shape of the light receiving elements for receiving the beams split by the diffraction grating. Therefore, the description of the entire apparatus is omitted herein.

Figure 23:
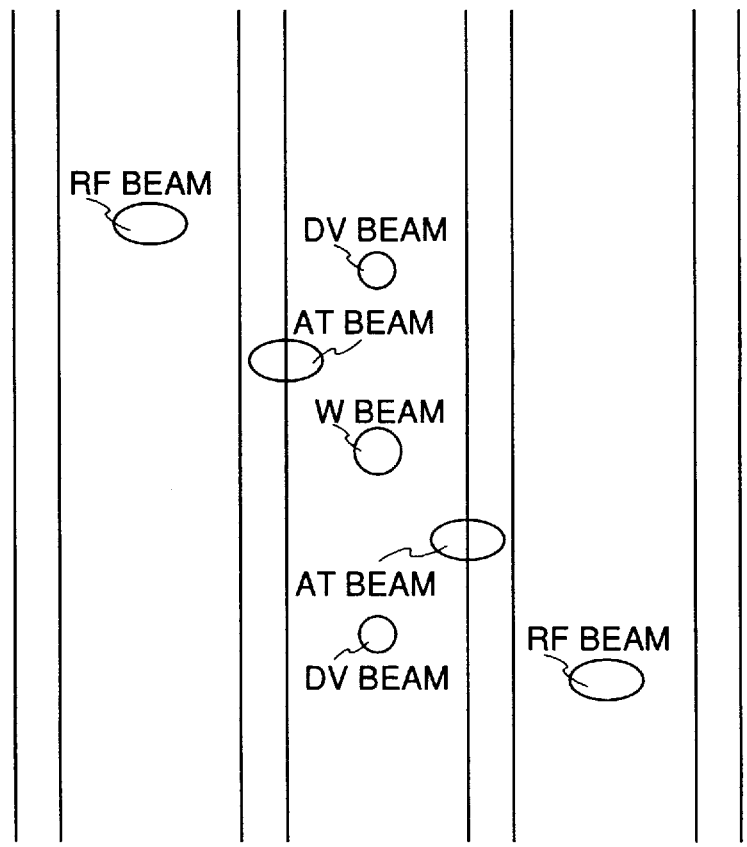
FIG. 23 is a drawing to show locations of respective spots on the optical card, formed by the diffraction grating of the sixth embodiment of the present invention.

In the present embodiment, when the diffraction grating 24' having the three diffraction regions as shown in FIG. 22 is disposed in the irradiation optical system, seven spots are formed on the optical card, as shown in FIG. 23. They include six spots from the ± first-order diffracted light beams by the diffraction gratings in the respective regions shown in FIG. 22, and a spot of the zeroth-order beam passing through the diffraction grating 24' without being subjected to the diffraction effect. It is also needless to mention that the spots on the optical card shown in FIG. 23 each correspond to the spots on the light receiving elements shown in FIG. 14 and are detected thereby.

Next explained is how to perform the forward and backward recording and simultaneous reproduction of plural tracks, using the spots arranged in this manner.

First, upon recording, the zeroth-order light spot is used as a recording beam and the DV light spots positioned before and after the zeroth-order light spot in the track running direction are used to verify recorded information, regardless of the running direction of the track. This enables the forward and backward recording.

Next, upon reproduction, three tracks can be simultaneously reproduced using the two RF light spots and the zeroth-order light spot (or, a DV light spot), as shown in FIG. 23.

The AF control and AT control at this time are carried out as follows. The AF control is carried out by the astigmatic method, which is the same as in the conventional apparatus, as detecting the reflected light from the zeroth-order light spot by the quartered element. The AT control is carried out by detecting the reflected light from the two AT light spots shown in FIG. 23 and taking a difference between them.

The present embodiment is arranged to perform the AF control using the quartered light receiving element for receiving the reflected light of the zeroth-order light spot, but the AF control may be performed using either one or all of the elements for receiving the reflected light of the other light spots, i.e., the RF light spots and DV light spots in the quartered structure.

The above embodiment showed an example having the separate type optical head, but the present invention can also be applied similarly to the apparatus having ordinary optical heads other than the separate type, without having to be limited to the separate type.

By such an arrangement that the diffraction grating is split into two concentric regions about the optical axis at the center, and the region inside the inner circle is further split into two regions at the center in the track running direction, and the (AT light region) and (RF light region) are positioned inside while the (DV light region) is positioned outside as in the sixth embodiment of the present invention, the diameters of the spots on the optical card are arranged as follows:

(AT light spot)=(RF light spot)≧(DV light spot).

The reasons why the diameters of the respective spots were determined in this manner result from the roles of the respective spots and easiness of occurrence of AT offset. Namely, since the AT light spots are important light governing the AT control, they are formed in the large diameter, expecting stable control resistant to AT offset or the like. Further, the RF light spots are also formed in the large diameter, whereby the control can be stable against AT offset so as to obtain stable signals.

Here, a first conceivable cause of the AT offset is an error in positions of light spots due to a pitch error of the diffraction grating. Therefore, the AT light and RF light spots formed by oblique diffraction are likely to cause the AT offset with respect to the arrangement and the influence thereof can be greatly decreased by increasing the spot diameter as described above.

As for the DV light spots, even if the diffraction grating has the pitch error, the light spots move in the track running direction on the center of the track so as to cause no AT offset, and therefore, the small spots suffice.

Figure 24:
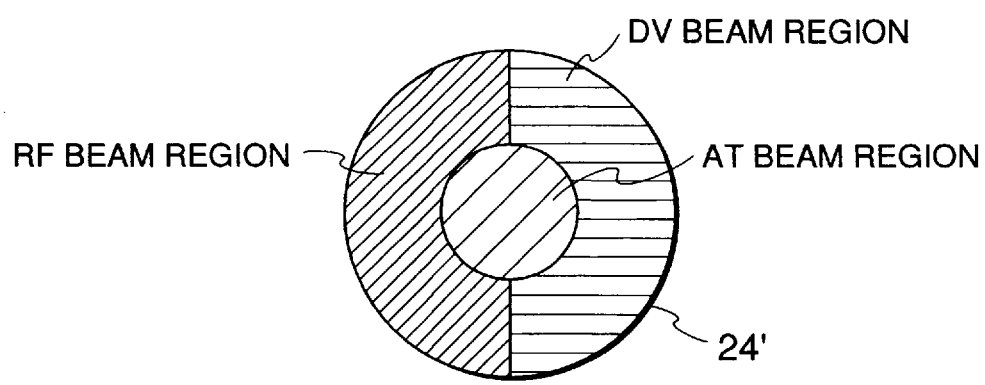
FIG. 24 is a schematic drawing to show a diffraction grating of the seventh embodiment of the present invention.

The seventh embodiment of the present invention will be explained in detail with reference to the drawings. FIG. 24 is a schematic drawing to show an example of the diffraction grating 24' used in the optical head of the optical information recording and/or reproducing apparatus according to the present invention. The present embodiment is different from the above apparatus in the conventional example of FIG. 3 only in that the diffraction grating shown in FIG. 24 is used instead of the diffraction grating 24 in the apparatus of the conventional example shown in FIG. 3 and in the shape of the light receiving elements for receiving the beams split by the diffraction grating. Therefore, the description of the entire apparatus is omitted herein.

Figure 25:
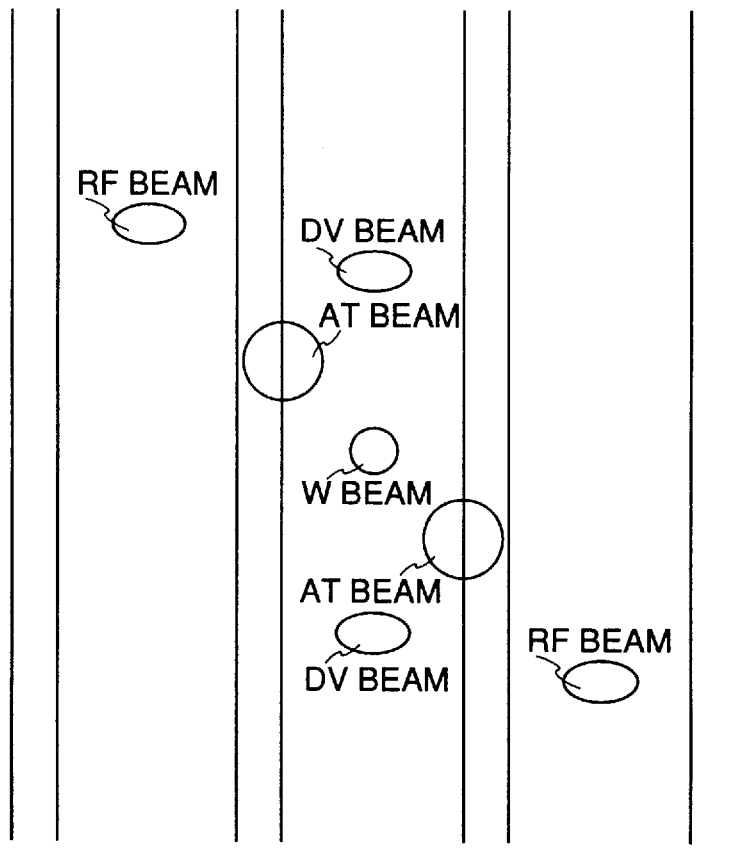
FIG. 25 is a drawing to show locations of respective spots on the optical card, formed by the diffraction grating of the seventh embodiment of the present invention.

In the present embodiment, when the diffraction grating 24' having the three diffraction regions as shown in FIG. 24 is disposed in the irradiation optical system, seven spots are formed on the optical card, as shown in FIG. 25. They include six spots from the ± first-order diffracted light beams by the diffraction gratings in the respective regions shown in FIG. 24, and a spot of the zeroth-order beam passing through the diffraction grating 24' without being subjected to the diffraction effect. It is also needless to mention that the spots on the optical card shown in FIG. 25 each correspond to the spots on the light receiving elements shown in FIG. 14 and are detected thereby.

Next explained is how to perform the forward and backward recording and simultaneous reproduction of plural tracks, using the spots arranged in this manner.

First, upon recording, the zeroth-order light spot is used as a recording beam and the DV light spots positioned before and after the zeroth-order light spot in the track running direction are used to verify recorded information, regardless of the running direction of the track. This enables the forward and backward recording.

Next, upon reproduction, three tracks can be simultaneously reproduced using the two RF light spots and the zeroth-order light spot (or, a DV light spot), as shown in FIG. 25.

The AF control and AT control at this time are carried out as follows. The AF control is carried out by the astigmatic method, which is the same as in the conventional apparatus, as detecting the reflected light from the zeroth-order light spot by the quartered element. The AT control is carried out by detecting the reflected light from the two AT light spots shown in FIG. 25 and taking a difference between them.

The present embodiment is arranged to perform the AF control using the quartered light receiving element for receiving the reflected light of the zeroth-order light spot, but the AF control may be performed using either one or all of the elements for receiving the reflected light of the other light spots, i.e., the RF light spots and DV light spots in the quartered structure.

The above embodiment showed an example having the separate type optical head, but the present invention can also be applied similarly to the apparatus having ordinary optical heads other than the separate type, without having to be limited to the separate type.

By such an arrangement that the diffraction grating is split into two concentric regions about the optical axis at the center, the peripheral region outside the circular region is split into two regions at the center in the track running direction, and the (DV light region) and (RF light region) are positioned outside while the (AT light region) is positioned inside as in the seventh embodiment of the present invention, the diameters of the spots on the optical card in the track running direction are arranged as follows:

(AT light spot)≧(RF light spot)=(DV light spot).

The reasons why the diameters of the respective spots were determined in this manner result from the roles of the respective spots. Namely, the light spots for RF and DV are desirably as small in the track direction as possible because of their role to read pits written in the optical card. This is because a larger spot diameter in the track direction relative to the pits would cause jitter or the like so as to degrade the reproduction signals considerably. In contrast, the AT light spots may have a large diameter in the track running direction as permitting control without any trouble.

Therefore, the configurations of the spots on the optical card and the shape of the diffraction grating are determined as in the present embodiment.

Figure 26:
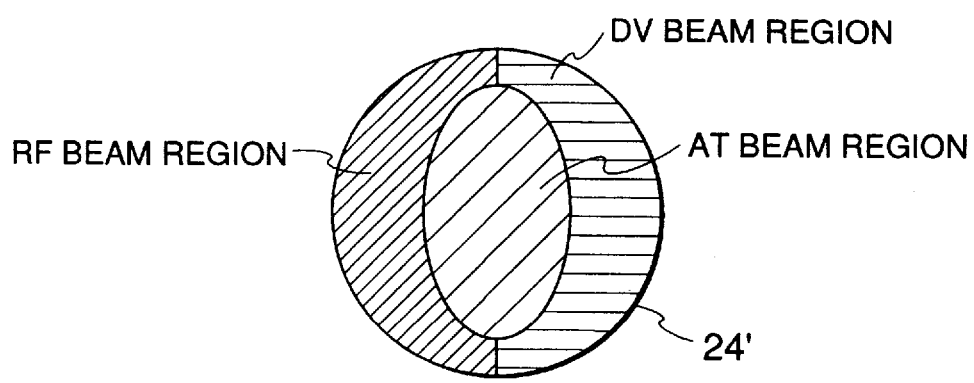
FIG. 26 is a schematic drawing to show a diffraction grating of the eighth embodiment of the present invention.

The eighth embodiment of the present invention will be explained in detail with reference to the drawings. FIG. 26 is a schematic drawing to show an example of the diffraction grating 24' used in the optical head of the optical information recording and/or reproducing apparatus according to the present invention. The present embodiment is different from the above apparatus in the conventional example of FIG. 3 only in that the diffraction grating shown in FIG. 26 is used instead of the diffraction grating 24 in the apparatus of the conventional example shown in FIG. 3 and in the shape of the light receiving elements for receiving the beams split by the diffraction grating. Therefore, the description of the entire apparatus is omitted herein.

Figure 27:
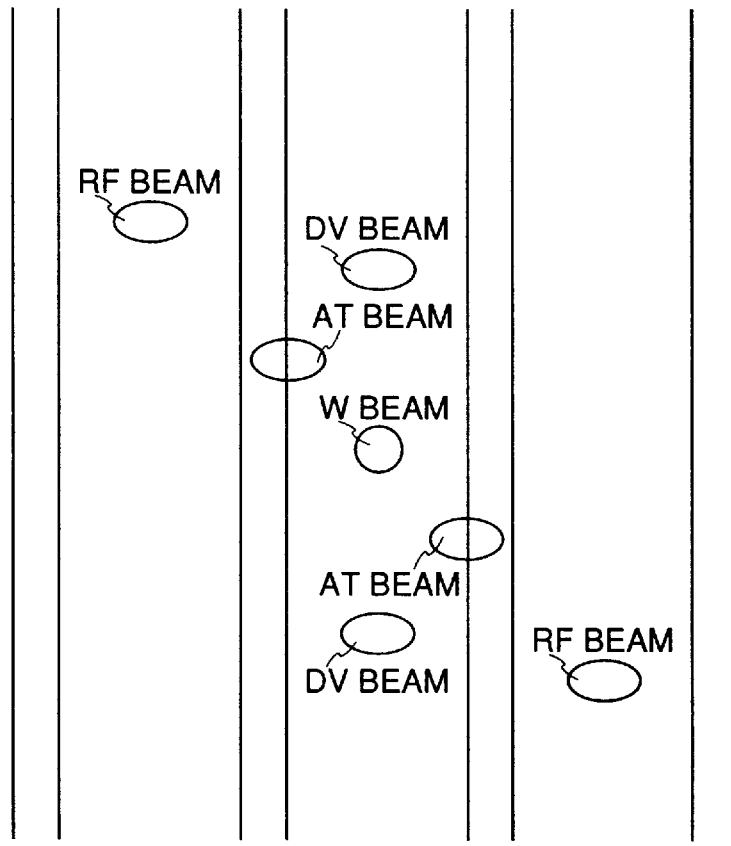
FIG. 27 is a drawing to show locations of respective spots on the optical card, formed by another diffraction grating of the eighth embodiment of the present invention.

In the present embodiment, when the diffraction grating 24' having the three diffraction regions as shown in FIG. 26 is disposed in the irradiation optical system, seven spots are formed on the optical card, as shown in FIG. 27. They include six spots from the ± first-order diffracted light beams by the diffraction gratings in the respective regions shown in FIG. 26, and a spot of the zeroth-order beam passing through the diffraction grating 24' without being subjected to the diffraction effect. It is also needless to mention that the spots on the optical card shown in FIG. 27 each correspond to the spots on the light receiving elements shown in FIG. 14 and are detected thereby.

Next explained is how to perform the forward and backward recording and simultaneous reproduction of plural tracks, using the spots arranged in this manner.

First, upon recording, the zeroth-order light spot is used as a recording beam and the DV light spots positioned before and after the zeroth-order light spot in the track running direction are used to verify recorded information, regardless of the running direction of the-track. This enables the forward and backward recording.

Next, upon reproduction, three tracks can be simultaneously reproduced using the two RF light spots and the zeroth-order light spot (or, a DV light spot), as shown in FIG. 27.

The AF control and AT control at this time are carried out as follows. The AF control is carried out by the astigmatic method, which is the same as in the conventional apparatus, as detecting the reflected light from the zeroth-order light spot by the quartered element. The AT control is carried out by detecting the reflected light from the two AT light spots shown in FIG. 27 and taking a difference between them.

The present embodiment is arranged to perform the AF control using the quartered light receiving element for receiving the reflected light of the zeroth-order light spot, but the AF control may be performed using either one or all of the elements for receiving the reflected light of the other light spots, i.e., the RF light spots and DV light spots in the quartered structure.

The above embodiment showed an example having the separate type optical head, but the present invention can also be applied similarly to the apparatus having ordinary optical heads other than the separate type, without having to be limited to the separate type.

The diffraction grating of the present invention has three diffraction regions formed without overlapping with each other in different grating directions and at different grating pitches, as shown in FIG. 26, which are the AT light region of an elliptical region elongated in the track running direction about the optical axis at the center and the RF light region and DV light region formed by bisecting a circumferential region surrounding the outside of the elliptical region by a parting line parallel to the track running direction.

Using such a diffraction grating, the light spots of AT, RF, and DV are obtained as elliptical spots large in the track traversing direction but small in the track running direction. This makes the three types of AT, RF, and DV spots resistant to the AT offset, because they are large in the track traversing direction. Since the spots of RF and DV are small in the track running direction, the reproduction signals can be obtained with less or no occurrence of jitter or the like.

Figure 28:
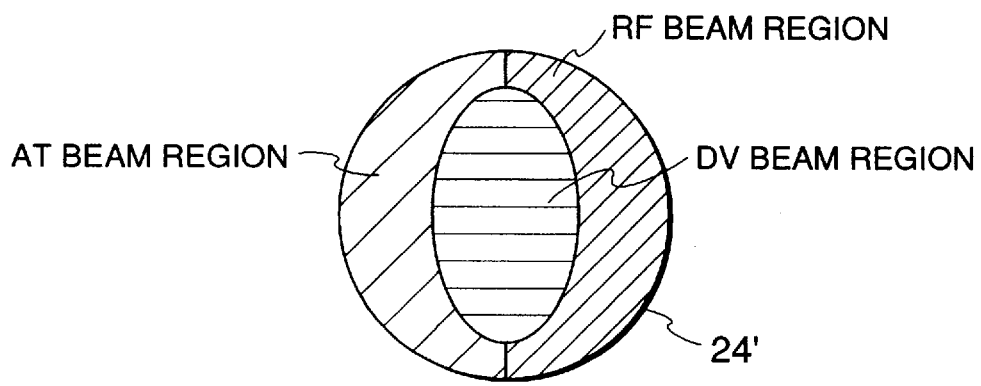
FIG. 28 is a schematic drawing to show a diffraction grating of the ninth embodiment of the present invention.

FIG. 28 is a drawing to show an example of the diffraction grating used in the ninth embodiment of the present invention, associated with the eighth embodiment of the present invention. The ninth embodiment is different in the grating directions and grating pitches of the respective diffraction regions and in the roles thereof from the eighth embodiment.

Figure 29:
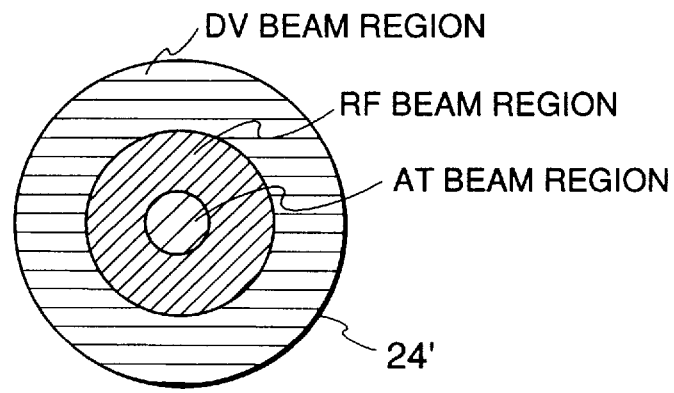
FIG. 29 is a schematic drawing to show a diffraction grating of the tenth embodiment of the present invention.

The tenth embodiment of the present invention will be explained in detail with reference to the drawings. FIG. 29 is a schematic drawing to show an example of the diffraction grating 24' used in the optical head of the optical information recording and/or reproducing apparatus according to the present invention. The present embodiment is different from the above apparatus in the conventional example of FIG. 3 only in that the diffraction grating shown in FIG. 29 is used instead of the diffraction grating 24 in the apparatus of the conventional example shown in FIG. 3 and in the shape of the light receiving elements for receiving the beams split by the diffraction grating. Therefore, the description of the entire apparatus is omitted herein.

Figure 30:
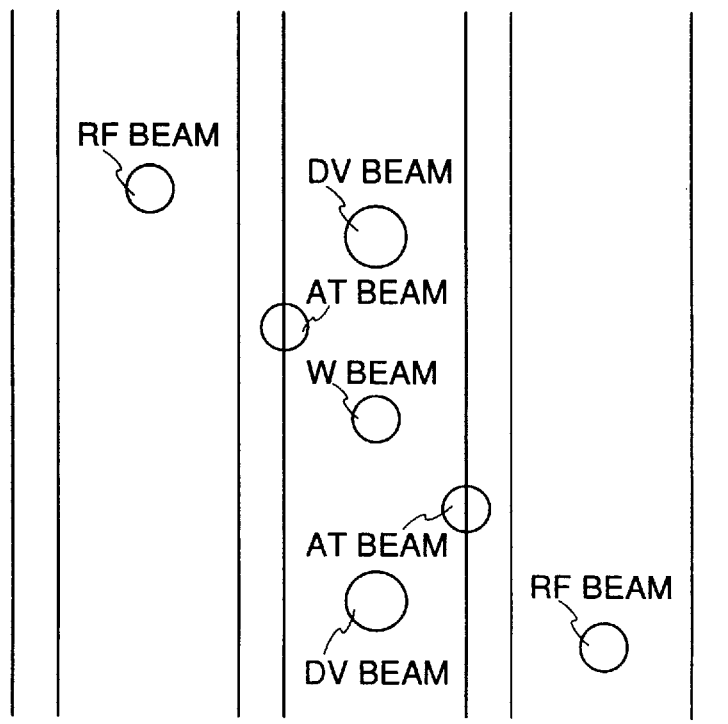
FIG. 30 is a drawing to show locations of respective spots on the optical card, formed by the diffraction grating of the tenth embodiment of the present invention.

In the present embodiment, when the diffraction grating 24' having the three diffraction regions as shown in FIG. 29 is disposed in the irradiation optical system, seven spots are formed on the optical card, as shown in FIG. 30. They include six spots from the ± first-order diffracted light beams by the diffraction gratings in the respective regions shown in FIG. 29, and a spot of the zeroth-order beam passing through the diffraction grating 24' without being subjected to the diffraction effect.

It is also needless to mention that the spots on the optical card shown in FIG. 30 each correspond to the spots on the light receiving elements shown in FIG. 14 and are detected thereby. Next explained is how to perform the forward and backward recording and simultaneous reproduction of plural tracks, using the spots arranged in this manner.

First, upon recording, the zeroth-order light spot is used as a recording beam and the DV light spots positioned before and after the zeroth-order light spot in the track running direction are used to verify recorded information, regardless of the running direction of the track. This enables the forward and backward recording.

Next, upon reproduction, three tracks can be simultaneously reproduced using the two RF light spots and the zeroth-order light spot (or, a DV light spot), as shown in FIG. 30.

The AF control and AT control at this time are carried out as follows. The AF control is carried out by the astigmatic method, which is the same as in the conventional apparatus, as detecting the reflected light from the zeroth-order light spot by the quartered element. The AT control is carried out by detecting the reflected light from the two AT light spots shown in FIG. 30 and taking a difference between them.

The present embodiment is arranged to perform the AF control using the quartered light receiving element for receiving the reflected light of the zeroth-order light spot, but the AF control may be performed using either one or all of the elements for receiving the reflected light of the other light spots, i.e., the RF light spots and DV light spots in the quartered structure.

The above embodiment showed an example having the separate type optical head, but the present invention can also be applied similarly to the apparatus having ordinary optical heads other than the separate type, without having to be limited to the separate type.

The diffraction grating of the present embodiment has three diffraction regions obtained by concentrically trisecting the diffraction grating about the optical axis at the center, as shown in FIG. 29, wherein the center circular region is used for AT light, the circumferential region around it is for RF light, and the circumferential region around the RF circumferential region is for DV light and wherein the regions are formed without overlapping with each other in grating directions and at grating pitches arbitrarily set.

The present embodiment is further characterized in that quantities of light diffracted from the respective diffraction regions are arranged to be equal to each other.

The present embodiment is also characterized in that the light source thereof is a semiconductor laser, the intensity distribution of the beam incident to the diffraction grating is a Gaussian distribution, and the diffraction efficiencies of the diffraction grating are determined according to the quantities of light incident to the respective diffraction regions.

Figure 31:
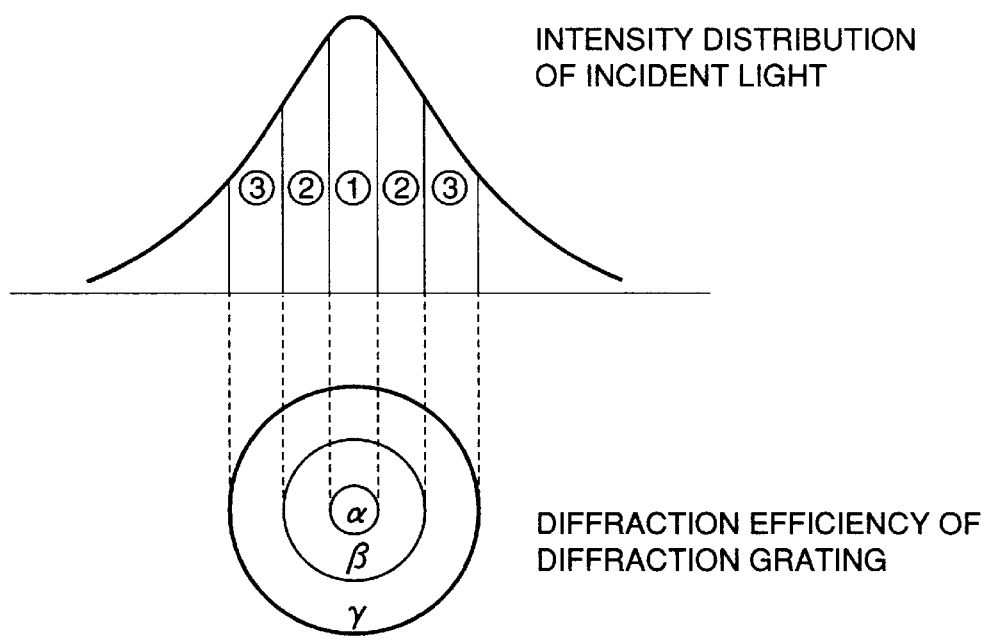
FIG. 31 is a drawing to show an intensity distribution of incident light and efficiencies of respective diffraction regions in the tenth embodiment of the present invention.

The diffraction grating of the present embodiment is characterized in that the thicknesses (level differences) of the respective diffraction regions are selected so as to satisfy the following relation:

$$\alpha A = \beta B = \gamma C$$

where $\alpha$ is the diffraction efficiency of the AT light region, $\beta$ that of the RF light region, $\gamma$ that of the DV light region, A the quantity of light incident to the AT light region ①, B that to the RF light region ②, and C that to the DV light region ③, as shown in FIG. 31.

When the diffraction grating 24' is arranged as shown in FIG. 31, the same light quantity can be attained for the six light spots of DV light, AT light, and RF light diffracted from the respective diffraction regions, which can greatly simplify the electric circuits including the detection circuit.

Figure 32:
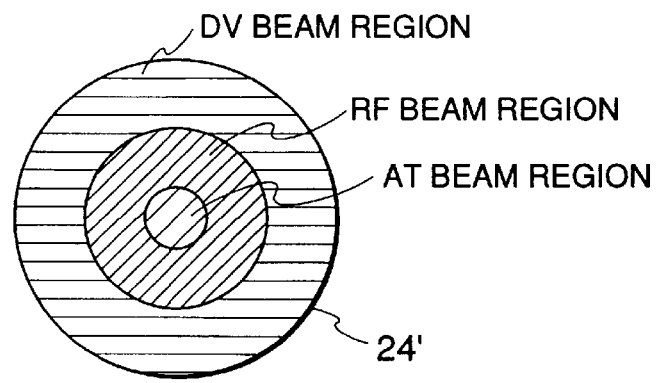
FIG. 32 is a schematic drawing to show a diffraction grating of the eleventh embodiment of the present invention.

The eleventh embodiment of the present invention will be explained in detail with reference to the drawings. FIG. 32 is a schematic drawing to show an example of the diffraction grating 24' used in the optical head of the optical information recording and/or reproducing apparatus according to the present invention. The present embodiment is different from the above apparatus in the conventional example of FIG. 3 only in that the diffraction grating shown in FIG. 32 is used instead of the diffraction grating 24 in the apparatus of the conventional example shown in FIG. 3 and in the shape of the light receiving elements for receiving the beams split by the diffraction grating. Therefore, the description of the entire apparatus is omitted herein.

Figure 33:
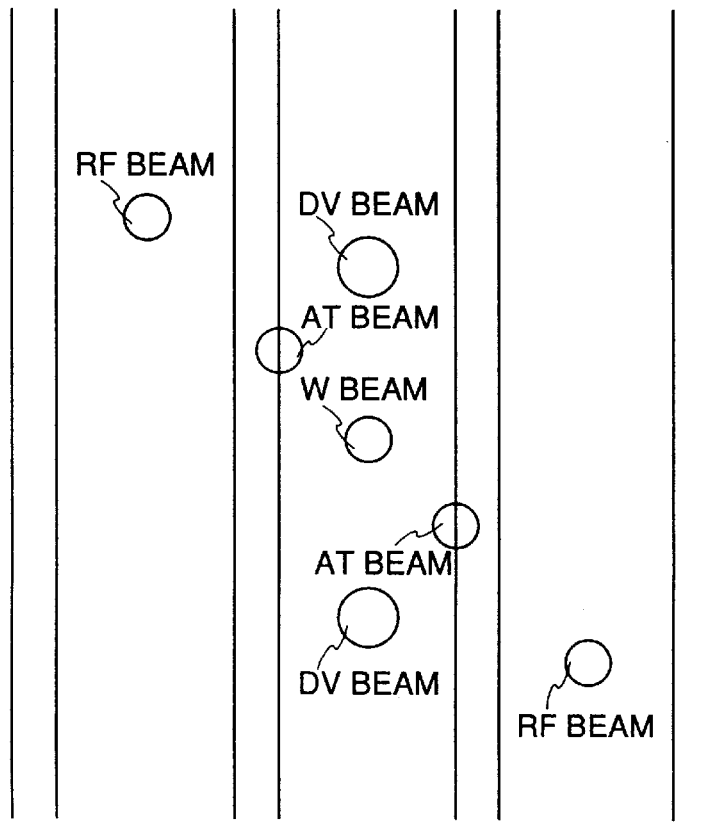
FIG. 33 is a drawing to show locations of respective spots on the optical card, formed by the diffraction grating of the eleventh embodiment of the present invention.

In the present embodiment, when the diffraction grating 24' having the three diffraction regions as shown in FIG. 32 is disposed in the irradiation optical system, seven spots are formed on the optical card, as shown in FIG. 33. They include six spots from the ± first-order diffracted light beams by the diffraction gratings in the respective regions shown in FIG. 32, and a spot of the zeroth-order beam passing through the diffraction grating 24' without being subjected to the diffraction effect.

It is also needless to mention that the spots on the optical card shown in FIG. 33 each correspond to the spots on the light receiving elements shown in FIG. 14 and are detected thereby.

Next explained is how to perform the forward and backward recording and simultaneous reproduction of plural tracks, using the spots arranged in this manner.

First, upon recording, the zeroth-order light spot is used as a recording beam and the DV light spots positioned before and after the zeroth-order light spot in the track running direction are used to verify recorded information, regardless of the running direction of the track. This enables the forward and backward recording.

Next, upon reproduction, three tracks can be simultaneously reproduced using the two RF light spots and the zeroth-order light spot (or, a DV light spot), as shown in FIG. 33.

The AF control and AT control at this time are carried out as follows. The AF control is carried out by the astigmatic method, which is the same as in the conventional apparatus, as detecting the reflected light from the zeroth-order light spot by the quartered element. The AT control is carried out by detecting the reflected light from the two AT light spots shown in FIG. 33 and taking a difference between them.

The present embodiment is arranged to perform the AF control using the quartered light receiving element for receiving the reflected light of the zeroth-order light spot, but the AF control may be performed using either one or all of the elements for receiving the reflected light of the other light spots, i.e., the RF light spots and DV light spots in the quartered structure.

The above embodiment showed an example having the separate type optical head, but the present invention can also be applied similarly to the apparatus having ordinary optical heads other than the separate type, without having to be limited to the separate type.

The embodiment of the present invention employs the diffraction grating 24' arranged as shown in FIG. 31 stated above, whereby the same light quantity can be attained for the six light spots of DV light, AT light, and RF light diffracted from the respective diffraction regions. This can greatly simplify the electric circuits including the detection circuit.

Figure 34:
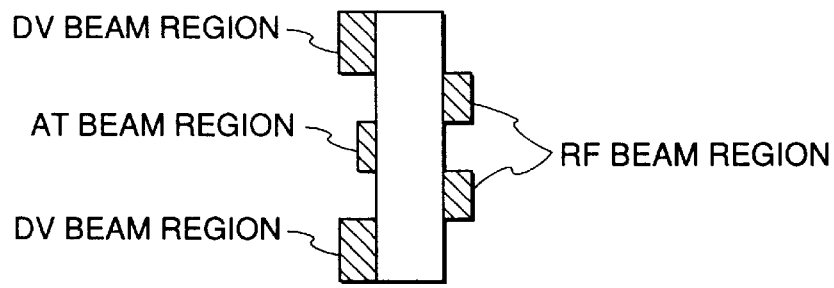
FIG. 34 is a sectional view of the diffraction grating of the eleventh embodiment of the present invention.

Further, the present invention employed the arrangement as shown in FIG. 34 in order to produce the diffraction grating with good accuracy and high efficiency. Namely, a general method for forming the level differences of the diffraction grating is corrosion with a chemical agent, and control of the height of the level differences is based on time. However, if two adjacent diffraction regions are in contact with each other, the corrosion time and region of the diffraction grating near the contact become unclear.

If it is desired to obtain the diffraction efficiencies and diffraction regions expected, the adjacent diffraction regions on the top plan view can be formed separately on the top surface and on the bottom surface of the substrate, as shown in FIG. 34, so as to make no contact between the diffraction regions. The present embodiment employed the diffraction grating in which the diffraction regions were formed on both the top and bottom surfaces by corrosion with a chemical agent.

The present embodiment is further characterized in that the diffraction efficiencies of the respective diffraction regions are different from each other.

The present embodiment employed the phase type diffraction grating.

Figure 35:
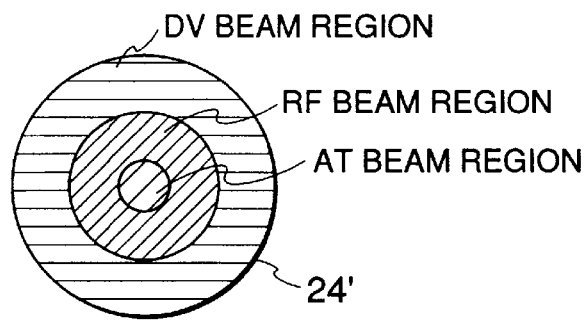
FIG. 35 is a schematic drawing to show a diffraction grating of the twelfth embodiment of the present invention.

The twelfth embodiment of the present invention will be explained in detail with reference to the drawings. FIG. 35 is a schematic drawing to show an example of the diffraction grating 24' used in the optical head of the optical information recording and/or reproducing apparatus according to the present invention. The present embodiment is different from the above apparatus in the conventional example of FIG. 3 only in that the diffraction grating shown in FIG. 35 is used instead of the diffraction grating 24 in the apparatus of the conventional example shown in FIG. 3 and in the shape of the light receiving elements for receiving the beams split by the diffraction grating. Therefore, the description of the entire apparatus is omitted herein.

Figure 36:
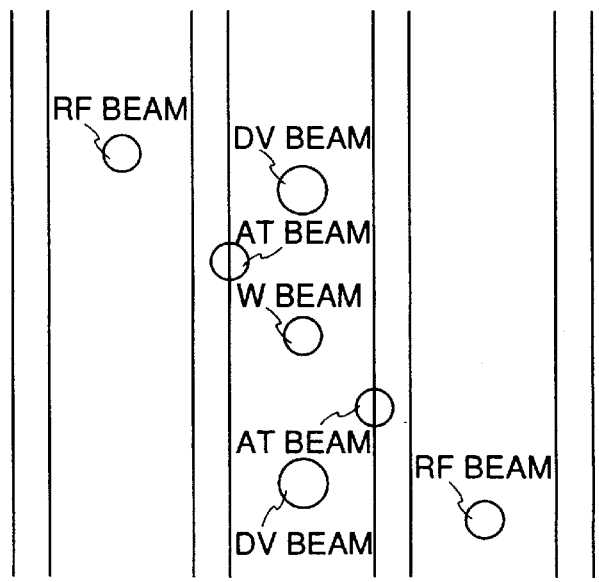
FIG. 36 is a drawing to show locations of respective spots on the optical card, formed by the diffraction grating of the twelfth embodiment of the present invention.

In the present embodiment, when the diffraction grating 24' having the three diffraction regions as shown in FIG. 35 is disposed in the irradiation optical system, seven spots are formed on the optical card, as shown in FIG. 36. They include six spots from the ± first-order diffracted light beams by the diffraction gratings in the respective regions shown in FIG. 35, and a spot of the zeroth-order beam passing through the diffraction grating 24' without being subjected to the diffraction effect.

It is also needless to mention that the spots on the optical card shown in FIG. 36 each correspond to the spots on the light receiving elements shown in FIG. 14 and are detected thereby. Next explained is how to perform the forward and backward recording and simultaneous reproduction of plural tracks, using the spots arranged in this manner.

First, upon recording, the zeroth-order light spot is used as a recording beam and the DV light spots positioned before and after the zeroth-order light spot in the track running direction are used to verify recorded information, regardless of the running direction of the track. This enables the forward and backward recording.

Next, upon reproduction, three tracks can be simultaneously reproduced using the two RF light spots and the zeroth-order light spot (or, a DV light spot), as shown in FIG. 36.

The AF control and AT control at this time are carried out as follows. The AF control is carried out by the astigmatic method, which is the same as in the conventional apparatus, as detecting the reflected light from the zeroth-order light spot by the quartered element. The AT control is carried out by detecting the reflected light from the two AT light spots shown in FIG. 36 and taking a difference between them.

The present embodiment is arranged to perform the AF control using the quartered light receiving element for receiving the reflected light of the zeroth-order light spot, but the AF control may be performed using either one or all of the elements for receiving the reflected light of the other light spots, i.e., the RF light spots and DV light spots in the quartered structure.

The above embodiment showed an example having the separate type optical head, but the present invention can also be applied similarly to the apparatus having ordinary optical heads other than the separate type, without having to be limited to the separate type.

The embodiment of the present invention employs the diffraction grating 24' arranged as shown in FIG. 31 stated above, whereby the same light quantity can be obtained for the six light spots of DV light, AT light, and RF light diffracted from the respective diffraction regions. This can greatly simplify the electric circuits including the detection circuit.

Figure 37A:
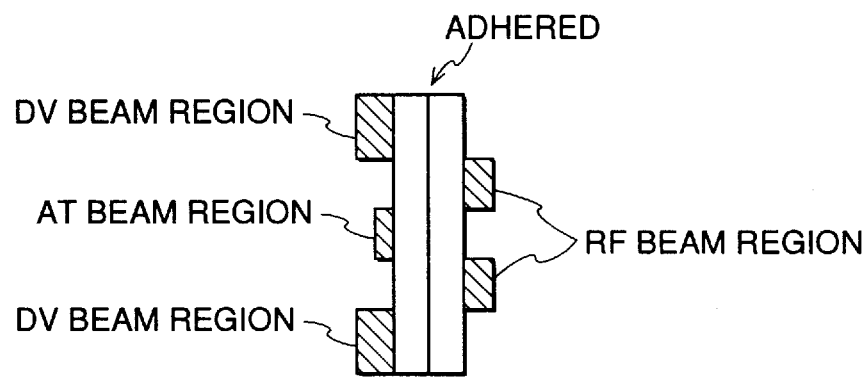
FIGS. 37A and 37B are sectional views each of which shows a diffraction grating in the twelfth embodiment of the present invention.
Figure 37B:
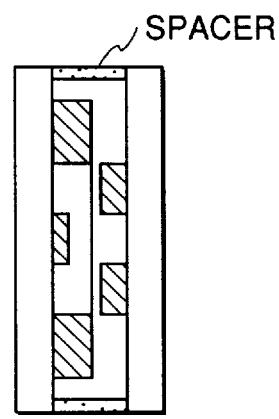

Further, the present embodiment employed the arrangement as shown in FIG. 37A or 37B in order to form the diffraction grating with good accuracy and high efficiency. Namely, a general method for forming the level differences of the diffraction grating is corrosion with a chemical agent, and control of the height of the level differences is based on time. However, if the adjacent diffraction regions are in contact with each other, the corrosion time and region of the diffraction grating near the contact become unclear.

If it is desired to obtain the diffraction efficiencies and diffraction regions expected, a sure process is to produce the diffraction regions without contact as shown in FIGS. 37A and 37B.

FIG. 37A is a transverse sectional view of the diffraction grating of the present embodiment, in which the adjacent diffraction regions on the top plan view are formed by subjecting two separate substrates to corrosion with a chemical agent and cementing the two substrates with the diffraction grating surfaces facing outside.

FIG. 37B is a transverse sectional view of the diffraction grating obtained by forming the two substrates in the same manner as described above and cementing them with the diffraction surfaces facing inside and with a spacer between them.

These arrangements permit the respective diffraction regions to be formed without overlapping with each other and without contact.

The present embodiment is further characterized in that the diffraction efficiencies of the respective diffraction regions are different from each other.

The present embodiment employed the phase type diffraction grating.

As explained above, the first embodiment of the present invention can provide an information recording and/or reproducing apparatus which can perform forward and backward recording and the simultaneous reproduction of plural tracks by splitting the light from a light source into plural beams and with which the time necessary for recording and reproduction is greatly decreased.

Since the plurality of diffraction regions are formed without overlapping with each other, the present embodiment has the advantage that the shape, intensity, or the like of each spot radiated onto the optical information recording medium can be readily controlled independently.

As explained above, the first embodiment of the present invention can provide an information recording and/or reproducing apparatus which can perform forward and backward recording and the simultaneous reproduction of plural tracks by splitting the light from a light source into plural beams and with which the time necessary for recording and reproduction is greatly decreased.

Since each spot (each spot of AT, RF, or DV) obtained by diffraction of the diffraction grating in the present invention is formed in a spot shape elongated in the track traversing direction, stable control can be performed therewith as being resistant to the deviation (the AT offset) in the track traversing direction.

Further, since the DV light spots and RF light spots are obtained in the small spot diameter in the track running direction, stable reproduction signals can be obtained.

As explained above, the second embodiment of the present invention can provide an information recording and/or reproducing apparatus which can perform forward and backward recording and the simultaneous reproduction of plural tracks by splitting the light from a light source into plural beams and with which the time necessary for recording and reproduction is greatly decreased.

In the optical head using the diffraction grating employed in the present invention, because the AT light spots and RF light spots result from diffraction from the same diffraction region, the possibility of occurrence of positional deviation due to the manufacturing errors of the diffraction grating (errors in the pitch, inclination of grating, etc.) is lowered for the AT light spots and RF light spots and, even if it should occur, the AT offset or the RF offset would be able to be prevented from occurring by rotating the diffraction grating to effect fine adjustment.

As explained above, the third embodiment of the present invention can provide an information recording and/or reproducing apparatus which can perform forward and backward recording and the simultaneous reproduction of plural tracks by splitting the light from a light source into plural beams and with which the time necessary for recording and reproduction is greatly decreased.

By the arrangement in which the diffraction grating is formed of the fan-shaped segments separated at intervals of 120° about the optical axis at the center as in the embodiment of the present invention, the same light quantity can be attained for the six light spots of DV light, AT light, and RF light, which permits the detection circuit to be constructed relatively easily.

Since the level differences of the diffraction grating are the same throughout all regions, facility of production of the diffraction grating can be remarkably improved.

Further, since the light quantities of the six light spots are equal to each other, control of light quantity is easy and a low-power light source can be used, which decreases the cost.

As explained above, the fourth embodiment of the present invention can provide an information recording and/or reproducing apparatus which can perform forward and backward recording and the simultaneous reproduction of plural tracks by splitting the light from a light source into plural beams and with which the time necessary for recording and reproduction is greatly decreased.

By the arrangement in which the diffraction grating is split concentrically about the optical axis at the center so as to equalize the quantities of light diffracted by the respective regions as in the embodiment of the present invention, the same light quantity can be attained for the six light spots of DV light, AT light, and RF light, which permits the detection circuit to be constructed relatively easily.

Since the level differences of the diffraction grating are constant throughout all regions, facility of production of the diffraction grating is remarkably improved.

As explained above, the fifth embodiment of the present invention can provide an information recording and/or reproducing apparatus which can perform forward and backward recording and the simultaneous reproduction of plural tracks by splitting the light from a light source into plural beams and with which the time necessary for recording and reproduction is greatly decreased.

Using the diffraction grating as in the embodiment of the present invention, the AT light spots and RF light spots can be obtained in a large spot diameter, which enables stable control and reproduction.

As explained above, the sixth embodiment of the present invention can provide an information recording and/or reproducing apparatus which can perform forward and backward recording and the simultaneous reproduction of plural tracks by splitting the light from a light source into plural beams and with which the time necessary for recording and reproduction is greatly decreased.

Using the diffraction grating as in the embodiment of the present invention, the AT light spots and RF light spots can be obtained in a large spot diameter, which enables stable control and reproduction.

As explained above, the seventh embodiment of the present invention can provide an information recording and/or reproducing apparatus which can perform forward and backward recording and the simultaneous reproduction of plural tracks by splitting the light from a light source into plural beams and with which the time necessary for recording and reproduction is greatly decreased.

Using the diffraction grating as in the embodiment of the present invention, the DV light spots and RF light spots can be obtained in a small spot diameter in the track running direction, which provides stable reproduction signals.

As explained above, the eighth and ninth embodiments of the present invention can provide an information recording and/or reproducing apparatus which can perform forward and backward recording and the simultaneous reproduction of plural tracks by splitting the light from a light source into plural beams and with which the time necessary for recording and reproduction is greatly decreased.

Using the diffraction grating as in the embodiment of the present invention, stable control and reproduction can be performed.

As explained above, the tenth embodiment of the present invention can provide an information recording and/or reproducing apparatus which can perform forward and backward recording and the simultaneous reproduction of plural tracks by splitting the light from a light source into plural beams and with which the time necessary for recording and reproduction is greatly decreased.

By the arrangement in which the diffraction grating 24' is arranged so that the quantities of light diffracted by the respective diffraction regions may be equal to each other as in the embodiment of the present invention, the same light quantity can be attained for the six light spots of DV light, AT light, and RF light, which permits the detection circuit to be constructed relatively easily. Thus, a decrease in the cost can be realized.

As explained above, the eleventh embodiment of the present invention can provide an information recording and/or reproducing apparatus which can perform forward and backward recording and the simultaneous reproduction of plural tracks by splitting the light from a light source into plural beams and with which the time necessary for recording and reproduction is greatly decreased.

By the arrangement in which the diffraction grating 24' is arranged so that the quantities of light diffracted by the respective diffraction regions may be equal to each other as in the embodiment of the present invention, the same light quantity can be attained for the six light spots of DV light, AT light, and RF light, which permits the detection circuit to be constructed relatively easily. Thus, a decrease in the cost can be realized.

Further, the control is easy and sure when the level differences of the diffraction grating are formed, which remarkably improves the accuracy and productivity.

Since the adjacent diffraction regions are formed separately on the top and bottom surfaces of the substrate, the diffraction regions can be formed without contact, which permits high-accuracy diffracted light to be obtained.

As explained above, the twelfth embodiment of the present invention can provide an information recording and/or reproducing apparatus which can perform forward and backward recording and the simultaneous reproduction of plural tracks by splitting the light from a light source into plural beams and with which the time necessary for recording and reproduction is greatly decreased.

By the arrangement in which the diffraction grating 24' is arranged so that the quantities of light diffracted by the respective diffraction regions may be equal to each other as in the embodiment of the present invention, the same light quantity can be attained for the six light spots of DV light, AT light, and RF light, which permits the detection circuit to be constructed relatively easily. Thus, a decrease in the cost can be realized.

Further, the control is easy and sure when the level differences of the diffraction grating are formed, which remarkably improves the accuracy and productivity.

By the arrangement in which the adjacent diffraction regions are formed separately on separate substrates and thereafter the substrates are cemented to each other, the diffraction regions can be formed without contact, which permits high-accuracy diffracted light to be obtained.

The first embodiment of the present invention as explained above is the optical information recording and/or reproducing apparatus, which has an optical head arranged to focus a beam from the irradiation optical system to radiate a light spot thereof onto the optical information recording medium and to project a beam from the light spot on the recording medium to the detection optical system, for recording information in the recording medium and/or for reproducing the recorded information by irradiation with the beam from the irradiation optical system, which comprises the diffraction grating for splitting a beam incident thereto from the light source into a plurality of beams, wherein the diffraction grating is one in which a plurality of different diffraction regions are formed without overlapping with each other and wherein the plurality of diffraction regions split a beam incident thereto into a plurality of different beams to irradiate the optical information recording medium therewith.

It is also characterized in that the light not subjected to the diffraction effect (the zeroth-order light) out of the plurality of beams is used as a recording beam and the other light subjected to the diffraction effect (the diffracted light) is used as direct verifying light (DV light), autotracking light (AT light), and reproducing light (RF light).

It is also characterized in that the diffraction grating is a hologram. It is further characterized in that the diffraction grating is trisected into the diffraction regions by two parting lines parallel to the track running direction, and the diffraction region in the central portion is used for direct verifying (DV) light while the diffraction regions on the both sides thereof for autotracking (AT) light and reproducing (RF) light.

It is also characterized in that the diffraction grating has the three diffraction regions formed without overlapping with each other, in that, among the plurality of light spots formed on the optical information recording medium by the beams split by the diffraction regions, the direct verifying (DV) light spots, the autotracking (AT) light spots, and the reproducing (RF) light spots formed by the light subjected to the diffraction effect are elliptical, being elongated in the track traversing direction of the optical information recording medium, and in which the recording light spot from the light not subjected to the diffraction effect is of a true circle smaller than the other light spots.

The second embodiment of the present invention as explained above is the optical information recording and/or reproducing apparatus, which has the optical head arranged to focus a beam from the irradiation optical system to radiate a light spot thereof onto the optical information recording medium and to project a beam from the light spot on the recording medium to the detection optical system, for recording information in the recording medium and/or for reproducing the recorded information by irradiation of the beam from the irradiation optical system, which comprises the diffraction grating for splitting the beam incident thereto from the light source into a plurality of beams, wherein the diffraction grating has the two diffraction regions arranged concentrically about the optical axis and formed without overlapping with each other, wherein the circular region in the central portion out of the two diffraction regions is used for direct verifying (DV) light while the ring region around the circular region is for autotracking (AT) light and reproducing (RF) light, and wherein the light not subjected to the diffraction effect (the zeroth-order light) out of the plurality of beams is used as a recording beam, the ± first-order light diffracted by one diffraction region out of the two diffraction regions is used as the direct verifying light (DV light), and the ± first-order light diffracted by the other diffraction region out of the two diffraction regions is used as the autotracking light (AT light) while the ± third-order light diffracted by the other diffraction region is used as the reproducing light (RF light).

The third embodiment of the present invention as explained above is the optical information recording and/or reproducing apparatus, which has the optical head arranged to focus a beam from the irradiation optical system to radiate a light spot thereof onto the optical information recording medium and to project a beam from the light spot on the recording medium to the detection optical system, for recording information in the recording medium and/or for reproducing the recorded information by irradiation of the beam from the irradiation optical system, which comprises the diffraction grating for splitting the beam incident thereto from the light source into a plurality of beams, wherein the diffraction grating has the three diffraction regions formed without overlapping with each other, and wherein the light not subjected to the action of the diffraction grating (the zeroth-order light) out of the plurality of beams is used as a recording beam while the other light subjected to the diffraction effect (the diffracted light) is used as direct verifying light (DV light), autotracking light (AT light), and reproducing light (RF light).

It is also characterized in that the three diffraction regions formed without overlapping with each other in the diffraction grating are fan-shaped split at intervals of 120° about the optical axis and are for the autotracking (AT) light, for the direct verifying (DV) light, and for the reproducing (RF) light.

The fourth embodiment of the present invention as explained above is the optical information recording and/or reproducing apparatus, which has the optical head arranged to focus a beam from the irradiation optical system to radiate a light spot thereof onto the optical information recording medium and to project a beam from the light spot on the recording medium to the detection optical system, for recording information in the recording medium and/or for reproducing the recorded information by irradiation of the beam from the irradiation optical system, which comprises the diffraction grating for splitting the beam incident thereto from the light source into a plurality of beams, wherein the diffraction grating has the three diffraction regions concentrically separated about the optical axis, wherein the circular region in the central portion is used for the autotracking (AT) light, the ring region around the circular region is for the reproducing (RF) light, and the ring region further around the RF ring region is for the direct verifying (DV) light, and wherein the light not subjected to the action of the diffraction grating (the zeroth-order light) out of the plurality of beams is used as a recording beam and the other light subjected to the diffraction effect (the diffracted light) is used as the direct verifying light (DV light), the autotracking light (AT light), and the reproducing light (RF light).

It is also characterized in that if the intensity distribution of the incident beam is a Gaussian distribution, the diffraction grating split into the three concentric diffraction regions is split so that the quantities of light impinging on the respective regions may be equal to each other.

It is also characterized in that the light source of the incident beam is a semiconductor laser.

It is also characterized in that the diffraction efficiencies of the diffraction grating are constant throughout all regions.

The fifth embodiment of the present invention as explained above is the optical information recording and/or reproducing apparatus, which has the optical head arranged to focus a beam from the irradiation optical system to radiate a light spot thereof onto the optical information recording medium and to project a beam from the light spot on the recording medium to the detection optical system, for recording information in the recording medium and/or for reproducing the recorded information by irradiation of the beam from the irradiation optical system, wherein a beam from one light source is split into a plurality of beams by the diffraction grating having the three diffraction regions formed without overlapping with each other, wherein the light not subjected to the action of the diffraction grating (the zeroth-order light) out of the plurality of beams is used as a recording beam while the other light subjected to the diffraction effect (the diffracted light) is used as the direct verifying light (DV light), the autotracking light (AT light), and the reproducing light (RF light), and wherein the diameters of the light spots in the track traversing direction on the optical information recording medium from the respective beams are determined to satisfy the following relations:

(AT light spot)$\geq$(DV light spot)
(RF light spot)$\geq$(DV light spot).

It is further characterized in that the diameters of the light spots in the track traversing direction on the optical information recording medium from the respective beams are determined to satisfy the following relation:

(AT light spot)$\geq$(RF light spot)$\geq$(DV light spot).

It is also characterized in that the three diffraction regions formed without overlapping with each other in the diffraction grating are concentric with the optical axis at the center and are arranged in the order of the regions for the autotracking (AT) light, for the reproducing (RF) light, and for the direct verifying (DV) light from inside.

The sixth embodiment of the present invention as explained above is the optical information recording and/or reproducing apparatus, which has the optical head arranged to focus a beam from the irradiation optical system to radiate a light spot thereof onto the optical information recording medium and to project a beam from the light spot on the recording medium to the detection optical system, for recording information in the recording medium and/or for reproducing the recorded information by irradiation of the beam from the irradiation optical system, wherein a beam from one light source is split into a plurality of beams by the diffraction grating having the three diffraction regions formed without overlapping with each other, wherein the light not subjected to the action of the diffraction grating (the zeroth-order light) out of the plurality of beams is used as a recording beam while the other light subjected to the diffraction effect (the diffracted light) is used as the direct verifying light (DV light), the autotracking light (AT light), and the reproducing light (RF light), and wherein the diameters of the light spots in the track traversing direction on the optical information recording medium from the respective beams are determined to satisfy the following relations:

(AT light spot)=(RF light spot)$\geq$(DV light spot).

It is also characterized in that the three diffraction regions formed without overlapping with each other in the diffraction grating form two concentric circles about the optical axis, the inside circular region is divided into two regions at the center in the track running direction, the region for the autotracking (AT) light and the region for the reproducing (RF) light are positioned in the two inside regions, and the region for the direct verifying (DV) light is positioned in the ring region around them.

The seventh embodiment of the present invention as explained above is the optical information recording and/or reproducing apparatus, which has the optical head arranged to focus a beam from the irradiation optical system to radiate a light spot thereof onto the optical information recording medium and to project a beam from the light spot on the recording medium to the detection optical system, for recording information in the recording medium and/or for reproducing the recorded information by irradiation of the beam from the irradiation optical system, wherein a beam from one light source is split into a plurality of beams by the diffraction grating having the three diffraction regions formed without overlapping with each other, wherein the light not subjected to the action of the diffraction grating (the zeroth-order light) out of the plurality of beams is used as a recording beam while the other light subjected to the diffraction effect (the diffracted light) is used as the direct verifying light (DV light), the autotracking light (AT light), and the reproducing light (RF light), and wherein the diameters of the light spots in the track traversing direction on the optical information recording medium from the respective beams are determined to satisfy the following relations:

(AT light spot)$\geq$(RF light spot)=(DV light spot).

It is also characterized in that the three diffraction regions formed without overlapping with each other in the diffraction grating form two concentric circles about the optical axis, the outside ring region is divided into two regions at the center in the track running direction, the region for the autotracking (AT) light is positioned in the inside circular region, and the region for the direct verifying (DV) light and the region for the reproducing (RF) light are positioned in the two regions outside the circular region.

The eighth embodiment of the present invention as explained above is the optical information recording and/or reproducing apparatus, which has the optical head arranged to focus a beam from the irradiation optical system to radiate a light spot thereof onto the optical information recording medium and to project a beam from the light spot on the recording medium to the detection optical system, for recording information in the recording medium and/or for reproducing the recorded information by irradiation of the beam from the irradiation optical system, which comprises the diffraction grating having the three diffraction regions formed without overlapping with each other, for splitting the beam incident thereto from a light source into a plurality of beams, wherein the light not subjected to the action of the diffraction grating (the zeroth-order light) out of the plurality of beams is used as a recording beam while the other light subjected to the diffraction effect (the diffracted light) is used as the direct verifying light (DV light), the autotracking light (AT light), and the reproducing light (RF light), wherein the diffraction region of the diffraction grating is split into an elliptical region elongated in the track direction and a ring region around the elliptical region and the ring region is further divided into two at the center in the track running direction to form the respective diffraction regions, and wherein the elliptical region is used for the autotracking (AT) light, the half region of the ring region is for the direct verifying (DV) light, and the other half region of the ring region is for the reproducing (RF) light.

The tenth embodiment of the present invention as explained above is the optical information recording and/or reproducing apparatus, which has the optical head arranged to focus a beam from the irradiation optical system to radiate a light spot thereof onto the optical information recording medium and to project a beam from the light spot on the recording medium to the detection optical system, for recording information in the recording medium and/or for reproducing the recorded information by irradiation of the beam from the irradiation optical system, which comprises the diffraction grating having the three diffraction regions formed without overlapping with each other, for splitting the beam incident thereto from a light source into a plurality of beams, wherein the light not subjected to the action of the diffraction grating (the zeroth-order light) out of the plurality of beams is used as a recording beam while the other light subjected to the diffraction effect (the diffracted light) is used as the direct verifying light (DV light), the autotracking light (AT light), and the reproducing light (RF light), and wherein the quantities of the light diffracted from the respective diffraction regions are arranged so as to be equal to each other.

It is also characterized in that the intensity distribution of the beam incident to the diffraction grating is a Gaussian distribution.

It is also characterized in that the light source of the incident beam is a semiconductor laser.

It is also characterized in that diffraction efficiencies of the diffraction grating are determined according to the quantities of the light incident to the respective diffraction regions.

It is also characterized in that the diffraction grating is formed so as to satisfy the following relation:

$$\alpha A = \beta B = \gamma C$$

where $\alpha$ is the diffraction efficiency of the autotracking (AT) light region, $\beta$ that of the reproducing (RF) light region, $\gamma$ that of the direct verifying (DV) light region, A the quantity of the light incident to the autotracking (AT) light region, B that to the reproducing (RF) light region, and C that to the direct verifying (DV) light region.

The eleventh embodiment of the present invention as explained above is the optical information recording and/or reproducing apparatus, which has the optical head arranged to focus a beam from the irradiation optical system to radiate a light spot thereof onto the optical information recording medium and to project a beam from the light spot on the recording medium to the detection optical system, for recording information in the recording medium and/or for reproducing the recorded information by irradiation of the beam from the irradiation optical system, wherein a beam from one light source is split into a plurality of beams by the diffraction grating having the plural diffraction regions formed without overlapping with each other, wherein the light not subjected to the action of the diffraction grating (the zeroth-order light) out of the plurality of beams is used as a recording beam while the other light subjected to the diffraction effect (the diffracted light) is used as the direct verifying light (DV light), the autotracking light (AT light), and the reproducing light (RF light), and wherein the diffraction grating is formed by forming the adjacent diffraction regions separately on a bottom surface and on a top surface of a substrate.

It is also characterized in that the diffraction grating is a phase type diffraction grating.

It is also characterized in that the diffraction efficiencies of the respective diffraction regions are different from each other.

It is also characterized in that the level differences of the diffraction grating are formed by corrosion with a chemical agent.

The twelfth embodiment of the present invention as explained above is the optical information recording and/or reproducing apparatus, which has the optical head arranged to focus a beam from the irradiation optical system to radiate a light spot thereof onto the optical information recording medium and to project a beam from the light spot on the recording medium to the detection optical system, for recording information in the recording medium and/or for reproducing the recorded information by irradiation of the beam from the irradiation optical system, wherein a beam from one light source is split into a plurality of beams by the diffraction grating having the plural diffraction regions formed without overlapping with each other, wherein the light not subjected to the action of the diffraction grating (the zeroth-order light) out of the plurality of beams is used as a recording beam while the other light subjected to the diffraction effect (the diffracted light) is used as the direct verifying light (DV light), the autotracking light (AT light), and the reproducing light (RF light), and wherein the diffraction grating is formed by integrally cementing a plurality of diffraction gratings in which a plurality of adjacent diffraction regions are formed separately from each other.

It is also characterized in that the diffraction grating is a phase type diffraction grating.

It is also characterized in that the level differences of the diffraction grating are formed by corrosion with a chemical agent.

It is also characterized in that the diffraction grating is formed by integrally cementing a plurality of diffraction gratings arranged so that the diffraction efficiencies of the respective diffraction regions are different from each other.

Further embodiments of the present invention will be explained.

When the diffraction grating of the present invention is used and if the size of the incident beam is equal to the size of the region of the diffraction grating, positional deviation between the incident beam and the diffraction grating will cause changes in the light quantities of AT, DV, RF, and W light (the zeroth-order light). Especially, when the head optical system is of the separate type consisting of a stationary unit and a movable unit and the diffraction grating is positioned in the movable optical system, the light quantities of the respective light spots change with motion of the movable unit, which sometimes causes changes of respective signals detected and density differences of recording pits.

Figure 38:
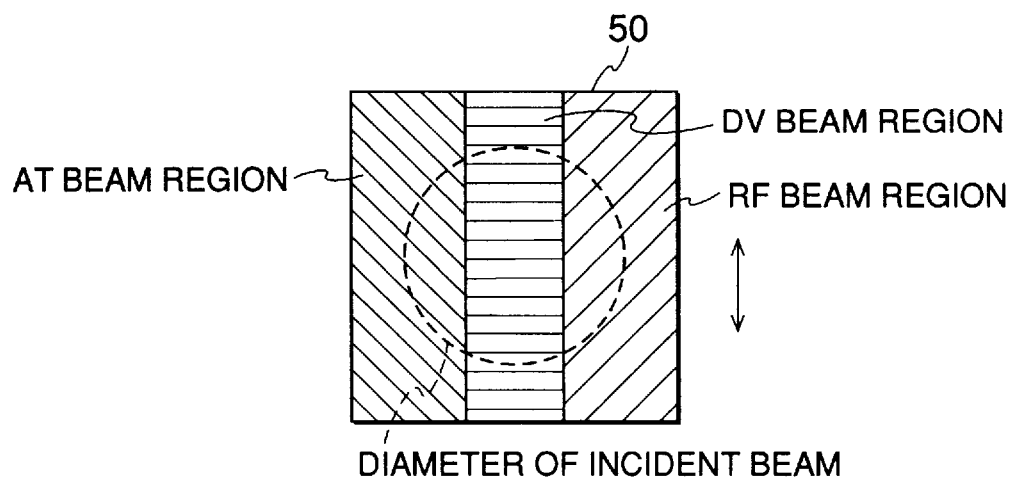
FIG. 38 is a schematic drawing to show the thirteenth embodiment of the diffraction grating used in the present invention.

Therefore, the present invention employs such an arrangement that the region in which the diffraction grating exists is greater than the diameter of the incident beam. FIG. 38 is a schematic drawing to show the thirteenth embodiment of the diffraction grating used in the optical head of the optical information recording and/or reproducing apparatus according to the present invention.

Figure 1:
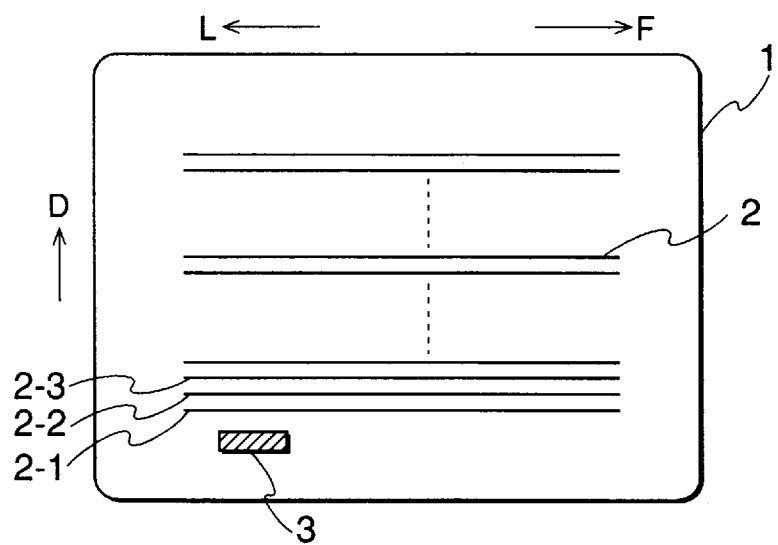
FIG. 1 is a schematic plan view of an optical card.
Figure 2:
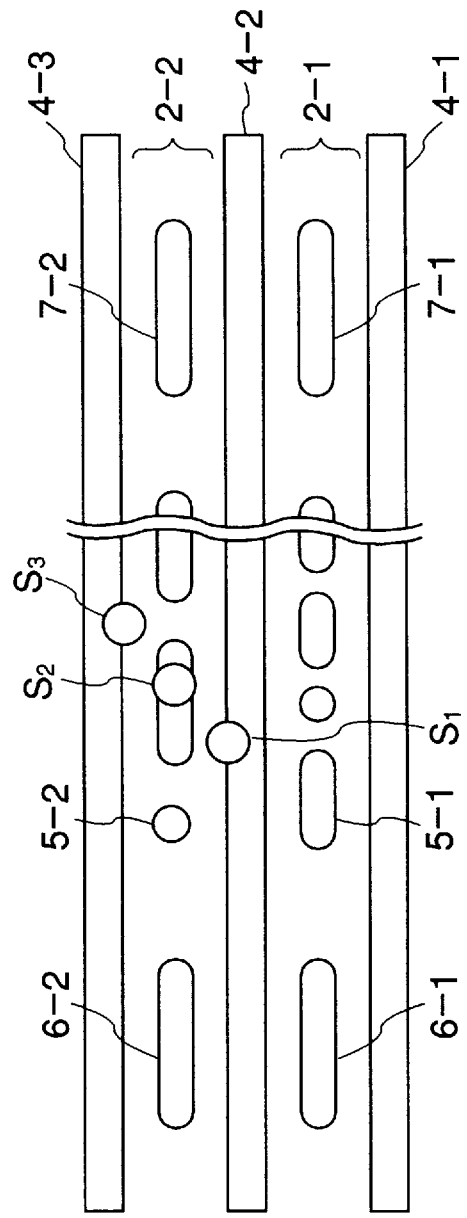
FIG. 2 is a partially enlarged view of the optical card.
Figure 3:
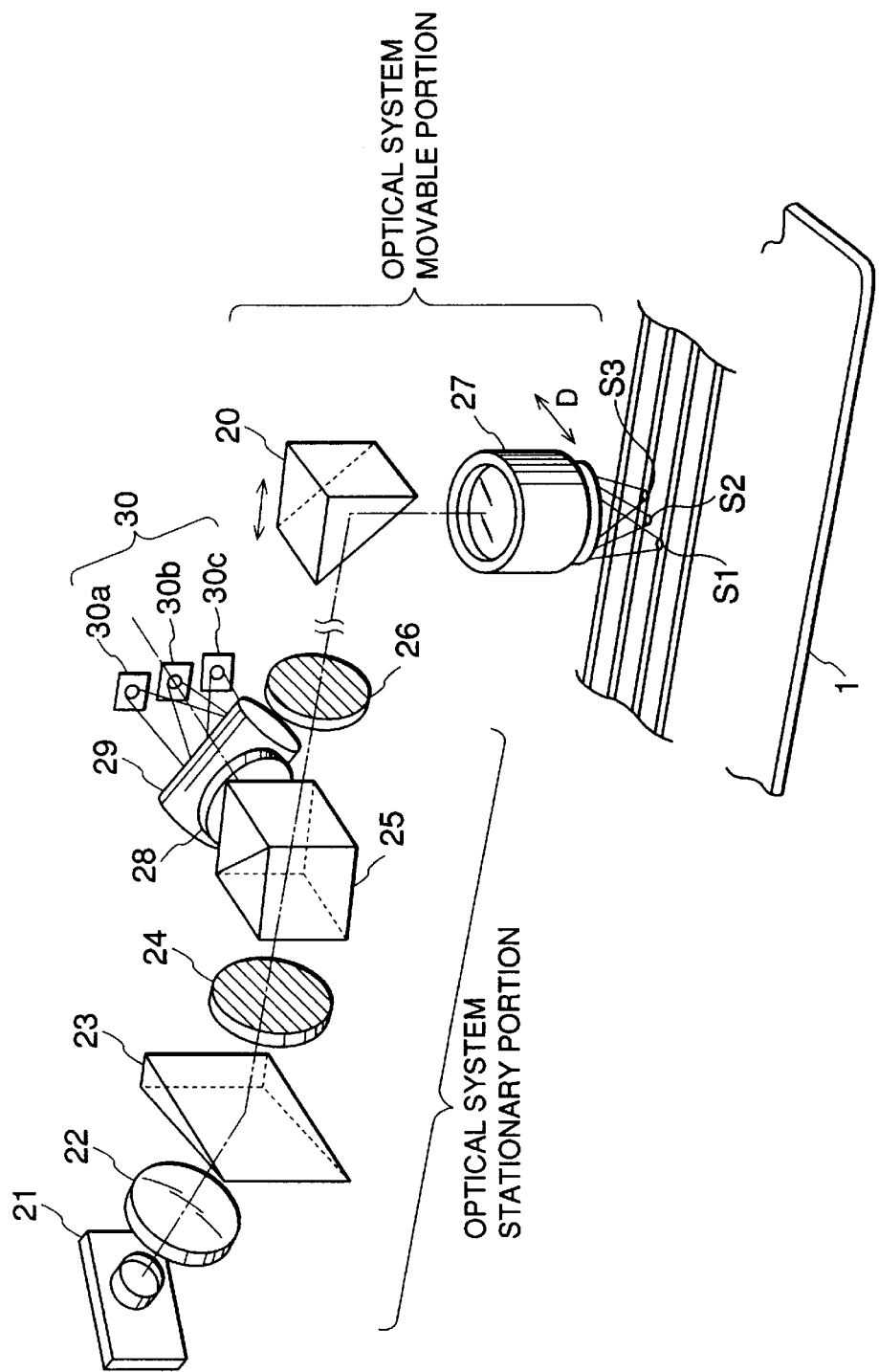
FIG. 3 is a structural drawing to show an optical system of a separate type optical head.
Figure 4:
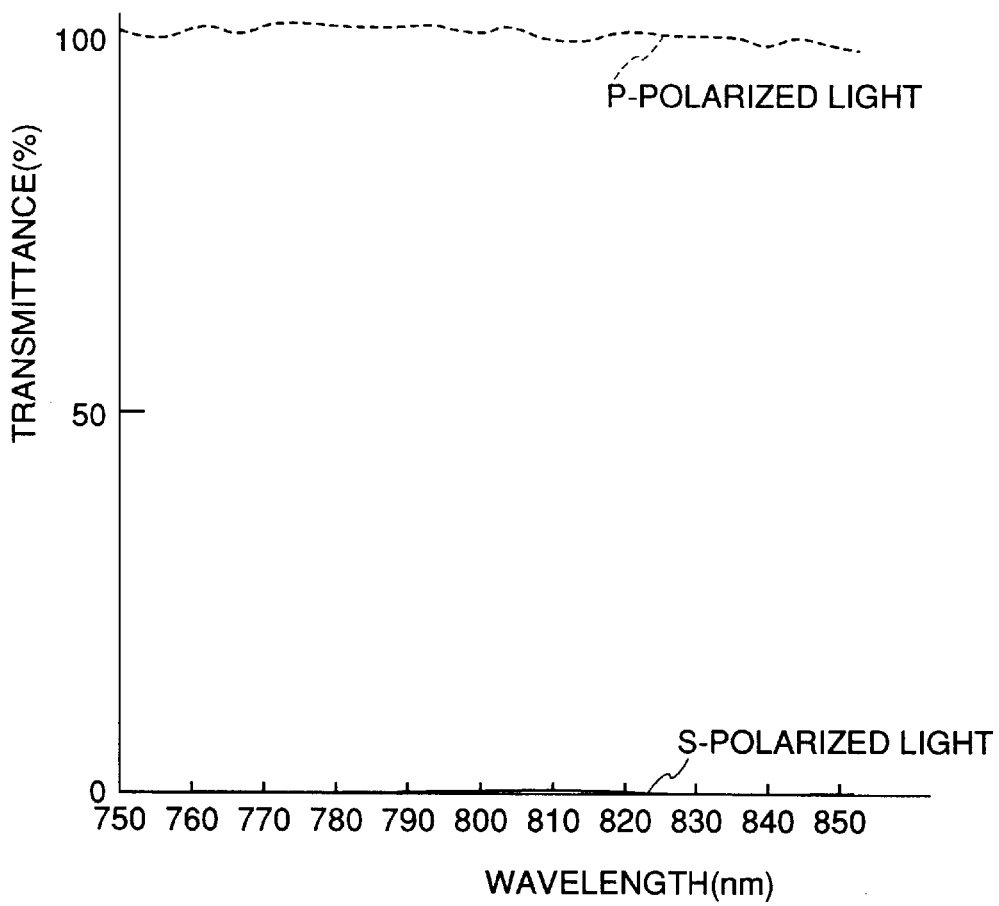
FIG. 4 is a drawing to show spectral characteristics of a polarizing beam splitter.
Figure 5:
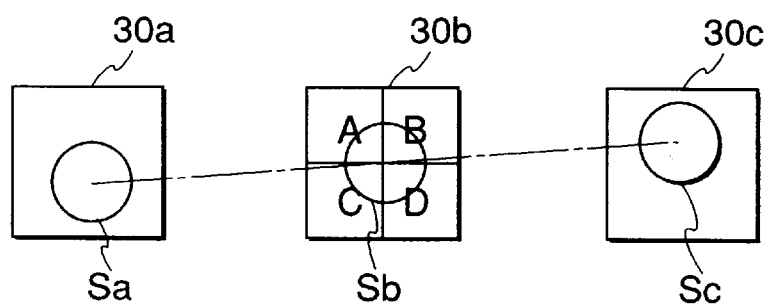
FIG. 5 is a drawing to show a relation between the shape and arrangement of a photodetector and light spots in an optical head of a conventional optical information recording/reproducing apparatus.
Figure 6:
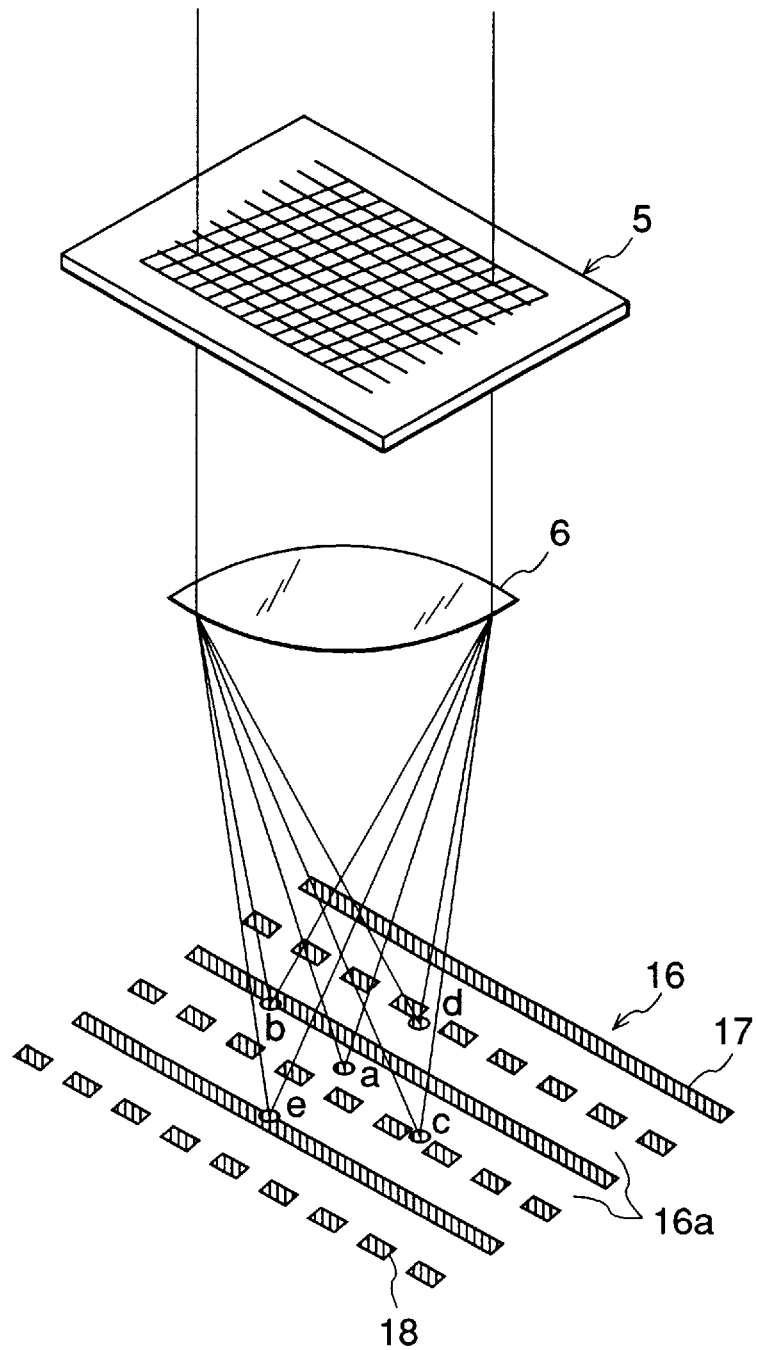
FIG. 6 is a schematic drawing to show an irradiation method of plural light spots with a conventional diffraction grating.
Figure 7:
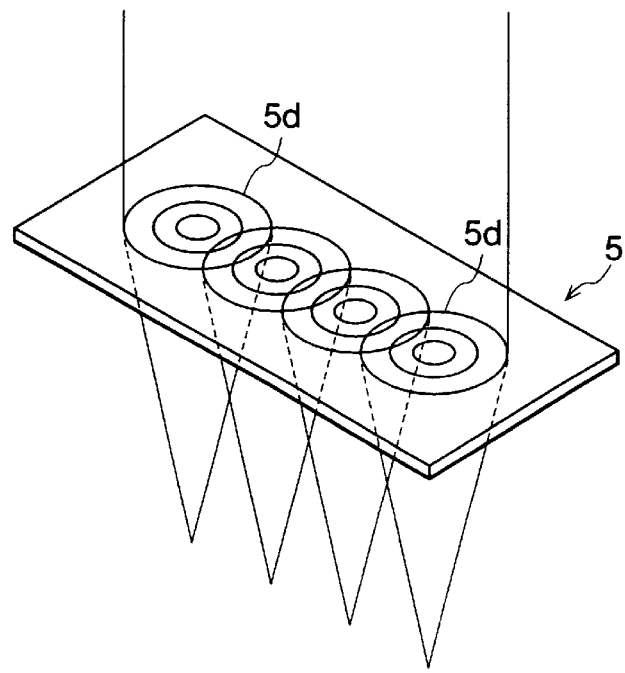
FIG. 7 is a schematic drawing to show another irradiation method of plural light spots with another conventional diffraction grating.
Figure 8:
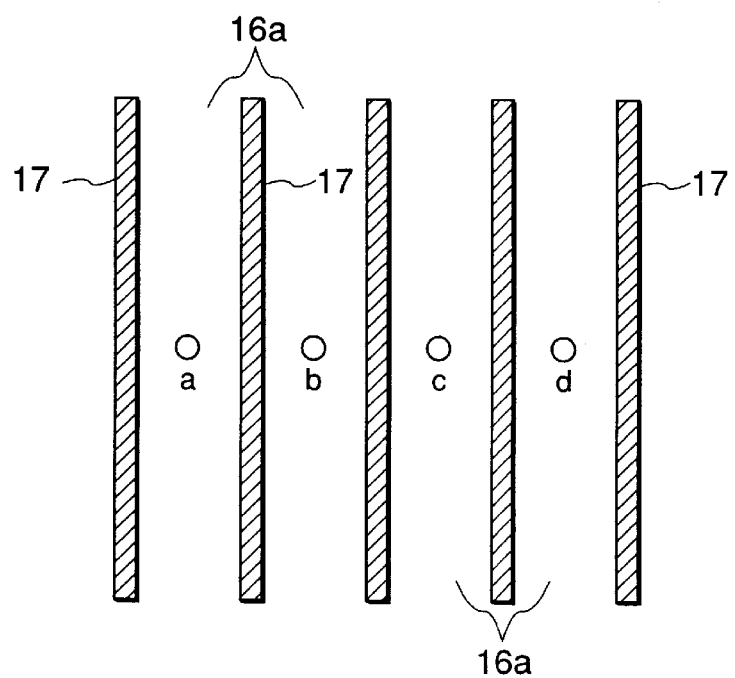
FIG. 8 is a drawing to show locations of the light spots on an optical recording medium with the conventional diffraction grating.

The optical information recording and/or reproducing apparatus of the present embodiment is different from the above apparatus of FIG. 3 only in that the diffraction grating 50 shown in FIG. 38 is used instead of the diffraction grating 24 in the apparatus of the conventional example shown in FIG. 3 and in the shape of the light receiving elements shown in previous FIG. 11 for receiving the beams split by the diffraction grating. Thus, the detailed description of the structure of the entire apparatus is omitted herein.

In the present embodiment, when the diffraction grating 50 having three diffraction regions (the region for DV, the region for AT, the region for RF), as shown in FIG. 38, is disposed in the irradiation optical system, seven spots are formed on the optical card as shown in previous FIG. 10, similarly as with the diffraction grating shown in previous FIG. 9. The seven spots include six spots from the ± first-order diffracted light of the respective diffraction gratings of the regions shown in FIG. 38, and a spot of the zeroth-order beam passing through the diffraction grating 50 without being subjected to the diffraction effect. It is also needless to mention that the spots on the optical card shown in FIG. 10 each correspond to the spots on the light receiving elements shown in FIG. 11 and are detected thereby. The diffraction grating as described can be produced by a method of mechanical cutting, a method of dissolution with a chemical agent, a method of vapor deposition, or the like.

In the thirteenth embodiment of the present invention, as seen from comparison of the diffraction grating of FIG. 38 with the diffraction grating of FIG. 9, the existing region of the diffraction grating is larger than the diameter of the incident beam, which can prevent the changes in the light quantities of the light spots of AT, DV, RF, and W light (the zeroth-order) even with optical-axis deviation between the incident beam and the diffraction grating. Especially, the diffraction grating in the shape shown in FIG. 38 is effective because no change occurs in the light quantities of the respective light spots with optical-axis deviation in the vertical direction in the drawing (or in the direction along the arrow in the drawing).

Figure 39:
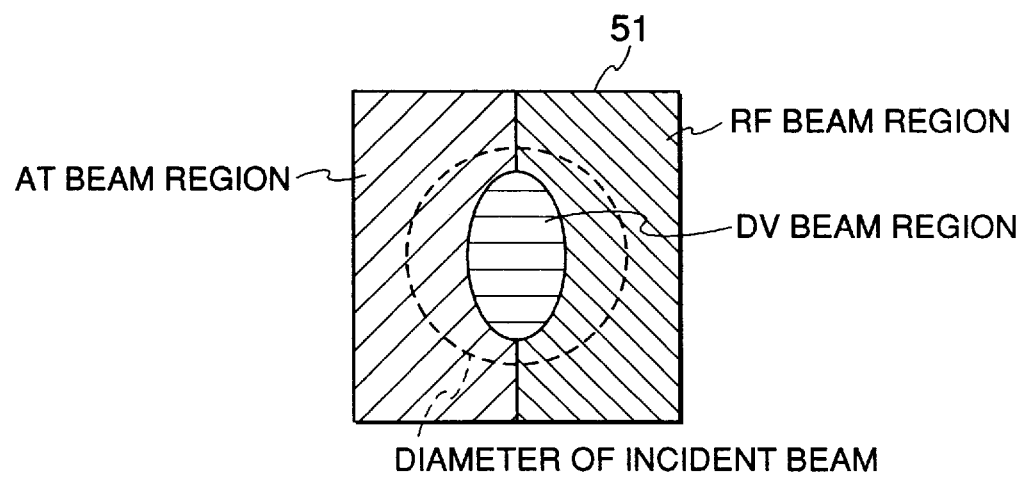
FIG. 39 is a schematic drawing to show the diffraction grating according to the fourteenth embodiment of the present invention.

FIG. 39 is a schematic drawing of the diffraction grating according to the fourteenth embodiment of the present invention.

If all the regions have the same diffraction efficiency, the diffraction grating 51 in the shape as shown in FIG. 39 (or in any shape) always keeps the light quantity of W light (the zeroth-order light) constant even with optical-axis deviation between the beam and the diffraction grating. With the diffraction grating split as shown in FIG. 39, supposing the incident beam is of a Gaussian distribution, when the center of the incident beam impinges upon either one of the regions in the diffraction grating, that region will have a greater beam light quantity. (For example, the light quantity of the beam for DV becomes maximum when the center of the DV region is coincident with the center of the incident beam.) In contrast with it, since the W light is light passing through the diffraction grating without being diffracted, it changes the light quantity of the transmitted beam for every change of the position of the incident beam relative to the diffraction grating in the case of the diffraction efficiencies of the respective regions of the diffraction grating being different from each other, whereas the W light maintains the quantity of transmitted light constant even with a change of the position of the incident beam relative to the diffraction grating in the case of the diffraction efficiencies of the respective regions of the diffraction grating being equal to each other. Accordingly, the light quantity of the W light (the zeroth-order light) is always kept constant.

This can suppress the density differences of recording pits due to the optical-axis deviation, whereby stable reproduction signals can be obtained.

This can eliminate unstable factors of signals caused by errors or by the operation of the movable optical system.

The conditions including the grating pitches of the patterns of the diffraction gratings of the respective regions split as shown in FIG. 38 and FIG. 39, angles of inclination, and so on are determined depending upon a pattern of the light beam spots expected. The present embodiment was explained as to the optical information recording and/or reproducing apparatus associated with the optical card, but the present invention can also be applied to other recording media, for example, magneto-optical disks, cards, and so on, of course.

As explained above, the present invention employs the arrangement in which the diffraction region to cause the diffraction phenomenon of the diffraction grating is greater than the diameter of the incident beam, which enables suppression of the light-quantity change due to the optical-axis deviation between the incident beam and the region for diffraction phenomenon, for example, to suppress the light-quantity change of each light spot of AT, DV, RF, or W light (the zeroth-order light).

If the diffraction grating is further arranged to keep the diffraction efficiencies constant throughout all regions causing the diffraction phenomenon, the light quantity of the W light becomes constant even with optical-axis deviation between the incident beam and the region causing the diffraction phenomenon.

The thirteenth embodiment of the present invention is directed to the diffraction grating for splitting a beam into a plurality of beams, utilizing the diffraction phenomenon, wherein the region causing the diffraction phenomenon is divided into plural regions (AT, DV, and RF regions), emerging directions of diffracted light from the respective regions split are different from each other, and the region causing the diffraction phenomenon is larger than the region (the region represented by the dashed line) irradiated by the beam from the light source. Then the optical element or diffraction grating is irradiated with the beam from the irradiation optical system and the beams emerging from the respective regions split are guided to irradiate the optical information recording medium, thereby recording information in the optical information recording medium and/or reproducing recorded information by detecting the beam from the optical information recording medium.

The thirteenth embodiment of the present invention as explained above is the diffraction grating for splitting a beam from the light source into a plurality of beams, utilizing the diffraction phenomenon, wherein the diffraction region for causing the diffraction phenomenon is split into plural regions, the emerging directions of the diffracted light from the respective regions split are different from each other, and the diffraction region for causing the diffraction phenomenon is larger than the region on the diffraction grating, irradiated with the beam from the light source.

It is also characterized in that the above diffraction grating is irradiated with the beam from the irradiation optical system and the beams emerging from the respective regions split are guided to irradiate the optical information recording medium, thereby recording information in the optical information recording medium and/or reproducing recorded information by detecting the beam from the optical information recording medium.

It is also characterized in that the diffraction region for causing the diffraction phenomenon in the above diffraction grating is split into three regions, the light not subjected to the effect of the diffraction phenomenon out of the beams split by the optical element is used as a recording beam, and the other light subjected to the diffraction phenomenon is used as direct verifying light, autotracking light, and reproducing light.

It is also characterized in that the diffraction region for causing the diffraction phenomenon, split into the plural regions, in the above diffraction grating has the same diffraction efficiency throughout the entire region.

A further embodiment of the present invention will be explained.

Figure 40:
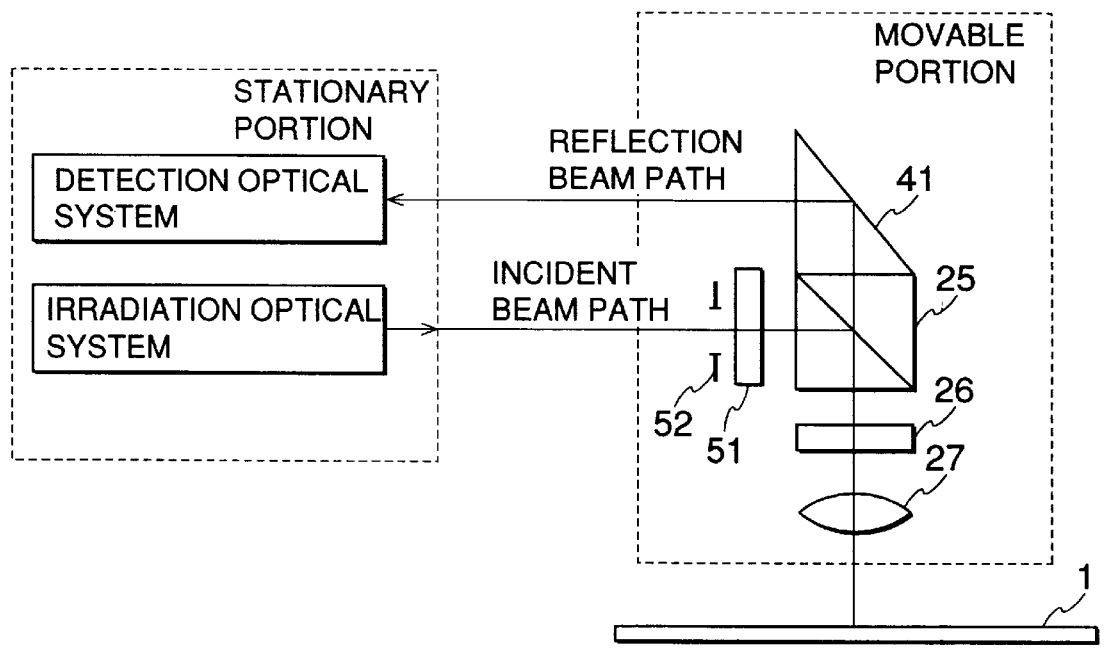
FIG. 40 is a drawing to show the schematic structure of a head optical system associated with the fifteenth embodiment of the optical information recording/reproducing apparatus of the present invention.

FIG. 40 is a drawing to show the schematic structure of the head optical system according to the fifteenth embodiment of the optical information recording and/or reproducing apparatus of the present invention. As shown in the drawing, the diffraction grating 51 is positioned in the movable unit in the present embodiment. This permits the optical pathlength of travel of the diffracted light to be kept constant even with a change of the position of the movable unit, thereby suppressing occurrence of beam eclipse and AT offset resulting therefrom.

When the diffraction grating is positioned in the movable unit and if the aperture for restricting the diameter of the irradiating beam were positioned in the stationary unit, the following problems could arise in some cases.

(1) Since the light passing through the aperture is diffracted to expand, the diameter of the beam becomes greater than a designed value when entering the diffraction grating.

This results in forming smaller spots on the card than designed.

Further, the spot diameters will change on the card, because the diameter of the incident beam changes depending upon the position of the movable unit.

(2) The light quantities of the respective diffracted beams change if there is positional deviation of the movable unit.

Therefore, the present invention employs such an arrangement that the aperture 52 is also positioned together with the diffraction grating 51 in the movable unit, as shown in FIG. 40. The diffraction grating and aperture may be separately positioned or be integrally arranged by means of adhesion, vapor deposition, or the like.

Figure 41:
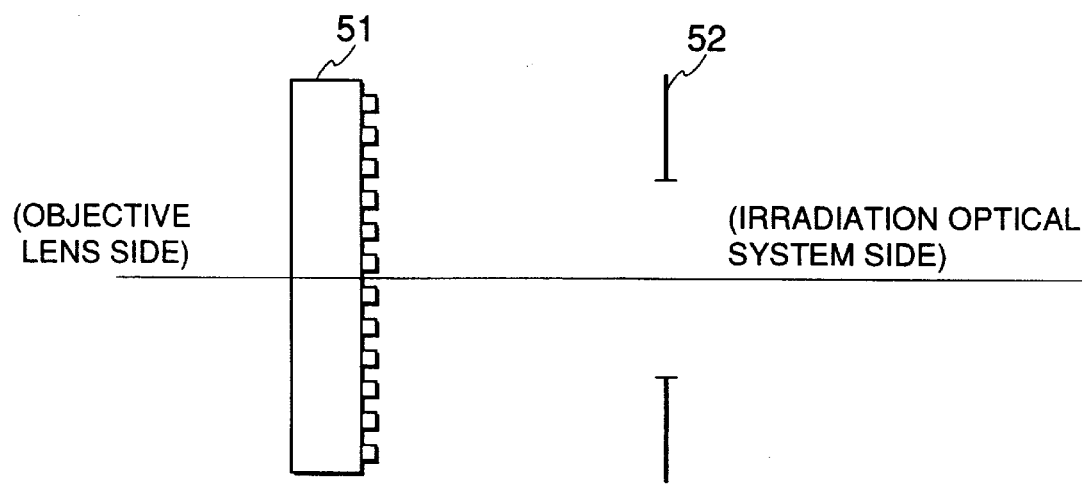
FIG. 41 is a schematic structural drawing where the diffraction grating and the aperture are positioned separately from each other.

FIG. 41 is a schematic structural drawing where the diffraction grating and aperture are separately set. As shown in FIG. 41, the diffraction grating 51 and aperture 52 are separately positioned, and the aperture is set on the irradiation optical system side. A beam emitted from the irradiation optical system passes through an opening portion of the aperture 52 to irradiate the diffraction grating 51 and to be split into plural beams by the diffraction grating 51.

FIGS. 42A, 42B and FIGS. 43A and 43B are schematic structural drawings where the diffraction grating and aperture are integrally formed. FIGS. 42A and 42B are drawings to show an example in which the aperture is provided on the grating-formed surface of the diffraction grating and FIGS. 43A and 43B are drawings to show an example in which the aperture is provided on the back surface of the diffraction grating opposite to the grating-formed surface. In FIGS. 42A and 42B FIGS. 43A and 43B, reference numeral 53 designates the aperture-added diffraction grating.

Generally known methods for forming the diffraction grating include the method of mechanical cutting, the method of dissolution with a chemical agent or the like, the method of vapor deposition, and so on, and the present embodiment employed the vapor deposition method to form the diffraction grating. The aperture may be produced by perforating a thin plate such as a metal or by vapor-depositing a substance for shielding light on the grating-formed surface or on the back surface of a glass plate with the diffraction grating formed therein.

This arrangement in which the aperture is set together with the diffraction grating in the movable unit can solve the aforementioned problems (1), (2).

First, concerning the point that the beam diameter becomes greater than designed when entering the diffraction grating because of the diffraction and expansion of the light passing through the aperture, the causes of which are presumably a large distance between the aperture and the diffraction grating and a change of the distance, it is overcome by the arrangement in which the diffraction grating and aperture are set in the movable unit.

Further, concerning the point that the light quantities of the respective diffracted beams change with positional deviation of the movable unit, the causes of which are presumably axis deviation between the aperture center (the center of the incident beam) and the center of the diffraction grating and a change thereof depending upon the position of the movable unit, the arrangement in which the diffraction grating and aperture are set in the movable unit surely realizes far better accuracy, though the axis deviation between the aperture center and the diffraction grating center depends upon the accuracies of components, as compared with the case where the aperture is set in the stationary unit, and stops the change depending upon the position of the movable unit.

When the diffraction grating and aperture are integrally formed, the arrangement is almost free from the problems due to the distance between the aperture and the diffraction grating and the axis deviation between the aperture center (the center of the incident beam) and the center of the diffraction grating.

Further, axis deviation between the aperture center and the center of the incident beam is also a cause to change the light quantities of the respective diffracted beams if the intensity distribution of the incident beam is of a steep slope. However, the deviation will raise no trouble if the intensity distribution of the incident beam is uniform or if the intensity distribution is gentle. The incident beam of the optical head of the present embodiment has such an intensity distribution.

The diffraction grating 51 used in the present embodiment is constructed as shown in FIG. 39. It is a matter of course that the diffraction grating used in the present invention is not limited to only this diffraction grating.

The diffraction grating 51 consists of three diffraction regions (the region for AT, the region for DV, and the region for RF). When this diffraction grating is used, seven light spots are formed on the optical card, as shown in previous FIG. 10, thereby enabling the device to perform the forward and backward recording and the simultaneous reproduction of plural tracks. The seven light spots include six spots from the ± first-order light beams of the diffraction gratings of the respective regions shown in previous FIG. 39, and a spot of the zeroth-order beam passing through the diffraction grating without being subjected to the diffraction effect thereof.

The forward and backward recording can be performed using the spots arranged in this manner so that upon recording, the zeroth-order light spot is used as a recording beam while the DV light spots positioned before and after the zeroth-order light spot in the track running direction are used to verify the recorded information in either running direction of the track. Upon reproduction, the two RF light spots and the zeroth-order light spot (or a DV light spot) shown in previous FIG. 10 are used as reproducing spots so as to enable simultaneous reproduction of three tracks.

The AF control and AT control at this time are carried out as follows. The AF control is carried out by the astigmatic method as employed in the conventional apparatus by detecting the reflected light from the zeroth-order light spot by the quartered element. The AT control is carried out by detecting reflected light of the two AT light spots shown in previous FIG. 10 and taking a difference between them.

This embodiment employs the AF control with the quartered light receiving element for receiving the reflected light from the zeroth-order light spot, but the AF control may be performed by using either one or all of the elements for receiving the reflected light from the other light spots, i.e., from the RF light spots and DV light spots in the quartered structure. The present embodiment was explained as to the optical information recording and/or reproducing apparatus associated with the optical card, but the present invention can also be applied to the apparatus associated with the other recording media, for example, magneto-optical disks, cards, and so on.

The fifteenth embodiment of the present invention as described above is directed to the optical information recording and/or reproducing apparatus which comprises the optical head consisting of the stationary unit having the irradiation optical system and the movable unit being movable relative to the stationary unit and having the objective lens, and which records information in the optical information recording medium by irradiation with the beam from the irradiation optical system and/or reproduces recorded information by detecting the beam from the optical information recording medium by irradiation with the beam from the irradiation optical system, wherein the aperture for restricting the beam from the irradiation optical system and the diffraction grating for splitting the beam are positioned in the movable unit.

As explained above, the present invention employs the arrangement in which the aperture and diffraction grating are positioned in the movable unit, whereby the spot diameters and light quantities as designed can be obtained regardless of the position of the movable unit.

The fifteenth embodiment of the present invention as explained above is the optical information recording and/or reproducing apparatus which comprises the optical head comprised of the stationary unit having the irradiation optical system and the movable unit being movable relative to the stationary unit and having the objective lens and which records information in the optical information recording medium by irradiation with the beam from the irradiation optical system and/or reproduces recorded information by detecting the beam from the optical information recording medium by irradiation with the beam from the irradiation optical system, wherein the aperture for restricting the beam from the irradiation optical system and the diffraction grating, in which the plurality of different diffraction regions, formed without overlapping with each other, for splitting the beam from the irradiation optical system into the plurality of beams, are arranged in the movable unit.

It is also characterized in that the aperture is positioned between the irradiation optical system and the diffraction grating.

It is also characterized in that the aperture is formed on a grating-formed surface of the diffraction grating.

It is also characterized in that the aperture is formed on a back surface of the diffraction grating opposite to the grating-formed surface.

A further embodiment of the present invention will be explained.

The sixteenth embodiment of the present invention is arranged to use a beam passing near the optical axis of the objective lens out of the plurality of beams, for the AF control.

Figure 44:
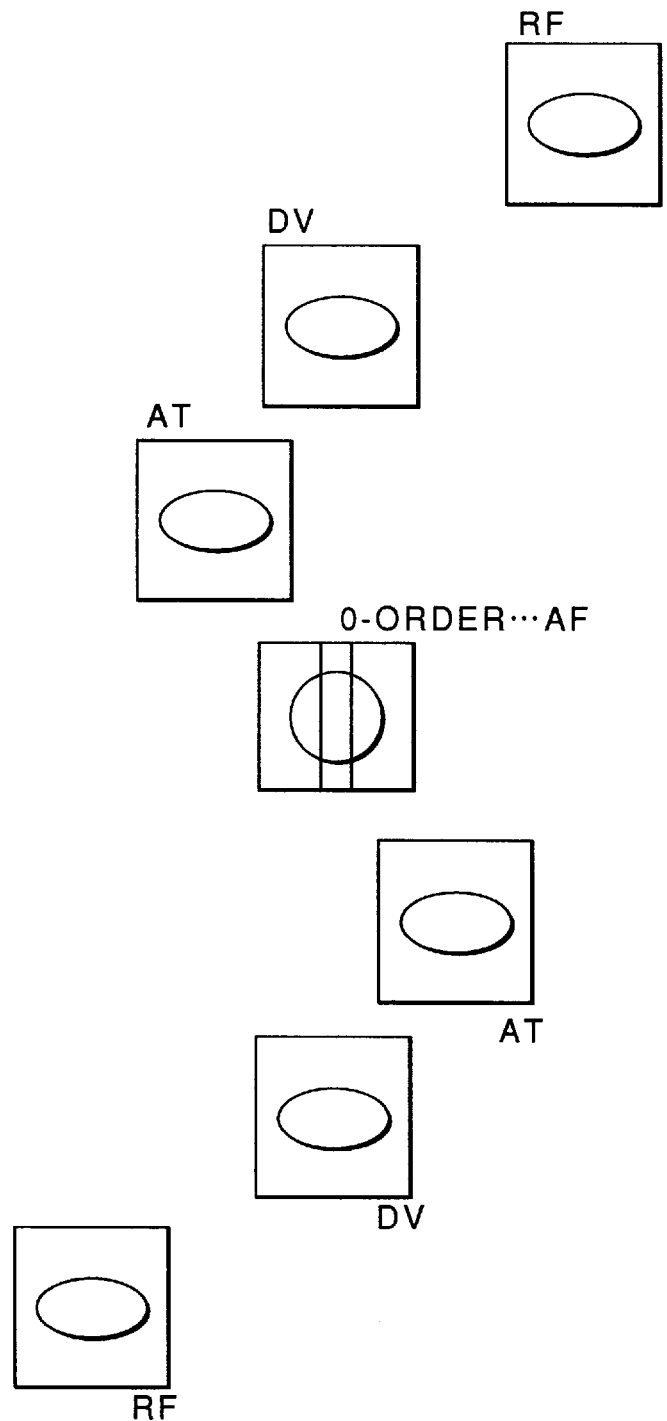
FIG. 44 is a drawing to show a relation between the shape and arrangement of a photodetector and light spots in the sixteenth embodiment of the present invention.

FIG. 44 is a drawing to show a relation between the shape and arrangement of the photodetector and the light spots according to the sixteenth embodiment of the present invention. In the present embodiment, only the shape and arrangement of the photodetector shown in FIG. 44 is different from those of the photodetector shown in FIG. 11. Except for this point, the structure of the head optical system of the optical information recording and/or reproducing apparatus is the same as the structure of the first embodiment. Therefore, the description of the entire apparatus is omitted herein.

Since the sixteenth embodiment of the present invention shown in FIG. 44 uses the beam passing near the optical axis of the objective lens (which is desirably a beam nearly parallel to the optical axis and having the beam center nearly coincident with the optical axis, if possible) as a beam for AF control, the positional deviation (horizontal deviation) rarely occurs (or does not occur) upon defocus.

Therefore, the present embodiment can perform good AF control without AF offset.

Also, in the embodiments shown in FIG. 11 and FIG. 14, the AF control is performed using the spot of the beam (the zeroth-order beam in the embodiments) passing near the optical axis of the objective lens, thereby suppressing the positional deviation upon defocus and thus enabling the device to perform good AF control without occurrence of AF offset.

The sixteenth embodiment of the present invention as explained above is directed to the optical information recording and/or reproducing apparatus which comprises the optical head for radiating the beam from the irradiation optical system to the optical information recording medium and projecting the beam from the optical information recording medium to the detection optical system and which records information in the optical information recording medium and/or reproduces recorded information by irradiation with the beam from the irradiation optical system, the apparatus comprising the diffraction grating having the plurality of diffraction regions of different grating patterns, for splitting the beam from the irradiation optical system into the plurality of beams, the optical system for condensing the plurality of beams in the form of separate spots on the optical information recording medium, and the photodetector for detecting the plurality of beams from the optical information recording medium, wherein a beam substantially symmetric with respect to the optical axis of the objective lens out of the plurality of beams is used for the AF control.

The sixteenth embodiment of the present invention as explained above is the optical information recording and/or reproducing apparatus which comprises the optical head for radiating the beam from the irradiation optical system to the optical information recording medium and projecting the beam from the optical information recording medium to the detection optical system and which records information in the optical information recording medium and/or reproduces recorded information by irradiation with the beam from the irradiation optical system, the apparatus comprising the diffraction grating having the plurality of diffraction regions of different grating patterns, for splitting the beam from the irradiation optical system into the plurality of beams, the optical system for condensing the plurality of beams in the form of separate spots on the optical information recording medium, and the photodetector for detecting the plurality of beams from the optical information recording medium, wherein the beam substantially symmetric with respect to the optical axis of the objective lens out of the plurality of beams is used for the AF control.

It is also characterized in that the beam used for the AF control is the zeroth-order beam.

It is also characterized in that the beam used for the AF control is an AF control beam, which is a beam passing through the central diffraction region of the diffraction grating having the plurality of diffraction regions.

It is also characterized in that the AF control is one based on the astigmatic method.

It is also characterized in that the AF control is one based on a beam size method.

Further embodiments of the present invention will be explained.

Figure 45:
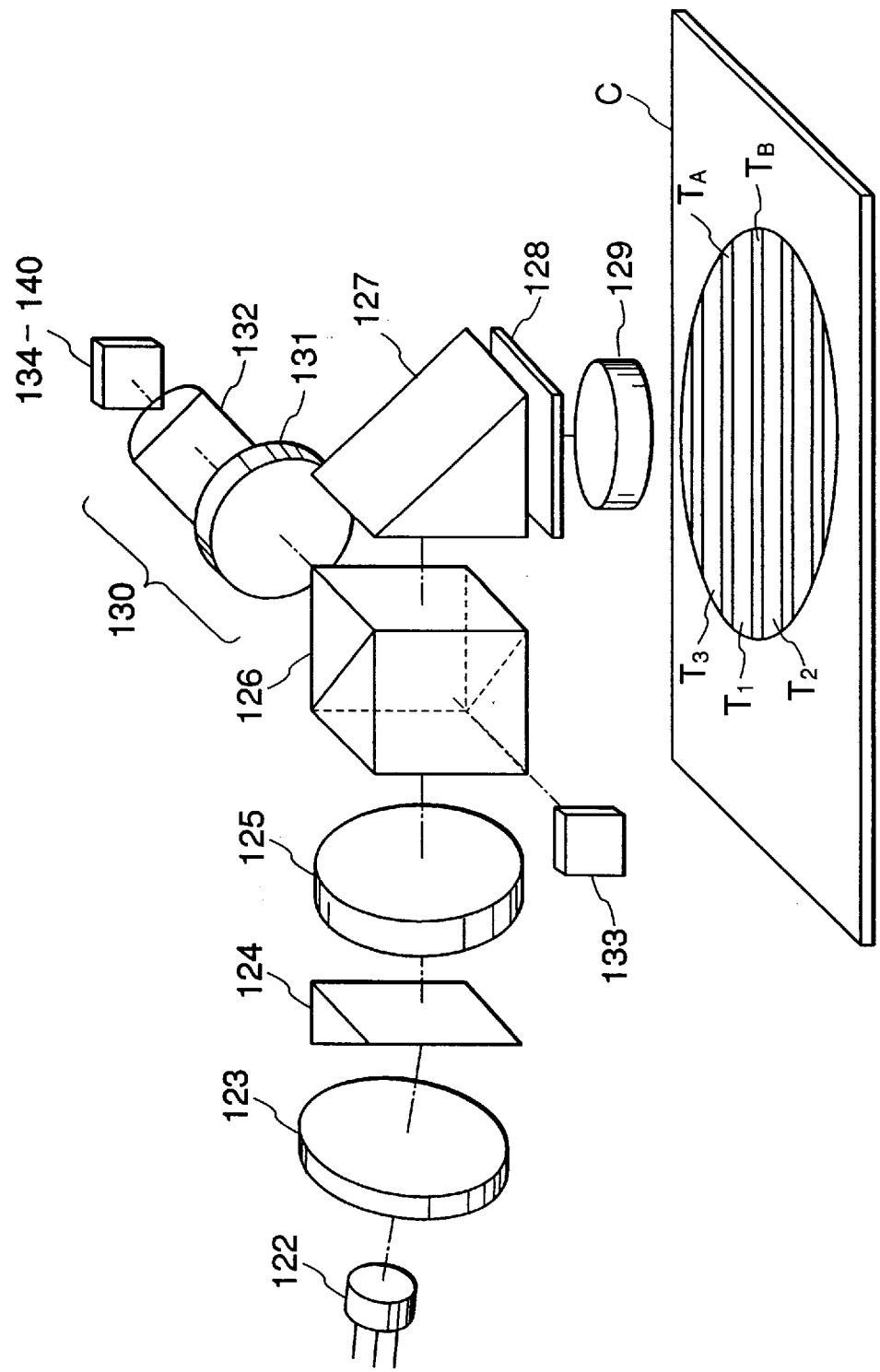
FIG. 45 is a schematic structural drawing to show an optical head in the seventeenth embodiment of the optical information recording/reproducing apparatus according to the present invention.

FIG. 45 is a schematic structural drawing to show the optical head of the seventeenth embodiment of the optical information recording and/or reproducing apparatus according to the present invention.

The seventeenth embodiment of the present invention is the optical information recording and/or reproducing apparatus arranged to use the diffraction grating having a plurality of diffraction regions with different diffraction angles to split a beam into the zeroth-order diffracted beam, and the first-order diffracted beams and higher-order diffracted beams of the second or higher order by the respective regions, to radiate the zeroth-order and first-order diffracted beams in the form of respective light spots to the optical information recording medium, and to detect beams from the respective light spots on the recording medium by the photodetector, thereby recording or reproducing information with the recording medium by irradiation with the light spots, wherein grating directions and grating pitches of the respective diffraction regions in the diffraction grating are set so that a beam (spot $S'_{AT3}$) from the recording medium, based on the higher-order diffracted beam, is guided to impinge on a region other than the photodetector 134–140 for detecting the beams (spots $S'_O$, $S'_{AT}$, $S'_{DV}$, $S'_{RF}$) from the recording medium, based on the zeroth-order and first-order diffracted beams.

In FIG. 45, reference numeral 122 denotes a semiconductor laser, and a beam emitted therefrom is collimated by a collimator lens 123. The beam thus collimated travels through a shaping prism 124 to enter the diffraction grating 125 to be split into a plurality of beams.

Further, each beam is split into transmitted light and reflected light by a polarizing beam splitter 126, and the reflected light is projected onto a monitoring photodetector 133. On the other hand, the transmitted light travels via a bending mirror 127, a quarter wave plate 128, and an objective lens 129 to be focused as light spots on the optical card C. Reflected light from these light spots travels again through the objective lens 129 and quarter wave plate 128 to be reflected by the bending mirror 127 and then be reflected by the polarizing beam splitter 126 to be projected each onto the photodetector 134–140 by the detection optical system 130. The detection optical system 130 is an astigmatic system composed of a spherical lens 131 and a cylindrical lens 132, and the cylindrical lens 132 is arranged so as to match with the direction inclined 45° relative to the tracks.

FIG. 46A and 46B are schematic drawings of the diffraction grating 125, in which 125a is an AT diffraction region for generating beams for AT control, 125b is a DV diffraction region for generating beams for direct verification (DV) to enable reproduction of information immediately after recording, 125c an RF diffraction region for generating information reproducing (RF) beams for reproducing information in information tracks adjacent to an information track irradiated with the recording light, and 145 is an incident beam. The diffraction angles $\theta_n$ of diffracted light are determined by $\theta_n = N \cdot \lambda / d$ (where N is the order of diffraction) where d is the grating pitch and $\lambda$ is the wavelength of the incident beam, and the diffraction directions are determined by an inclination angle $\delta$ of the grating- as, shown in the partially enlarged view in FIG. 46A and 46B.

Therefore, by properly setting the grating pitch d and the grating inclination angle $\delta$ of each of the above diffraction regions 125a–125c, the recording and AF light spot $S_O$ can be formed from the zeroth-order diffracted beam and the AT light spots $S_{AT}$, DV light spots $S_{DV}$, and RF light spots $S_{RF}$ can be formed from the ± first-order diffracted beams of the three diffraction regions, as shown in FIG. 47.

Here, the X direction and Y direction on the optical card shown in FIG. 47 optically correspond to the X' direction and Y' direction on the diffraction grating 125 shown in FIGS. 46A and 46B.

In the present embodiment, as shown by hatching in FIGS. 46A and 46B, the grating direction of the DV diffraction region 125b is aligned with the X' direction (i.e., with the direction optically corresponding to the direction X perpendicular to the track direction Y of the optical card C), and the grating directions of the AT diffraction region 125a and RF diffraction region 125c are inclined at respective acute angles in mutually different directions relative to the X' direction. (Namely, the grating direction of the AT diffraction region 125a is aligned with the direction of from upper left to lower right in FIG. 46 while the grating direction of the RF diffraction region 125c with the direction of from lower left to upper right in FIGS. 46A and 46B.) The grating pitch of the AT diffraction region 125a is largest while that of the RF diffraction region 125c is smallest. Therefore, the diffraction angles of the first-order diffracted light of the AT diffraction region 125a are smallest while those of the RF diffraction region 125c are largest.

Under such circumstances, as shown in FIG. 47, the recording and AF light spot $S_O$ is formed from the zeroth-order diffracted beam, and, from the ± first-order diffracted beams by the three diffraction regions 125a–125c, the DV light spots $S_{DV}$ are formed on both sides of the light spot $S_O$ in the Y direction, the AT light spots $S_{AT}$ are formed on both sides of the light spot $S_O$ in the direction inclined at the acute angle clockwise in FIG. 47 relative to the Y direction, and the RF light spots $S_{RF}$ are formed on both sides of the light spot $S_O$ in the direction inclined at the acute angle counterclockwise in FIG. 47 relative to the Y direction. In FIG. 47, $T_A$, $T_B$ represent tracking tracks, and $T_1$, $T_2$, $T_3$ information tracks.

Figure 48:
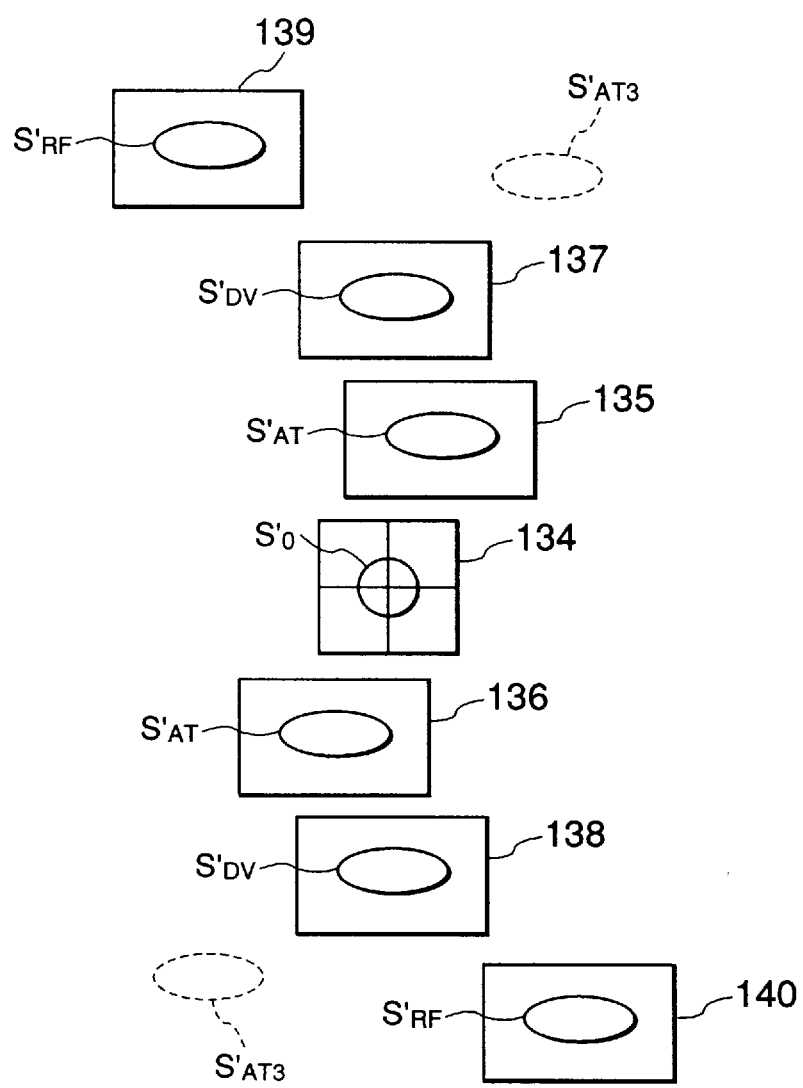
FIG. 48 is a schematic drawing to show states of light spots formed on the photodetector in the seventeenth embodiment of the optical information recording/reproducing apparatus according to the present invention.

FIG. 48 is a drawing to show the arrangement of the photodetector elements 134–140 and the light spots formed thereon. The light spots $S'_O$, $S'_{AT}$, $S'_{DV}$, $S'_{RF}$ corresponding to the light spots $S_O$, $S_{AT}$, $S_{DV}$, $S_{RF}$ on the optical card C are formed on the predetermined photodetector elements 134–140. The AF control is carried out by the astigmatic method, based on an output from the quartered photodetector 134, the AT control is based on outputs from the photodetector elements 135, 136, DV is based on outputs from the photodetector elements 137, 138, and reproduction of information is based on outputs from the photodetector elements 139, 140.

In the present embodiment, as shown in FIG. 47, the light spots $S_{AT3}$ on the optical card from the third-order diffracted beams of the AT diffraction region 125a are formed at positions completely different from those of the light spots $S_{RF}$ on the optical card from the first-order diffracted beams of the RF diffraction region 125c. Accordingly, as shown in FIG. 48, the light spots $S'_{AT3}$ are formed in the regions other than the photodetector elements 139, 140 and therefore, they do not negatively affect the reproduction of information.

Figure 49:
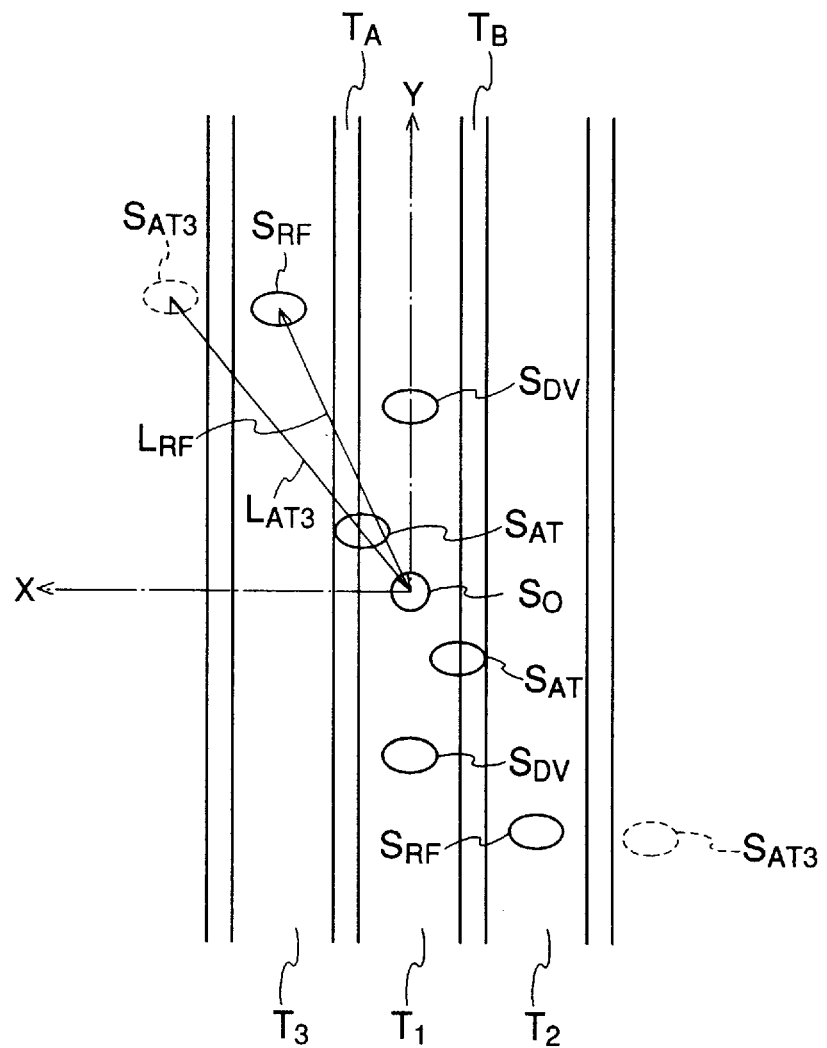
FIG. 49 is a schematic drawing to show states of light spots formed on the optical card in the eighteenth embodiment of the optical information recording/reproducing apparatus according to the present invention.
Figure 50:
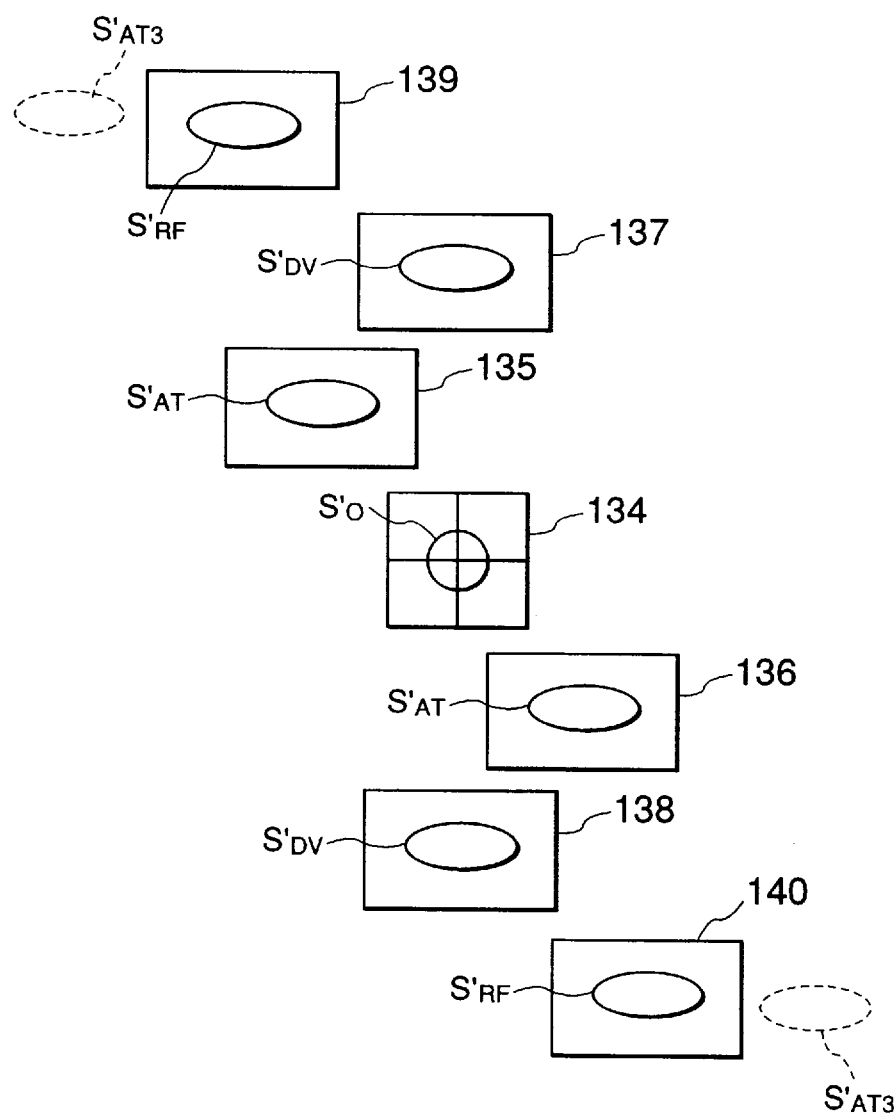
FIG. 50 is a schematic drawing to show states of light spots formed on the photodetector in the eighteenth embodiment of the optical information recording/reproducing apparatus according to the present invention.

FIG. 49 is a schematic drawing to show states of the light spots formed on the optical card in the eighteenth embodiment of the optical information recording and/or reproducing apparatus according to the present invention, and FIG. 50 is a schematic drawing to show states of the light spots formed on the photodetector elements in the present embodiment. In these drawings, the same reference symbols denote members having functions similar to those in above FIG. 45 to FIG. 48. The present embodiment has the optical head in structure similar to that shown in above FIG. 45. However, the present embodiment is different from the above embodiment only in the structure of the three diffraction regions 125a–125c in the diffraction grating 125, and the grating directions and grating pitches of the respective diffraction regions in the diffraction grating 125 are set so as to form the following light spots.

As shown in FIG. 49, the recording and AF light spot $S_O$ is formed from the zeroth-order diffracted beam, and, from the ± first-order diffracted beams by the three diffraction regions, the DV light spots $S_{DV}$ are formed on both sides of the light spot $S_O$ in the Y direction, the AT light spots $S_{AT}$ are formed on both sides of the light spot $S_O$ in the direction inclined at the acute angle counterclockwise in FIG. 49 relative to the Y direction, and the RF light spots $S_{RF}$ are formed on both sides of the light spot $S_O$ in the direction inclined at the acute angle counterclockwise in FIG. 49 relative to the Y direction.

Then the following relation holds in the present embodiment:

$$\tan\theta_{max}\cdot\sin\beta < \tan 3\theta_{min}\cdot\sin\alpha$$

where $\theta_{min}$ is the diffraction angle of the AT diffraction region with the smallest diffraction angle of the first-order diffracted light out of the three diffraction regions in the diffraction grating, $\theta_{max}$ the diffraction angle of the RF diffraction region with the largest diffraction angle of the first-order diffracted light, and $\alpha$ and $\beta$ are the angles of the grating directions of the AT diffraction region and RF diffraction region relative to the X' direction. Accordingly, the light spots $S_{AT3}$ are positioned farther from the light spot $S_O$ than the light spots $S_{RF}$ in the X direction.

In addition, the distance $L_{AT3}$ between the light spot $S_{AT3}$ and the light spot $S_O$ is larger than the distance $L_{RF}$ between the light spot $S_{RF}$ and the light spot $S_O$.

Therefore, as shown in FIG. 50, the light spots $S'_{AT3}$ are formed in the regions other than the photodetector elements 139, 140 and do not negatively affect the reproduction of information. Since no influence appears with the light spots $S'_{AT3}$ being outside the effective diameter of the optical system, they do not have to reach the same plane as that of the photodetector, and therefore, the effective diameter of the optical system does not have to be increased.

Figure 51:
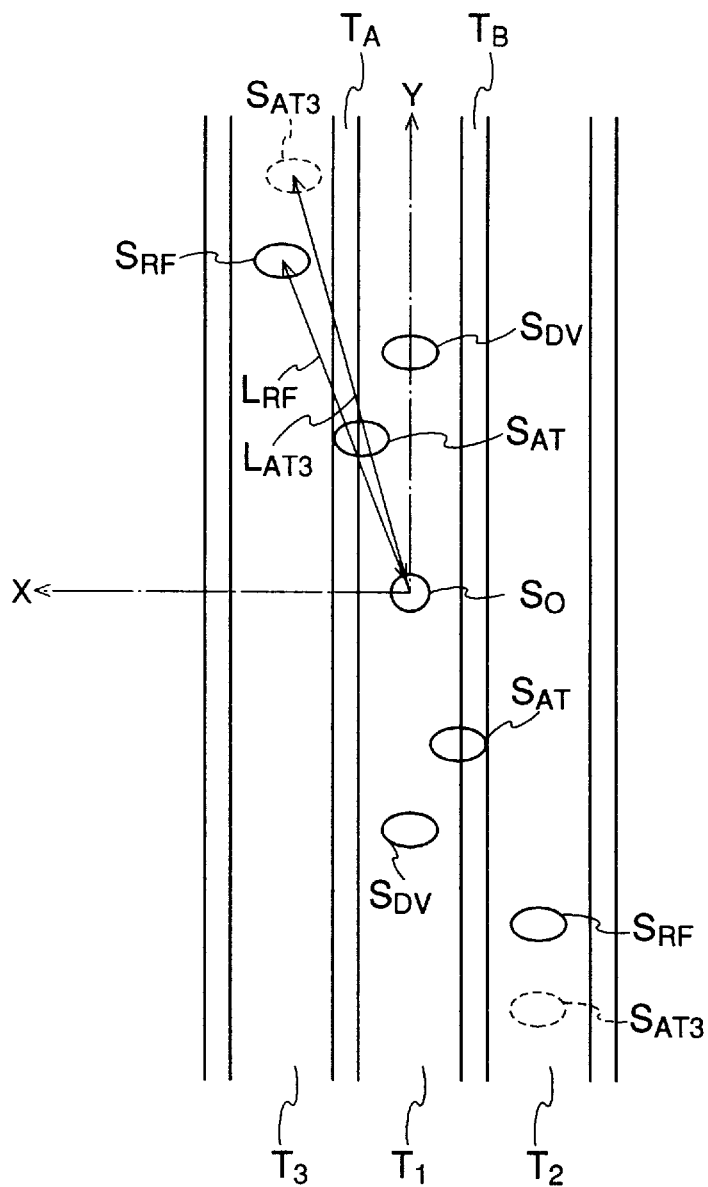
FIG. 51 is a schematic drawing to show states of light spots formed on the optical card in the nineteenth embodiment of the optical information recording/reproducing apparatus according to the present invention.
Figure 52:
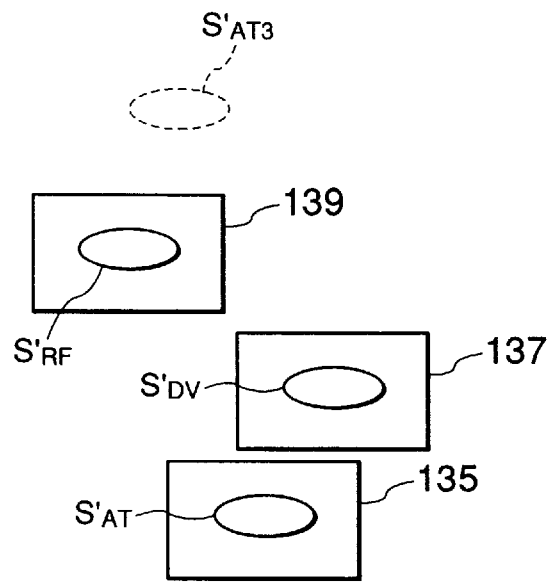
FIG. 52 is a schematic drawing to show states of light spots formed on the photodetector in the nineteenth embodiment of the optical information recording/reproducing apparatus according to the present invention.
Figure 52:
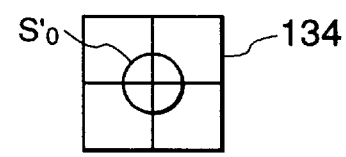
Figure 52:
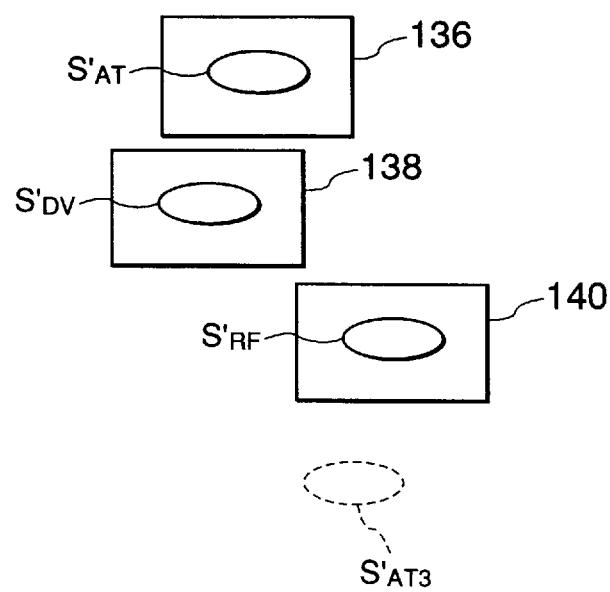

FIG. 51 is a schematic drawing to show states of the light spots formed on the optical card in the nineteenth embodiment of the optical information recording and/or reproducing apparatus according to the present invention, and FIG. 52 is a schematic drawing to show states of the light spots formed on the photodetector elements in the present embodiment. In these drawings, the same reference symbols represent members having functions similar to those in above FIG. 45 to FIG. 50. The present embodiment has the optical head in the structure similar to that shown in above FIG. 45. However, the present embodiment is different from the above embodiment only in the structure of the three diffraction regions 125a–125c in the diffraction grating 125, and the grating directions and grating pitches of the respective diffraction regions in the diffraction grating 125 are set so as to form the following light spots.

As shown in FIG. 51, the recording and AF light spot $S_O$ is formed from the zeroth-order diffracted beam, and, from the ± first-order diffracted beams by the three diffraction regions, the DV light spots $S_{DV}$ are formed on both sides of the light spot $S_O$ in the Y direction, the AT light spots $S_{AT}$ are formed on both sides of the light spot $S_O$ in the direction inclined at the acute angle counterclockwise in FIG. 51 relative to the Y direction, and the RF light spots $S_{RF}$ are formed on both sides of the light spot $S_O$ in the direction inclined at the acute. angle counterclockwise in FIG. 51 relative to the Y direction.

Then, the following relation holds in the present embodiment:

$$\tan\theta_{max}\cdot\cos\beta < \tan 3\theta_{min}\cdot\cos\alpha$$

where $\theta_{min}$ is the diffraction angle of the AT diffraction region with the smallest diffraction angle of the first-order diffracted light out of the three diffraction regions in the diffraction grating, $\theta_{max}$ the diffraction angle of the RF diffraction region with the largest diffraction angle of the first-order diffracted light, and $\alpha$ and $\beta$ are the angles of the grating directions of the AT diffraction region and RF diffraction region relative to the X' direction. Accordingly, the light spots $S_{AT3}$ are positioned farther from the light spot $S_O$ than the light spots $S_{RF}$ in the Y direction.

In addition, the distance $L_{AT3}$ between the light spot $S_{AT3}$ and the light spot $S_O$ is larger than the distance $L_{RF}$ between the light spot $S_{RF}$ and the light spot $S_O$.

Therefore, as shown in FIG. 52, the light spots $S'_{AT3}$ are formed in the regions other than the photodetector elements 139, 140 and do not negatively affect the reproduction of information. Since no influence appears with the light spots $S'_{AT3}$ being outside the effective diameter of the optical system, they do not have to reach the same plane as that of the photodetector, and therefore, the effective diameter of the optical system does not have to be increased.

Figure 53:
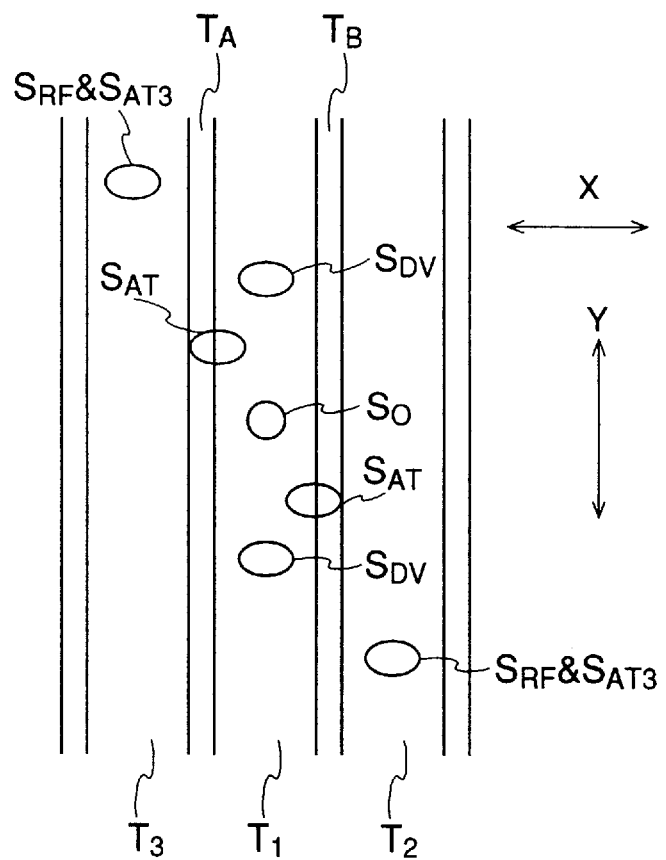
FIG. 53 is a schematic drawing to show states of light spots formed on the optical card in the twentieth embodiment of the optical information recording/reproducing apparatus according to the present invention.
Figure 54:
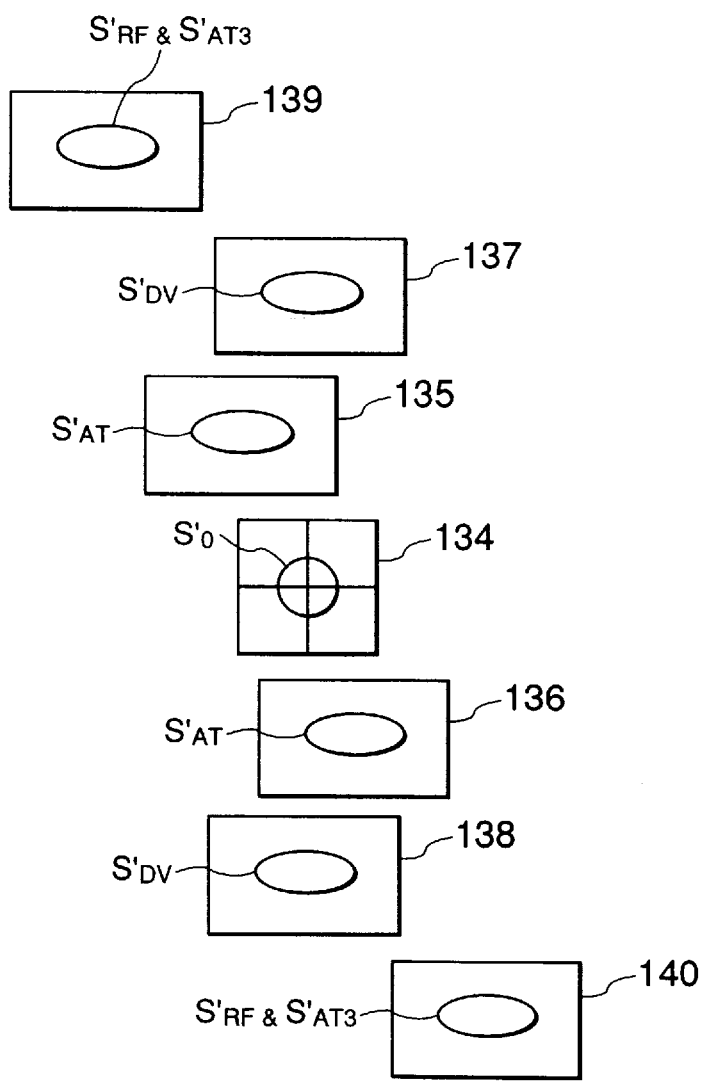
FIG. 54 is a schematic drawing to show states of light spots formed on the photodetector in the twentieth embodiment of the optical information recording/reproducing apparatus according to the present invention.

FIG. 53 is a schematic drawing to show states of the light spots formed on the optical card in the twentieth embodiment of the optical information recording and/or reproducing apparatus according to the present invention, and FIG. 54 is a schematic drawing to show states of the light spots formed on the photodetector elements in the present embodiment. In these drawings, the same reference symbols represent members having functions similar to those in above FIG. 45 to FIG. 52. The present embodiment has the optical head in the structure similar to that shown in above FIG. 45. However, the present embodiment is different from the above embodiment only in the structure of the three diffraction regions 125a–125c in the diffraction grating 125, and the grating directions and grating pitches of the respective diffraction regions in the diffraction grating 125 are set so as to form the following light spots.

As shown in FIG. 53, the recording and AF light spot $S_O$ is formed from the zeroth-order diffracted beam, and, from the ± first-order diffracted beams by the three diffraction regions, the DV light spots $S_{DV}$ are formed on both sides of the light spot $S_O$ in the Y direction, the AT light spots $S_{AT}$ are formed on both sides of the light spot $S_O$ in the direction inclined at the acute angle counterclockwise in FIG. 53 relative to the Y direction, and the RF light spots $S_{RF}$ are formed on both sides of the light spot $S_O$ in the direction inclined at the acute angle counterclockwise in FIG. 53 relative to the Y direction.

In the present embodiment, the light spots $S_{AT3}$ are present at the same positions as the light spots $S_{RF}$.

Accordingly, as shown in FIG. 54, the light spots $S'_{RF}$ and light spots $S'_{AT3}$ come to simultaneously impinge upon the photodetector elements 139, 140, and therefore, they do not negatively affect the reproduction of information.

As explained above, the present invention employs such an arrangement that the beams from the recording medium, based on the higher-order diffracted beams, are guided to impinge on the regions other than the photodetector elements for detecting the beams from the recording medium, based on the zeroth-order and first-order diffracted beams, which can prevent the higher-order diffracted light from negatively affecting recording and reproduction of information and which can permit stable recording and reproduction of information.

Further, the present invention employs such an arrangement that the position of at least one of the light spots on the recording medium, based on the higher-order diffracted beams, is substantially coincident with the position of either one of the light spots on the recording medium, based on the zeroth-order and first-order diffracted beams, which can prevent the higher-order diffracted light from negatively affecting recording and reproduction of information and which can permit stable recording and reproduction of information.

The seventeenth to the nineteenth embodiments of the present invention as explained above are directed to the optical information recording and/or reproducing apparatus arranged to use the diffraction grating having the plurality of diffraction regions with the different diffraction angles of the first-order diffracted light to split the beam emitted from the light source into the zeroth-order diffracted beam, and the first-order diffracted beams and higher-order diffracted beams of the second or higher order by the respective diffraction regions, to guide at least the zeroth-order and first-order diffracted beams in the form of respective light spots to the optical information recording medium, and to detect beams from the respective light spots on the recording medium by the respective photodetector elements, thereby recording information in the recording medium and/or reproducing recorded information by irradiation with the light spots, wherein the diffraction grating and the photodetector are arranged so that the beams from the recording medium, based on the higher-order diffracted beams, are guided to impinge on the regions other than the photodetector for detecting the beams from the recording medium, based on the zeroth-order and first-order diffracted beams.

It is also characterized in that two diffraction regions out of the plurality of diffraction regions in the diffraction grating have respective grating directions inclined at their acute angles in mutually different directions with respect to the direction optically corresponding to the direction perpendicular to the tracks of the recording medium.

It is also characterized in that the two diffraction regions, having the grating directions inclined at the acute angles in the mutually different directions with respect to the direction optically corresponding to the direction perpendicular to the tracks of the recording medium, are a region for generating the beams forming the autotracking light spots on the recording medium and a region for generating the beams forming the information reproducing light spots on the recording medium.

It is also characterized in that the region for generating the beams forming the direct verifying light spots on the recording medium has the grating direction optically corresponding to the direction perpendicular to the tracks of the recording medium.

It is also characterized in that the following relation holds:

$$\tan\theta_{max}\cdot\sin\beta < \tan 3\theta_{min}\cdot\sin\alpha$$

where $\theta_{min}$ is the diffraction angle of the first diffraction region with the smallest diffraction angle of the first-order diffracted light out of the plurality of diffraction regions in the diffraction grating, $\theta_{max}$ the diffraction angle of the second diffraction region with the largest diffraction angle of the first-order diffracted light, and $\alpha$ and $\beta$ are the angles of the grating directions of the first diffraction region and the second diffraction region with respect to the direction optically corresponding to the direction perpendicular to the tracks of the recording medium.

It is also characterized in that the following relation holds:

$$\tan\theta_{max}\cdot\cos\beta < \tan 3\theta_{min}\cdot\cos\alpha$$

where $\theta_{min}$ is the diffraction angle of the first diffraction region with the smallest diffraction angle of the first-order diffracted light out of the plurality of diffraction regions in the diffraction grating, $\theta_{max}$ the diffraction angle of the second diffraction region with the largest diffraction angle of the first-order diffracted light, and $\alpha$ and $\beta$ are the angles of the grating directions of the first diffraction region and the second diffraction region with respect to the direction optically corresponding to the direction perpendicular to the tracks of the recording medium.

It is also characterized in that the first diffraction region is a region for generating the beams forming the autotracking light spots on the recording medium and the second diffraction region is a region for generating the beams forming the information reproducing light spots on the recording medium.

It is also characterized in that the distance between the light spots on the recording medium, based on the third-order diffracted beams by the first diffraction region, and the light spot on the recording medium, based on the zeroth-order beam, is larger than the distance between the light spots on the recording medium, based on the first-order diffracted beams by the second diffraction region, and the light spot on the recording medium, based on the zeroth-order beam.

The twentieth embodiment of the present invention as explained above is directed to the optical information recording and/or reproducing apparatus arranged to use the diffraction grating having the plurality of diffraction regions with the different diffraction angles of the first-order diffracted light to split the beam emitted from the light source into the zeroth-order diffracted beam, and the first-order diffracted beams and higher-order diffracted beams of the second or higher order by the respective diffraction regions, to guide at least the zeroth-order and first-order diffracted beams in the form of respective light spots to the optical information recording medium, and to detect beams from the respective light spots on the recording medium by the respective photodetector elements, thereby recording information in the recording medium and/or reproducing recorded information by irradiation with the light spots, wherein the diffraction grating and the photodetector are arranged so that the position of at least one of the light spots on the recording medium, based on the higher-order diffracted beams, is substantially coincident with the position of either one of the light spots on the recording medium, based on the zeroth-order and first-order diffracted beams.

It is also characterized in that the positions of the light spots formed on the recording medium, based on the third-order diffracted beams from the region for generating the beams forming the autotracking light spots on the recording medium, are substantially coincident with the positions of the information reproducing light spots on the recording medium.

It is also characterized in that the plurality of diffraction regions in the diffraction grating are a region for generating the beams forming the autotracking light spots on the recording medium, a region for generating the beams forming the information reproducing light spots on the recording medium, and a region for generating the beams forming the direct verifying light spots on the recording medium.

Further embodiments of the present invention will be explained.

The twenty-first embodiment of the present invention is the optical information recording and/or reproducing apparatus arranged to position the diffraction grating consisting of two portions, the diffraction-grating-formed portion (diffraction region) and diffraction-grating-unformed portion (non-diffraction region) so that the two portions may be located in the beam from the light source, to split the beam into a plurality of beams, and to irradiate the information tracks and tracking tracks on the surface of the optical information recording medium, thereby recording and/or reproducing information, wherein the diffraction grating has a plurality of diffraction-grating-formed portions with different diffraction angles, one diffraction-grating-formed portion of which is arranged to be surrounded by the other diffraction-grating-formed portions and the diffraction-grating-unformed portion.

Figure 55:
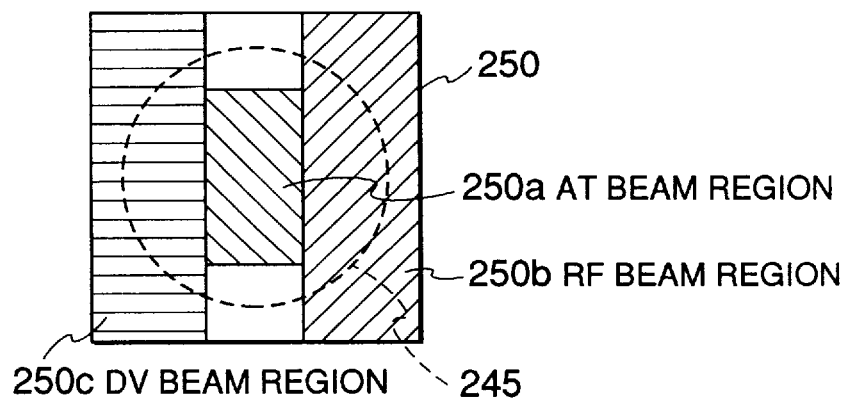
FIG. 55 is a schematic drawing to show the twenty-first embodiment of the diffraction grating used in the optical information recording/reproducing apparatus according to the present invention.

FIG. 55 is a schematic drawing to show the twenty-first embodiment of the diffraction grating used in the optical information recording and/or reproducing apparatus according to the present invention. Here, reference symbol 250a denotes a diffraction-grating-formed portion for AT (AT diffraction portion), 250b a diffraction-grating-formed portion for DV (DV diffraction portion), 250c a diffraction-grating-formed portion for RF (RF diffraction portion), 250d and 250e diffraction-grating-unformed portions (non-diffraction portions), and 245 the incident beam. The AT diffraction portion 250a is arranged to be surrounded by the foregoing DV diffraction portion 250b, RF diffraction portion 250c, and two non-diffraction portions 250d, 250e.

The present embodiment is different from the apparatus of FIG. 45 only in that the diffraction grating 250 shown in FIG. 55 is used instead of the diffraction grating 125 in the optical head shown in FIG. 46, and the structure and functions of the other portions are the same as those in the embodiment of FIG. 45. Further, the operation is also the same as in the embodiment of FIG. 45. Therefore, the redundant description thereof is omitted herein.

Figure 56:
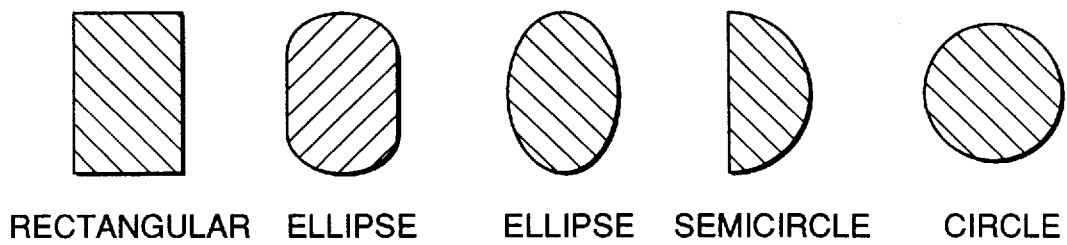
Figure 57A:
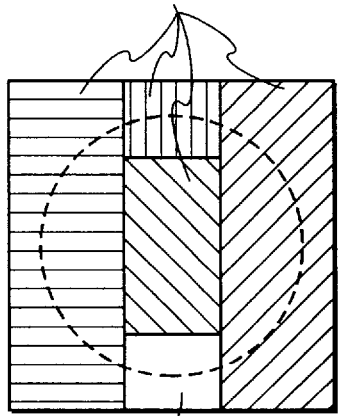
FIGS. 57A and 57B are drawings to show other shapes of the diffraction grating.
Figure 57B:
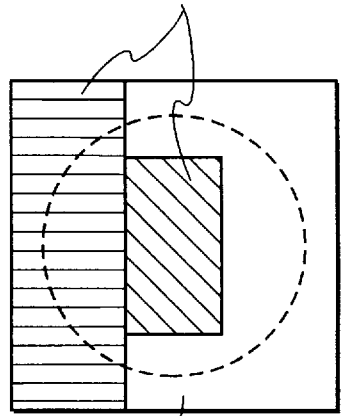

The shape of the AT diffraction portion characteristic herein may be selected from a rectangle, an elongate ellipse, an ellipse, a semicircle, and a circle, as shown in FIG. 56, and the shape and size of the diffraction region are desirably determined properly, taking account of the size, shape, and light quantity of the light spot on the medium surface, the effective diameter of the optical system, the production cost, and so on. The diffraction grating can be formed by freely determining the functions of the other portions surrounding the one diffraction-grating-formed portion, for example, by forming four diffraction-grating-formed portions and one diffraction-grating-unformed portion, as shown in FIG. 57A, or by forming two diffraction-grating-formed portions and one diffraction-grating-unformed portion, as shown in FIG. 57B.

Figure 58:
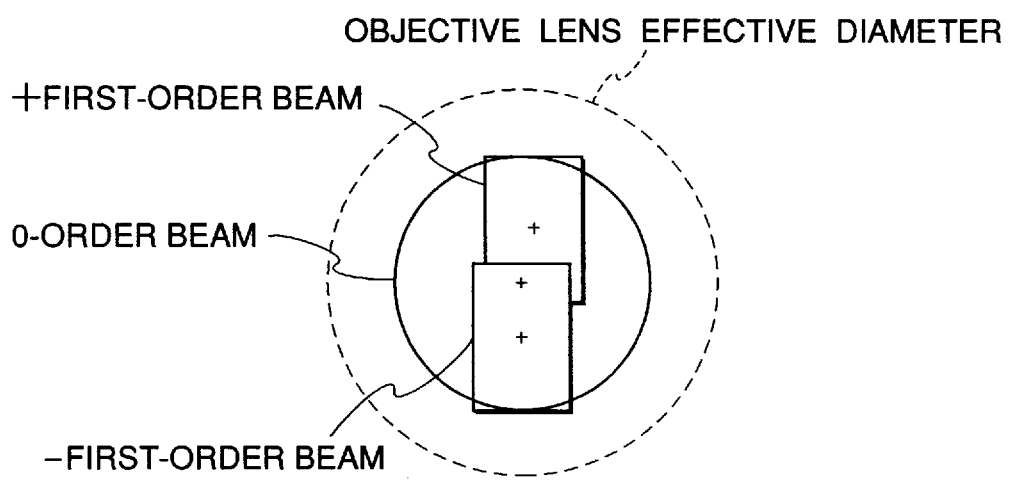
FIG. 58 is a drawing to show a positional relation between the effective diameter of objective lens and AT beams where the diffraction grating of FIG. 55 is used.

FIG. 58 is a drawing to show the positional relation between the zeroth-order beam and the AT beams on the objective lens under the same conditions as the embodiment of FIG. 46 except that the diffraction grating 250 shown in FIG. 55 is used instead of the diffraction grating 125. Since the AT beams diffracted by the AT diffraction portion 250a are smaller in diameter by the degree of the non-diffraction portions 250d, 250e than the AT beams diffracted by the AT diffraction portion 125a in the embodiment of FIG. 46, the AT offset is more unlikely to occur against the optical-axis deviation in the vertical direction in the drawing.

The present embodiment is arranged to use the beams generated by the grating-formed portion arranged to be surrounded by the other diffraction-grating-formed portions and diffraction-grating-unformed portion, for the AT control, but they may be used, of course, for the other purposes, for example, for DV or RF.

Figure 59A:
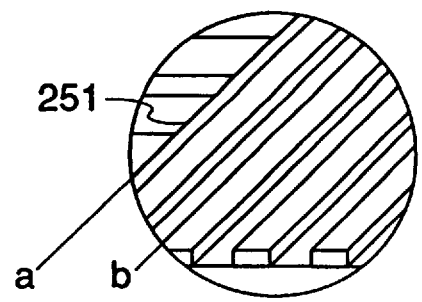
FIG. 59 is a schematic drawing to show the twenty second embodiment of the diffraction grating used in the optical information recording/reproducing apparatus according to the present invention.
Figure 59B:
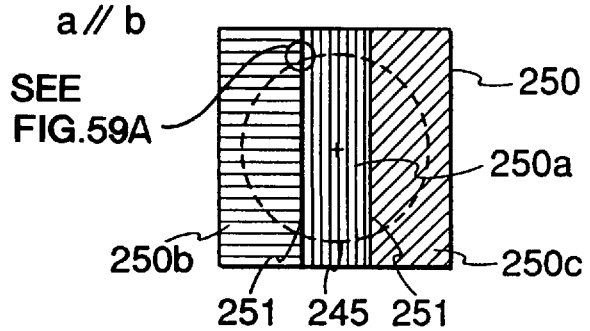

Another embodiment of the present invention will be described in detail with reference to the drawing. FIGS. 59A and 59B are schematic drawings to show the twenty-second embodiment of the diffraction grating used in the optical information recording and/or reproducing apparatus according to the present invention. Here, reference numeral 250a denotes a diffraction-grating-formed portion for AT (AT diffraction portion), 250b a diffraction-grating-formed portion for DV (DV diffraction portion) for generating direct verifying (DV) beams capable of reproducing information immediately after being recorded, and 250c a diffraction-grating-formed portion for RF (RF diffraction portion) for generating information reproducing (RF) beams in order to reproduce information in adjacent information tracks to an information track irradiated with the recording light.

The diffraction-grating-formed portions are formed in a square shape, in which the AT diffraction portion 250a is positioned between the DV diffraction portion 250b and the RF diffraction portion 250c. The grating grooves of the AT diffraction portion 250a are parallel to the parting lines 251. This diffraction grating 250 is placed at the same position as the diffraction grating 125 in FIG. 45 is, instead thereof. Therefore, the parting lines 251 are parallel to the tracking tracks (TA, TB) on the medium surface; that is, the grating grooves of the AT diffraction portion 250a are parallel to the tracking tracks (TA, TB).

Figure 60:
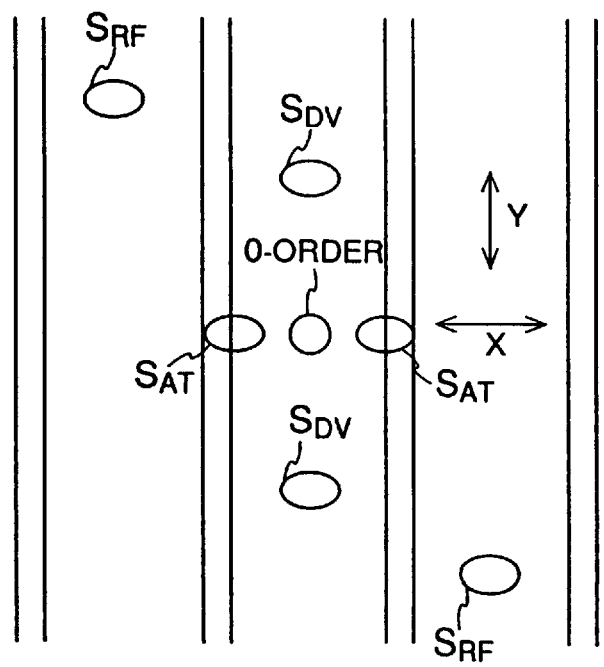
FIG. 60 is a drawing to show a location of a light spot on a surface of medium in the twenty-second embodiment of the present invention.

The diffraction directions of the diffracted beams by the AT diffraction portion 250a are nearly perpendicular to the parting lines 251 and tracking tracks, and the light spots are positioned as shown in FIG. 60 on the medium surface. Since the light spots $S_{AT}$ for the AT control impinge upon the adjacent tracking tracks, the diffraction angles of the AT diffraction portion are small, so that beam eclipse due to optical-axis deviation is unlikely to occur.

Figure 61:
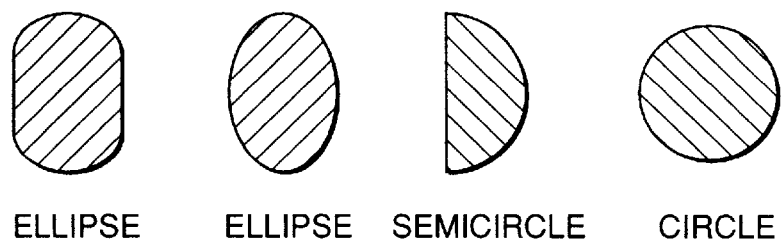

Incidentally, this embodiment employs the rectangular shape for the AT diffraction portion, but the shape may be of an oblong ellipse, an ellipse, a semicircle, or a circle, as shown in FIG. 61. The shapes and the sizes of the diffraction-grating-formed portions are desirably determined properly, taking account of the size, shape, and light quantity of each spot on the medium surface, the effective diameter of the optical system, the production cost, and so on.

This embodiment is different from the apparatus of FIG. 45 only in that the diffraction grating 250 shown in FIGS. 59A and 59B are used instead of the diffraction grating 125 in the optical head of the embodiment shown in FIG. 45, and the structure and functions of the other portions are the same as in FIG. 45. Further, the operation is also the same as in FIG. 45. Therefore, the description of those is omitted herein.

Figure 62:
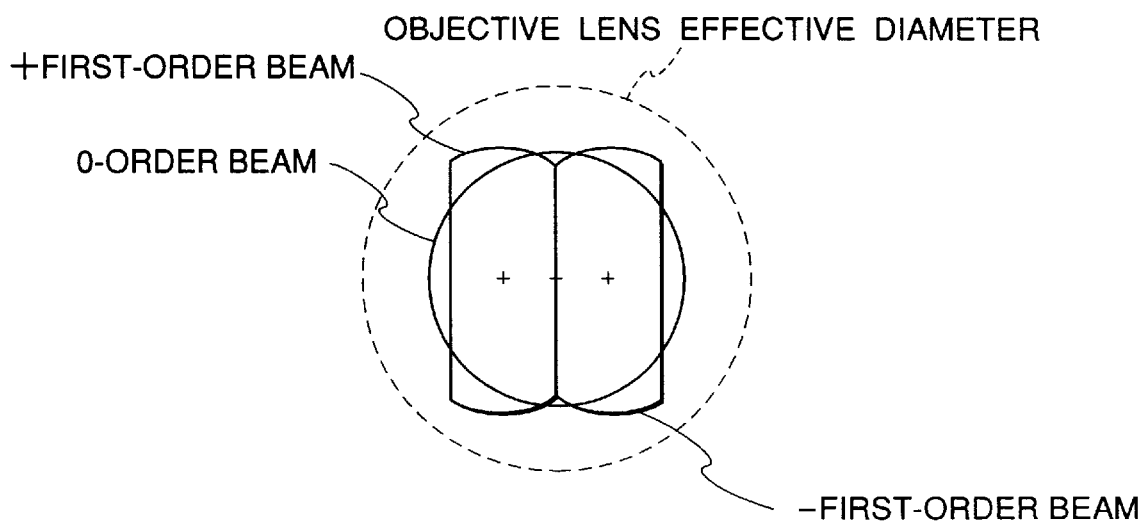
FIG. 62 is a drawing to show a positional relation between the effective diameter of the objective lens and AT beams in the twenty-second embodiment of the present invention.

FIG. 62 is a drawing to show the positional relation between the effective diameter of the objective and the AT beams under the same conditions as in the embodiment of FIGS. 46A and 46B except that the diffraction grating 250 shown in FIG. 59 is used instead of the diffraction grating 125. Since the AT beams are diffracted in the directions perpendicular to the parting lines, the diffraction directions are left-to-right directions in the plane of the drawing. Therefore, in the relation between the effective diameter of the objective and the AT beams, margins in the vertical directions in the plane of the drawing become large, so that the AT offset is unlikely to occur against the optical-axis deviation. Further, since the diffraction angles become smaller, the positions on the objective become closer to the center of the objective, so that the AT offset becomes more unlikely to occur against the optical-axis deviation.

As explained above, the present invention employs such an arrangement that the AT diffraction portion is surrounded by the DV diffraction portion, RF diffraction portion, and non-diffraction portion(s), which decreases the diameter of the AT beams. This makes the AF offset hardly occur whereby stable reproduction of information can be realized without increasing the effective diameter of each optical component in the optical system or without increasing the processing accuracy and assembling accuracy of the components.

Further, the present invention employs such an arrangement that the grating grooves of the AT diffraction portion are nearly parallel to the parting lines parting the diffraction-grating-formed portions, which increases the margins for the beam eclipse in the relation between the effective diameter of the objective and the AT beams. This makes the beam eclipse hardly occur and thus realizes stable reproduction of information without increasing the effective diameter of each optical component in the optical system or without increasing the processing accuracy and assembling accuracy of the components.

The twenty-first embodiment of the present invention as explained above is directed to the optical information recording and/or reproducing apparatus arranged to position the diffraction grating consisting of the two portions, the diffraction-grating-formed portion and the diffraction-grating-unformed portion, so that the two portions may be located in the beam from the light source, to split the beam into a plurality of beams, and to radiate the beams to the information tracks and tracking tracks on the surface of the optical information recording medium, thereby recording and/or reproducing information, wherein the diffraction grating has the plurality of diffraction-grating-formed portions with different diffraction angles, one diffraction-grating-formed portion of which is surrounded by the other diffraction-grating-formed portions and the diffraction-grating-unformed portion.

It is also characterized in that the one diffraction-grating-formed portion of those with the different diffraction angles is arranged to be surrounded by two other diffraction-grating-formed portions and two diffraction-grating-unformed portions.

It is also characterized in that the diffraction beams diffracted by the diffraction-grating-formed portion arranged to be surrounded by the other diffraction-grating-formed portions and diffraction-grating-unformed portions are autotracking beams.

The twenty-second embodiment of the present invention as explained above is directed to the optical information recording and/or reproducing apparatus arranged to position the diffraction grating split into the plurality of diffraction-grating-formed portions in the beam from the light source, to split the beam into the plurality of beams, and to radiate the beams to the information tracks and tracking tracks on the surface of the optical information recording medium, thereby recording and/or reproducing information, wherein the diffraction grating is constructed so that the grating lines of at least one diffraction-grating-formed portion are nearly parallel to the parting lines separating the diffraction-grating-formed portions. It is also characterized in that the shapes of the plurality of diffraction-grating-formed portions are rectangular, and the diffraction-grating-formed portion having the grating lines nearly parallel to the parting lines is arranged to be sandwiched between the other diffraction-grating-formed portions.

It is also characterized in that the grating lines nearly parallel to the parting lines are nearly parallel to the tracking tracks.

It is also characterized in that the diffraction beams diffracted by the grating lines nearly parallel to the parting lines are autotracking beams.

What is claimed is:

1. An optical information recording and/or reproducing apparatus for radiating a plurality of beams to an optical information recording medium to record information in said optical information recording medium and/or reproduce information recorded therein, said apparatus comprising:

an irradiation optical system;

a diffraction grating for splitting a beam from said irradiation optical system into a plurality of beams, said diffraction grating having a plurality of different diffraction regions formed without overlapping with each other, wherein said plurality of beams split by said plurality of diffraction regions are guided onto said optical information recording medium; and a detection optical system for detecting a beam from said optical information recording medium, said detection optical system comprising a photodetector which includes a plurality of light receiving elements in which at least three light receiving elements are provided on a predetermined arrangement line and at least two light receiving elements are arranged so as to sandwich the arrangement line therebetween.

2. An optical information recording and/or reproducing apparatus according to claim 1, wherein said irradiation optical system comprises a light source.

3. An optical information recording and/or reproducing apparatus according to claim 1, wherein, out of said plurality of beams, a beam not subjected to a diffraction effect of said diffraction grating is used as a recording beam while beams subjected to the diffraction effect of said diffraction grating are used as direct verifying light, autotracking light, and reproducing light.

4. An optical information recording and/or reproducing apparatus according to claim 3, wherein the beams subjected to the diffraction effect of said diffraction grating form light spots in an elliptical shape elongated in a track traversing direction on said optical information recording medium, and wherein the beam not subjected to the diffraction effect of said diffraction grating forms a light spot in a circular shape smaller than said elliptical light spots on said optical information recording medium.

5. An optical information recording and/or reproducing apparatus according to claim 1, wherein said diffraction grating is a hologram.

6. An optical information recording and/or reproducing apparatus according to claim 1, wherein said diffraction grating has the diffraction regions trisected into three regions by two parting lines parallel to a track running direction, the diffraction region in the central portion is used for generating autotracking light, and the diffraction regions on both sides of said center portion are used for generating direct verifying light and for generating reproducing light.

7. An optical information recording and/or reproducing apparatus according to claim 1, wherein said diffraction grating is arranged so that quantities of the light diffracted from said plurality of diffraction regions are equal to each other.

8. An optical information recording and/or reproducing apparatus according to claim 7, wherein an intensity distribution of the beam incident to said diffraction grating is a Gaussian distribution.

9. An optical information recording and/or reproducing apparatus according to claim 8, wherein said irradiation optical system comprises a semiconductor laser as a light source.

10. An optical information recording and/or reproducing apparatus according to claim 1, wherein emerging directions of the diffracted light from said plurality of diffraction regions are different from each other.

11. An optical information recording and/or reproducing apparatus according to claim 1, wherein a region in which said plurality of diffraction regions are formed on said diffraction grating is a region larger than a diameter of the beam incident to said diffraction grating.

12. An optical information recording and/or reproducing apparatus according to claim 1, wherein said diffraction grating is arranged so that diffraction efficiencies of said plurality of diffraction regions are equal to each other.

13. An optical information recording and/or reproducing apparatus according to claim 1, which comprises a stationary portion and a movable portion, wherein said irradiation optical system is placed in said stationary portion and said diffraction grating is set in said movable portion.

14. An optical information recording and/or reproducing apparatus according to claim 13, further comprising an aperture for restricting the beam from said irradiation optical system, said aperture being positioned in said movable portion.

15. An optical information recording and/or reproducing apparatus according to claim 1, wherein, out of said plurality of beams, a beam not subjected to a diffraction effect of said diffraction grating is used as an autofocusing beam.

16. An optical information recording and/or reproducing apparatus according to claim 15, further comprising an objective lens for focusing the beam from said irradiation optical system on said optical information recording medium, wherein said autofocusing beam is positioned in symmetry with respect to the optical axis of said objective lens.

17. An optical information recording and/or reproducing apparatus according to claim 15, wherein said autofocusing beam is a zeroth-order beam.

18. An optical information recording and/or reproducing apparatus according to claim 15, wherein said autofocusing beam is a beam passing through the diffraction region in the center portion of said diffraction grating.

19. An optical information recording and/or reproducing apparatus according to claim 1, wherein said diffraction grating splits the beam from said irradiation optical system into a zeroth-order diffracted beam, and first-order diffracted beams and higher-order diffracted beams of the second or higher order, wherein beams from said optical information recording medium, based on said zeroth-order diffracted beam and said first-order diffracted beams, are detected by a photodetector in said detection optical system, and wherein beams from said optical information recording medium, based on said higher-order diffracted beams, are guided onto regions other than said photodetector in said detection optical system.

20. An optical information recording and/or reproducing apparatus according to claim 1, wherein two diffraction regions out of said plurality of diffraction regions in said diffraction grating have grating directions inclined at respective acute angles in mutually different directions with respect to a direction optically corresponding to a direction perpendicular to a track in said optical information recording medium.

21. An optical information recording and/or reproducing apparatus according to claim 20, wherein said two diffraction regions are used for generating autotracking beams and for generating reproducing beams.

22. An optical information recording and/or reproducing apparatus according to claim 20, wherein one diffraction region out of the other diffraction regions than said two diffraction regions out of said plurality of diffraction regions in said diffraction grating has a grating direction optically corresponding to the direction perpendicular to the track of said optical information recording medium.

23. An optical information recording and/or reproducing apparatus according to claim 22, wherein said one diffraction region is used for generating direct verifying beams.

24. An optical information recording and/or reproducing apparatus according to claim 1, wherein said diffraction grating is comprised of said plurality of diffraction regions and a non-diffraction region.

25. An optical information recording and/or reproducing apparatus according to claim 24, wherein one diffraction region out of said plurality of diffraction regions is surrounded by said non-diffraction region and the other diffraction regions than said one diffraction region.

26. An optical information recording and/or reproducing apparatus according to claim 24, wherein one diffraction region out of said plurality of diffraction regions is surrounded by two non-diffraction regions and two diffraction regions other than said one diffraction region.

27. An optical information recording and/or reproducing apparatus according to claim 26, wherein said one diffraction region is used for generating autotracking beams.

28. An optical information recording and/or reproducing apparatus for radiating a plurality of beams to an optical information recording medium to record information in said optical information recording medium and/or reproduce information recorded therein, said apparatus comprising:

an irradiation optical system;

a diffraction grating for splitting a beam from said irradiation optical system into a plurality of beams, said diffraction grating having a plurality of different diffraction regions formed without overlapping with each other, wherein said plurality of beams split by said plurality of diffraction regions are guided onto said optical information recording medium, out of said plurality of beams, a beam not subjected to a diffraction effect of said diffraction grating is used as a recording beam while beams subjected to the diffraction effect of said diffraction grating are used as direct verifying light, autotracking light, and reproducing light, the beams subjected to the diffraction effect of said diffraction grating form light spots in an elliptical shape elongated in a track traversing direction on said optical information recording medium, and the beam not subjected to the diffraction effect of said diffraction grating forms a light spot in a circular shape smaller than said elliptical light spots on said optical information recording medium; and a detection optical system for detecting a beam from said optical information recording medium.

29. An optical information recording and/or reproducing apparatus for radiating a plurality of beams to an optical information recording medium to record information in said optical information recording medium and/or reproduce information recorded therein, said apparatus comprising:

an irradiation optical system;

a diffraction grating for splitting a beam from said irradiation optical system into a plurality of beams, said diffraction grating having a plurality of different diffraction regions formed without overlapping with each other, wherein said plurality of beams split by said plurality of diffraction regions are guided onto said optical information recording medium, and, out of said plurality of beams, a beam not subjected to a diffraction effect of said diffraction grating is used as an autofocusing beam; and a detection optical system for detecting a beam from said optical information recording medium.

30. An optical information recording and/or reproducing apparatus according to claim 29, further comprising an objective lens for focusing the beam from said irradiation optical system on said optical information recording medium, wherein said autofocusing beam is positioned in symmetry with respect to the optical axis of said objective lens.

31. An optical information recording and/or reproducing apparatus according to claim 29, wherein said autofocusing beam is a zeroth-order beam.

32. An optical information recording and/or reproducing apparatus according to claim 29, wherein said autofocusing beam is a beam passing through the diffraction region in the center portion of said diffraction grating.

33. An optical information recording and/or reproducing apparatus for radiating a plurality of beams to an optical information recording medium to record information in said optical information recording medium and/or reproduce information recorded therein, said apparatus comprising:

an irradiation optical system;

a diffraction grating for splitting a beam from said irradiation optical system into a plurality of beams, said diffraction grating having a plurality of different diffraction regions formed without overlapping with each other, wherein said plurality of beams split by said plurality of diffraction regions are guided onto said optical information recording medium, said diffraction grating splits the beam from said irradiation optical system into a zeroth-order diffracted beam, and first-order diffracted beams and higher-order diffracted beams of the second or higher order; and a detection optical system for detecting a beam from said optical information recording medium, wherein beams from said optical information recording medium, based on said zeroth-order diffracted beam and said first-order diffracted beams, are detected by a photodetector in said detection optical system, and beams from said optical information recording medium, based on said higher-order diffracted beams, are guided onto regions other than said photodetector in said detection optical system.

34. An optical information recording and/or reproducing apparatus for radiating a plurality of beams to an optical information recording medium to record information in said optical information recording medium and/or reproduce information recorded therein, said apparatus comprising:

an irradiation optical system;

a diffraction grating for splitting a beam from said irradiation optical system into a plurality of beams, said diffraction grating having a plurality of different diffraction regions formed without overlapping with each other, wherein said plurality of beams split by said plurality of diffraction regions are guided onto said optical information recording medium, and two diffraction regions out of said plurality of diffraction regions in said diffraction grating have grating directions inclined at respective acute angles in mutually different directions with respect to a direction optical corresponding to a direction perpendicular to a track in said optical information recording medium; and a detection optical system for detecting a beam from said optical information recording medium.

35. An optical information recording and/or reproducing apparatus according to claim 34, wherein said two diffraction regions are used for generating autotracking beams and for generating reproducing beams.

36. An optical information recording and/or reproducing apparatus according to claim 34, wherein one diffraction region out of the other diffraction regions than said two diffraction regions out of said plurality of diffraction regions in said diffraction grating has a grating direction optically corresponding to the direction perpendicular to the track of said optical information recording medium.

37. An optical information recording and/or reproducing apparatus according to claim 36, wherein said one diffraction region is used for generating direct verifying beams.

38. An optical information recording and/or reproducing apparatus for radiating a plurality of beams to an optical information recording medium to record information in said optical information recording medium and/or reproduce information recorded therein, said apparatus comprising:

an irradiation optical system;

a diffraction grating for splitting a beam from said irradiation optical system into a plurality of beams, said diffraction grating having a plurality of different diffraction regions formed without overlapping with each other, wherein said plurality of beams split by said plurality of diffraction regions are guided onto said optical information recording medium, and said diffraction grating is comprised of said plurality of diffraction regions and a non-diffraction region; and a detection optical system for detecting a beam from said optical information recording medium.

39. An optical information recording and/or reproducing apparatus according to claim 38, wherein one diffraction region out of said plurality of diffraction regions is surrounded by said non-diffraction region and the other diffraction regions than said one diffraction region.

40. An optical information recording and/or reproducing apparatus according to claim 38, wherein one diffraction region out of said plurality of diffraction regions is surrounded by two non-diffraction regions and two diffraction regions other than said one diffraction region.

41. An optical information recording and/or reproducing apparatus according to claim 40, wherein said one diffraction region is used for generating autotracking beams.

* * * * *

UNITED STATES PATENT AND TRADEMARK OFFICE
CERTIFICATE OF CORRECTION

PATENT NO. : 5,835,471

DATED : November 10, 1998

INVENTORS : MORITOSHI MIYAMOTO, ET AL.

It is certified that error appears in the above-identified patent and that said Letters Patent is hereby corrected as shown below:

ON THE COVER PAGE

At item [54], in the title, "APPARATUS" should read --APPARATUS INCLUDING A DIFFRACTION GRATING, HAVING DIFFERENT DIFFRACTION REGIONS FORMED WITHOUT OVERLAPPING EACH OTHER, FOR SPLITTING A BEAM FROM AN IRRADIATION OPTICAL SYSTEM INTO A PLURALITY OF BEAMS--.

At item [57], in the abstract, line 4, "recording" should read --recording medium--.

COLUMN 1, line 2, "APPARATUS" should read --APPARATUS INCLUDING A DIFFRACTION GRATING, HAVING DIFFERENT DIFFRACTION REGIONS FORMED WITHOUT OVERLAPPING EACH OTHER, FOR SPLITTING A BEAM FROM AN IRRADIATION OPTICAL SYSTEM INTO A PLURALITY OF BEAMS--.

COLUMN 2:

line 21, "$S_1$," should read --$S_1$--;
line 65, "$S_1$," should read --$S_1$--; and
line 67, "(the-first-order" should read --(the -first-order--.

UNITED STATES PATENT AND TRADEMARK OFFICE
CERTIFICATE OF CORRECTION

PATENT NO. : 5,835,471

DATED : November 10, 1998

INVENTORS : MORITOSHI MIYAMOTO, ET AL.

It is certified that error appears in the above-identified patent and that said Letters Patent is hereby corrected as shown below:

COLUMN 3:

line 2, "$S_1$," should read --$S_1$--; and
    line 27, "$30_b$" should read --30b--.

COLUMN 8:

line 30, "recoding" should read --recording--.

COLUMN 17:

line 20, "FIG." should read --FIGS.--;
    line 24, "FIG." should read --FIGS.--; and
    line 35, "FIG." should read --FIGS.--.

COLUMN 18:

line 16, "twenty second" should read --twenty-second--.

COLUMN 20:

line 49, "for." should read --for--.

COLUMN 28:

line 14, "arrangement" should read --arrangement,--.

UNITED STATES PATENT AND TRADEMARK OFFICE
CERTIFICATE OF CORRECTION

PATENT NO. : 5,835,471

DATED : November 10, 1998

INVENTORS : MORITOSHI MIYAMOTO, ET AL.

It is certified that error appears in the above-identified patent and that said Letters Patent is hereby corrected as shown below:

COLUMN 29:

line 66, "the-track" should read --the track--.

COLUMN 46:

line 6, "42B" should read --42B and--.

COLUMN 50:

line 8, "FIG." should read --FIGS.--;
    line 21, "grating-" should read --grating--; and
    line 22, "as," should read --as-- and "FIG." should read --FIGS.--.

COLUMN 52:

line 30, "acute." should read --acute--.

Signed and Sealed this

Sixth Day of July, 1999

Attest:

Q. TODD DICKINSON

*Attesting Officer*     Acting Commissioner of Patents and Trademarks